(12) United States Patent
Yamauchi et al.

(10) Patent No.: US 11,045,791 B2
(45) Date of Patent: Jun. 29, 2021

(54) CATALYST AND USE OF SAME

(71) Applicant: Japan Science and Technology Agency, Kawaguchi (JP)

(72) Inventors: Miho Yamauchi, Fukuoka (JP); Masaaki Sadakiyo, Fukuoka (JP); Sho Kitano, Fukuoka (JP); Shinichi Hata, Fukuoka (JP)

(73) Assignee: Japan Science and Technology Agency, Kawaguchi (JP)

( * ) Notice: Subject to any disclaimer, the term of this patent is extended or adjusted under 35 U.S.C. 154(b) by 137 days.

(21) Appl. No.: 16/082,489

(22) PCT Filed: Mar. 2, 2017

(86) PCT No.: PCT/JP2017/008360
§ 371 (c)(1),
(2) Date: Sep. 5, 2018

(87) PCT Pub. No.: WO2017/154743
PCT Pub. Date: Sep. 14, 2017

(65) Prior Publication Data
US 2019/0134609 A1 May 9, 2019

Related U.S. Application Data

(60) Provisional application No. 62/304,943, filed on Mar. 8, 2016.

(51) Int. Cl.
*B01J 23/20* (2006.01)
*B01J 35/02* (2006.01)
(Continued)

(52) U.S. Cl.
CPC ......... *B01J 23/20* (2013.01); *B01J 35/0033* (2013.01); *B01J 35/0053* (2013.01); *B01J 35/02* (2013.01);
(Continued)

(58) Field of Classification Search
CPC .... B01J 23/20; B01J 35/0033; B01J 35/0053; B01J 35/02; C25B 3/04; C25B 9/08; C25B 11/035; C25B 11/0452
See application file for complete search history.

(56) References Cited

U.S. PATENT DOCUMENTS 5,395,488 A 3/1995 Scharbert et al.
2009/0065738 A1* 3/2009 Weidner .............. C01G 23/047
252/182.33
(Continued)

FOREIGN PATENT DOCUMENTS

CN 001147703 A 4/1997
CN 101166838 A 4/2008
(Continued)

OTHER PUBLICATIONS

Wang et al., Study on the shape control and photocatalytic activity of high-energy anatase titania, 2010,Applied Catalyst B: Environmental, 100, 378-385 (Year: 2010).*

(Continued)

*Primary Examiner* — James A Fiorito
(74) *Attorney, Agent, or Firm* — Christensen O'Connor Johnson Kindness PLLC

(57) ABSTRACT

A catalyst comprising: a titanium oxide having an anatase-type crystal structure, and having the vertices and the ridge lines, wherein in a single titanium oxide particle, a vertex density per unit surface area is $8.0 \times 10^{-4}$ $nm^{-2}$ or more, and a ridge line density per unit surface area is $5.0 \times 10^{-2}$ nm or more, or a ridge line density per unit volume is $8.0 \times 10^{-3}$ $nm^{-2}$ or more. A complex comprising: a material having a porous structure; and said catalyst. A membrane electrode assembly comprising: an anode; cathode; and an electrolyte membrane, wherein the cathode carries said catalyst on at least a surface of the cathode.

12 Claims, 44 Drawing Sheets

(51) Int. Cl.
| | |
|---|---|
| C25B 3/25 | (2021.01) |
| C25B 9/19 | (2021.01) |
| C25B 11/031 | (2021.01) |
| C25B 11/077 | (2021.01) |
| B01J 35/00 | (2006.01) |

(52) U.S. Cl.
CPC .......... *C25B 3/25* (2021.01); *C25B 9/19* (2021.01); *C25B 11/031* (2021.01); *C25B 11/077* (2021.01); *B01J 2523/47* (2013.01); *B01J 2523/48* (2013.01); *B01J 2523/49* (2013.01); *B01J 2523/56* (2013.01); *B01J 2523/57* (2013.01)

(56) References Cited

U.S. PATENT DOCUMENTS

| | | | |
|---|---|---|---|
| 2010/0000874 A1* | 1/2010 | Hinman | C25B 1/003 205/340 |
| 2012/0067405 A1 | 3/2012 | Jiu et al. | |
| 2012/0132515 A1 | 5/2012 | Ohno | |

FOREIGN PATENT DOCUMENTS

| | | |
|---|---|---|
| JP | 2008-297147 A | 12/2008 |
| JP | 2009-012444 A | 1/2009 |
| JP | 2010116632 A | 5/2010 |
| JP | 2010281025 A | 12/2010 |
| JP | 2011-032146 A | 2/2011 |
| JP | 2015-000831 A | 1/2015 |
| JP | 2015-195193 A | 11/2015 |
| NO | 2008022129 A2 | 2/2008 |
| WO | 2004/063431 A1 | 7/2004 |
| WO | WO-2005051541 A1 * | 6/2005 ............ B01J 21/066 |

OTHER PUBLICATIONS

Cui, X., et al., "Direct Ruthenium-Catalyzed Hydrogenation of Carboxylic Acids to Alcohols," Angewandte Chemie 127(36)10742-10745, Sep. 2015.

Harada, S., et al., "Optical Characterization Dependency of Zr-Doped $TiO_2$ on Doping Level," Joint Chemical Conference of Kyushu Branch, Gaikokujin Kenkyusha Koryu Kokusai Symposium Koen Yokoshu, vol. 52, p. 210, Jun. 27, 2015.

Hata, S., and M. Amauchi, "Electrochemical Reduction of Oxalic Acid Using Zr-Doped $TiO_2$ Particle Catalyst," Proceedings of the 9th Annual Meeting of Japanese Society for Molecular Science, Tokyo Institute of Technology, Abstract of Lecture, Aug. 31, 2015, 5 pages.

International Search Report dated Apr. 4, 2017, issued in corresponding International Application No. PCT/JP2017/008360, filed Mar. 2, 2017, 4 pages.

Ji, D. et al. "Catalytic Alcohols Synthesis From CO and $H_2O$ on $TiO_2$ Catalysts Calcined at Various Temperatures," Studies in Surface Science and Catalysis 147:433-438, 2004.

Liu, H., et al., "Synthesis and Photoelectrochemical Studies of N, Zr Co-Doped Mesoporous Titanium Dioxide," Journal of Electroanalytical Chemistry 736:93-100, Jan. 2015.

Naruto, M., and S. Saito, "Cationic Mononuclear Ruthenium Carboxylates as Catalyst Prototypes for Self-Induced Hydrogenation of Carboxylic Acids," Nature Communications 6:8140, Aug. 2015, pp. 1-9.

Seyden-Penne, J., "Reductions by the Alumino- and Borohydrides in Organic Synthesis," 1997, pp. 1-224, Wiley-VCH, Inc.

Hata, S., and M. Yamauchi, "Electrochemical Reduction of Oxalic Acid Using Zr-Doped $TiO_2$ Particle Catalyst," Proceedings of the 9th Annual Meeting of Japanese Society for Molecular Science, Tokyo Institute of Technology, Abstract of Lecture, Aug. 31, 2015, 5 pages.

Extended European Search Report dated Oct. 18, 2019, issued in corresponding European Application No. 17763083.7, filed Mar. 2, 2017, 7 pages.

Chen, J., et al., "Thermodynamically Driven One-Dimensional Evolution of Anatase TiO2 Nanorods: One-Step Hydrothermal Synthesis for Emerging Intrinsic Superiority of Dimensionality," Journal of the American Chemical Society 136:15310-15318, Oct. 7, 2014.

Watanabe, R., et al., "CO2-Free Electric Power Circulation via Direct Charge and Discharge Using the Glycolic Acid/Oxalic Acid Redox Couple," Energy & Environmental Science 8:1456-1462, Feb. 24, 2015.

Wu, W-Q, et al., "Hierarchical Oriented Anatase TiO2 Nanostructure Arrays on Flexible Substrate for Efficient Dye-Sensitized Solar Cells," Scientific Reports 3:1-7, May 29, 2013.

Yamauchi, M., et al., "Direct Power Charge and Discharge Using the Glycolic Acid/Oxalic Acid Redox Couple Toward Carbon-Neutral Energy Circulation," published in Electrosynthesis of Fuels 4 (Xu et al., Editors), pp. 17-21, Jan. 1, 2016.

Zhao, F., et al., "Roughened TiO2 Film Electrodes for Electrocatalytic Reduction of Oxalic Acid to Glyoxylic Acid," Journal of Electroanalytical Chemistry 698:31-38, Apr. 6, 2013.

Zhao, Z., et al., "Phase Control of Hierarchically Structured Mesoporous Anatase TiO2 Microspheres Covered With {001} Facets," Journal of Material Chemistry 22:21965-21971, Aug. 29, 2012.

Chinese Office Action dated Oct. 12, 2020, in corresponding Chinese Application No. 2017800151821, filed Mar. 2, 2017, 35 pages.

Notice of Allowance dated Mar. 16, 2021, from Japanese Application No. 2018504428, filed Mar. 2, 2017, 6 pages.

* cited by examiner

Expt. Condition

The chronoamperometry was performed in a two-compartment electrochemical cell at -0.7V vsRHE.

reference electrode: Ag/AgCl counter electrode: coiled Pt wire reduction condition: 50 °C for 2 h  0.03 M oxalic acid in 0.2 M $Na_2SO_4$ aq.  0.2 M $Na_2SO_4$ aq.

Step 1: Gel Formation*     *1, Adv. Mater., 13(18),1377-1380, 2011*

High Speed Stirring

Ethanol/PF-127

NbCl₅ → Fully dissolution → Colorless Transparent solution → TiCl₄ → Heater, 40 °C, 2 days, No Stirring No Cap

Step 2: Calcination Process

Calcination Parameter: 500 °C, 2 h, 0.5 h
Temp. (°C) vs Time (h)

Product Image

CATALYST AND USE OF SAME

Priority is claimed on U.S. Patent No. 62/304,943, filed on Mar. 8, 2016, the content of which is incorporated herein by reference.

TECHNICAL FIELD

The present invention relates to a catalyst, a cathode, a membrane electrode assembly for alcohol synthesis, an alcohol synthesizing apparatus, a method for producing alcohols, and a method for producing a cathode.

BACKGROUND ART

Efficient use of biomass resources composed of carbon derived from carbon dioxide in the atmosphere is considered an effective way of reducing consumption of petroleum resources. In recent years, production of bioalcohols such as ethanol and ethylene glycol for as a fuel and a raw material has been industrialized. In a current industrial process, bioethanol is produced by alcohol fermentation with enzymes using sugar or the like as a raw material, but this process has a problem of low carbon yield. On the other hand, a method for producing an alcohol by hydrogenation from a carboxylic acid that is plentiful in biomass has attracted attention. For example, a hydrogenation process from an organic chemical carboxylic acid to an alcohol using a highly reactive reagent such as a metal hydride can be mentioned (refer to NPL 1).

Further, as another production process by hydrogenation of carboxylic acid to an alcohol, a catalytic hydrogenation process using a thermal catalyst and the like can be mentioned (for example, refer to NPLs 2 and 3).

On the other hand, titanium oxide is widely known as a photocatalyst. PTL 1 discloses a titanium oxide catalyst which is formed of a box-shaped polyhedron composed of a single crystal polyhedron of 1 to 500 nm with a specific surface area increased so as to improve the activity of the photocatalyst. PTL 2 discloses a method for producing a titanium oxide particle having a large area ratio of a {001} plane, which highly contributes to photocatalyst function in an anatase-type crystal structure. Furthermore, NPL 4 discloses that glycolic acid was synthesized from oxalic acid using titanium oxide fine particles as an electrode reduction catalyst, porous particles with aggregated titanium oxide nanorods were used, and the porous particles were clearly derived from an anatase type.

CITATION LIST

Patent Literature

[PTL 1] Republished Japanese Translation No. 2004/063431 of the PCT International Publication for Patent Applications
[PTL 2] Japanese Unexamined Patent Application, First Publication No. 2015-000831

Non-Patent Literature

[NPL 1] J. Seyden-Penne, "Reductions by the Alumino- and Borohydrides in Organic Synthesis", 2nd ed., 1997.
[NPL 2] X. J. Cui, et al., "Direct Ruthenium-Catalyzed Hydrogenation of Carboxylic Acids to Alcohols", Angew Chem Int Edit, Vol. 54, p 10596-10599, 2015.
[NPL 3] M. Naruto, S. Saito, "Cationic mononuclear ruthenium carboxylates as catalyst prototypes for self-introduced hydrogenation of carboxylic acids", Nat Commun, Vol. 6, article number: 8140, 2015.
[NPL 4] Shinichi Hata, Miho Yamauchi, "Electrochemical reduction of oxalic acid using Zr-doped titanium oxide particle catalyst", Annual Meeting of Japan Society for Molecular Science 2015, Tokyo Institute of Technology, Abstract of presentation, Published Aug. 31, 2015

SUMMARY OF INVENTION

Technical Problem

In the method disclosed NPL 1, a highly reactive reagent such as a metal hydride is used in an organic solvent, and thus there is a problem in that a large amount of hazardous waste is discharged after the reaction.

In addition, in the method disclosed in NPLs 2 and 3, carboxylic acid is chemically stable, and thus high temperature or high pressure conditions (100° C. to 380° C., 2 to 6 MPa) are required for hydrogenation. Further, industrially used hydrogen gas is derived from natural gas, and has been dependent on petroleum resources.

In addition, the inventors of the present invention have focused on systems that synthesize alcohols by using electric power derived from renewable energy from carboxylic acid which is an oxidizing waste of an alcohol type fuel cell so as to reduce carbon dioxide emission and construct a highly efficient energy circulation system. However, although titanium oxide used as a catalyst has various shapes and sizes according to its production method, the shape properties of titanium oxide which is industrially usable and exhibits excellent Faraday efficiency with high selectivity are not known.

The present invention has been made in view of the above circumstances, and an object thereof is to provide a titanium oxide electrochemical catalyst having a specific structure capable of synthesizing alcohols from carboxylic acids with high selectivity and high yield, a cathode provided with the electrochemical catalyst, and a membrane electrode assembly for alcohol synthesis provided with the cathode. In addition, there are provided an alcohol synthesizing apparatus provided with the membrane electrode assembly for alcohol synthesis, which is capable of synthesizing alcohols from carboxylic acids with high selectivity and high yield, and a method for synthesizing an alcohol using the membrane electrode assembly for alcohol synthesis. Further, there is provided a method for producing a cathode provided with a titanium oxide electrochemical catalyst having a specific structure capable of synthesizing alcohols from carboxylic acids with high selectivity and high yield.

Solution to Problem

The inventors of the present invention have conducted intensive studies to achieve the above-described object and have found that among the titanium oxides having an anatase-type crystal structure, it is possible to synthesize alcohols from carboxylic acids with high selectivity and high yield by using titanium oxide having a specific structure as a reduction catalyst. With this, the present invention has been completed.

That is, a catalyst according to a first aspect of the present invention includes titanium oxide which has an anatase-type crystal structure and has the vertices and the ridge lines, and in a single titanium oxide particle, a vertex density per unit surface area is $8.0 \times 10^{-4}$ nm$^{-2}$ or more, or a vertex density per unit volume is $7.0 \times 10^{-4}$ nm$^{-3}$ or more, and a ridge line density per unit surface area is $5.0 \times 10^{-2}$ nm$^{-1}$ or more, or a ridge line density per unit volume is $8.0 \times 10^{-3}$ nm$^{-2}$ or more.

In the catalyst according to the above aspect, the vertex density per unit surface area may be $2.0 \times 10^{-3}$ nm$^{-2}$ or more, or the vertex density per unit volume may be $1.0 \times 10^{-3}$ nm$^{-3}$ or more, and the ridge line density per unit surface area may be $6.2 \times 10^{-2}$ nm$^{-1}$ or more, or the ridge line density per unit volume may be $1.3 \times 10^{-3}$ nm$^{-2}$ or more.

The catalyst may contain a composite oxide obtained by substituting a part of titanium in the titanium oxide with at least one selected from the group consisting of a metal element other than titanium, an element belonging to the carbon group, an element belonging to the nitrogen group, and an element belonging to the oxygen group other than oxygen.

The metal element other than titanium may be an element belonging to Group 3, Group 4, or Group 5 of the periodic table. The element belonging to Group 4 of the periodic table may be zirconium or hafnium.

The element belonging to Group 5 of the periodic table may be niobium or tantalum.

The electrochemical catalyst according to the above aspect may be for alcohol synthesis.

A complex according to a second aspect of the present invention includes a material having a porous structure and the catalyst according to the first aspect of the present invention.

In the complex according to the above aspect, the material may have a porous structure with conductivity.

The porous structure may have a mesh structure or a three-dimensional network structure.

A membrane electrode assembly according to a third aspect of the present invention includes an anode, a cathode, and an electrolyte membrane, and the cathode-carries the catalyst according to the first aspect of the present invention on a least a surface of the cathode.

An alcohol synthesizing apparatus according to a fourth aspect of the present invention includes an electrosynthesis unit that includes the membrane electrode assembly according to the third aspect of the present invention, first supply means for supplying water or steam to the anode of the electrosynthesis unit, second supply means for supplying carboxylic acids to the cathode of the electrosynthesis unit, and recovery means for recovering alcohols produced in the cathode of the electrosynthesis unit.

The alcohol synthesizing apparatus according to the above aspect may further include first control means for controlling an applied voltage between the anode and the cathode of the electrosynthesis unit.

The alcohol synthesizing apparatus according to the above aspect may further include second control means for controlling a temperature of the electrosynthesis unit.

A method for producing alcohols according to a fifth aspect of the present invention uses the above-described membrane electrode assembly.

A method for producing a cathode according to a sixth aspect of the present invention includes a processing step of processing a surface of titanium having a porous structure with the catalyst in a cathode including the titanium having a porous structure on a surface.

In the method for producing a cathode according to the above aspect, the processing step may include a catalyst forming step of growing the electrochemical catalyst from the surface of the titanium having a porous structure.

In the method for producing a cathode according to the above aspect, the catalyst forming step may include a first hydrothermal treatment step of subjecting the surface of the titanium having a porous structure to a hydrothermal reaction treatment by using an alkaline solution, an ion exchange treatment step of subjecting the surface of the titanium having a porous structure after the first hydrothermal treatment step to an ion exchange treatment by using an acid solution, and a second hydrothermal treatment step of subjecting the surface of the titanium having a porous structure after the ion exchange treatment step to a hydrothermal reaction treatment by using water.

In the method for producing a cathode according to the above aspect, the processing step may include a coating step of coating the surface of the titanium having a porous structure with a solution containing the catalyst, or an immersion step of immersing the surface of the titanium having a porous structure into a solution containing the catalyst.

The method for producing a cathode according to the above aspect may further include a calcination step of performing calcination on the titanium having a porous structure after the coating step or the immersion step.

The solution containing the catalyst may further contain polyethylene glycol.

Advantageous Effects of Invention

According to the above aspects of the present invention, it is possible to provide a titanium oxide electrochemical catalyst having a specific structure capable of synthesizing alcohols from carboxylic acids with high selectivity and high yield, a cathode provided with the electrochemical catalyst, and a membrane electrode assembly for alcohol synthesis provided with the cathode. Further, according to the above aspects of the present invention, it is possible to provide an alcohol synthesizing apparatus provided with the membrane electrode assembly for alcohol synthesis, which is capable of synthesizing alcohols from carboxylic acids with high selectivity and high yield, and a method for synthesizing alcohols using the membrane electrode assembly for alcohol synthesis. Further, according to the above aspects of the present invention, it is possible to provide a method for producing a cathode provided with a titanium oxide electrochemical catalyst having a specific structure capable of synthesizing alcohols from carboxylic acids with high selectivity and high yield.

BRIEF DESCRIPTION OF DRAWINGS

FIG. 14 (center) is a SEM image of a titanium oxide/titanium mesh electrode (center) in which the heating time at 220° C. in the first hydrothermal treatment step is 12 hours. FIG. 14 (right) is a TEM image of a titanium oxide/titanium mesh electrode in which the heating time at 220° C. in the first hydrothermal treatment step is 12 hours.

FIG. 19 (right) is a SEM image after the HF treatment in Production Example 10.

FIG. 22 (right) is a SEM image of a cathode electrode produced in Production Example 11.

Figure 29:
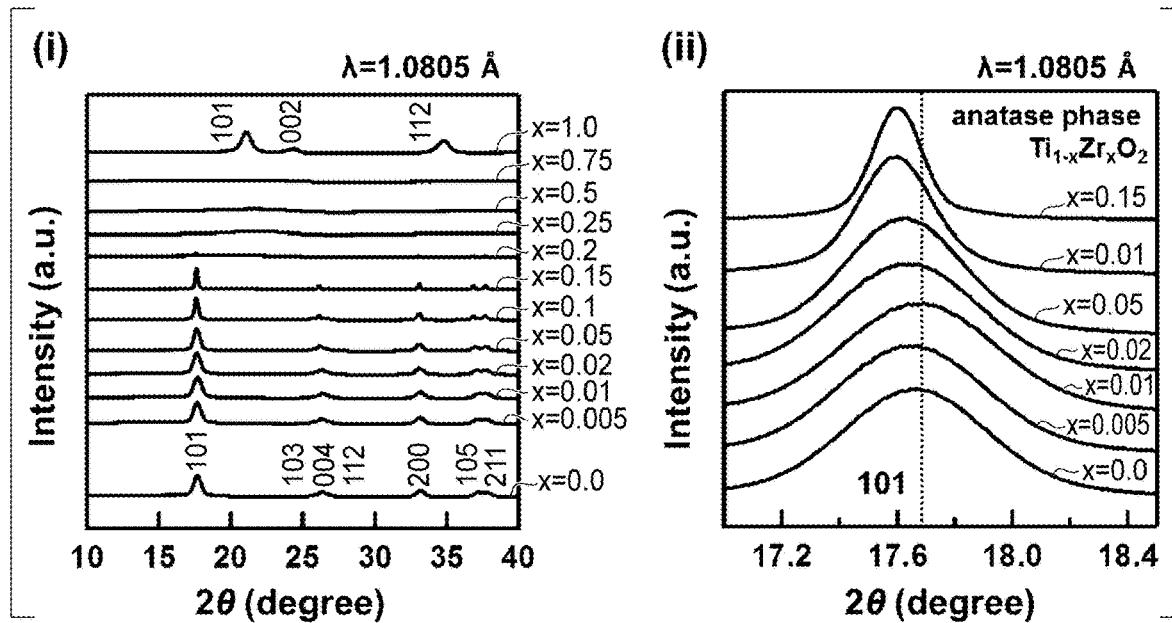

(i) of FIG. 29 is a graph illustrating powder X-ray diffraction patterns of 12 kinds of Ti—Zr composite oxides with different metal compositions of titanium and zirconium in Test Example 11. (ii) of FIG. 29 is a graph illustrating a diffraction peak on a 101 plane of the anatase-type crystal structure of 7 kinds of Ti—Zr composite oxides in a case of X=0.0 to 0.15, among 12 kinds of Ti—Zr composite oxides with different metal compositions of titanium and zirconium in Test Example 11.

Figure 30A:
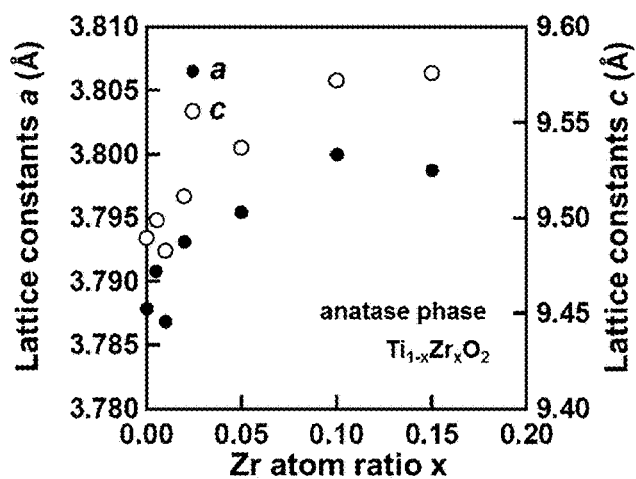

FIG. 30A is a graph illustrating a result of obtaining lattice coefficients a and c of anatase phases by performing fitting analysis through a Rietveld method using a powder X-ray diffraction pattern of the Ti—Zr composite oxide of the anatase-type crystal structure among 12 kinds of Ti—Zr composite oxides with different metal compositions of titanium and zirconium in Test Example 11.

Figure 30B:
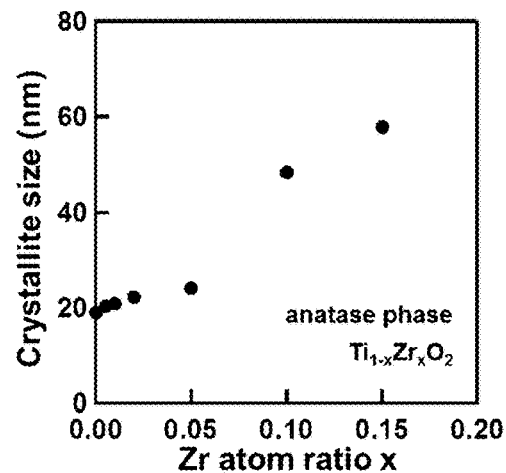

FIG. 30B is a graph illustrating a result of obtaining a crystallite size of an anatase phase by performing fitting analysis through a Rietveld method using a powder X-ray diffraction pattern of the Ti—Zr composite oxide of the anatase-type crystal structure among 12 kinds of Ti—Zr composite oxides with different metal compositions of titanium and zirconium in Test Example 11.

Figure 31:
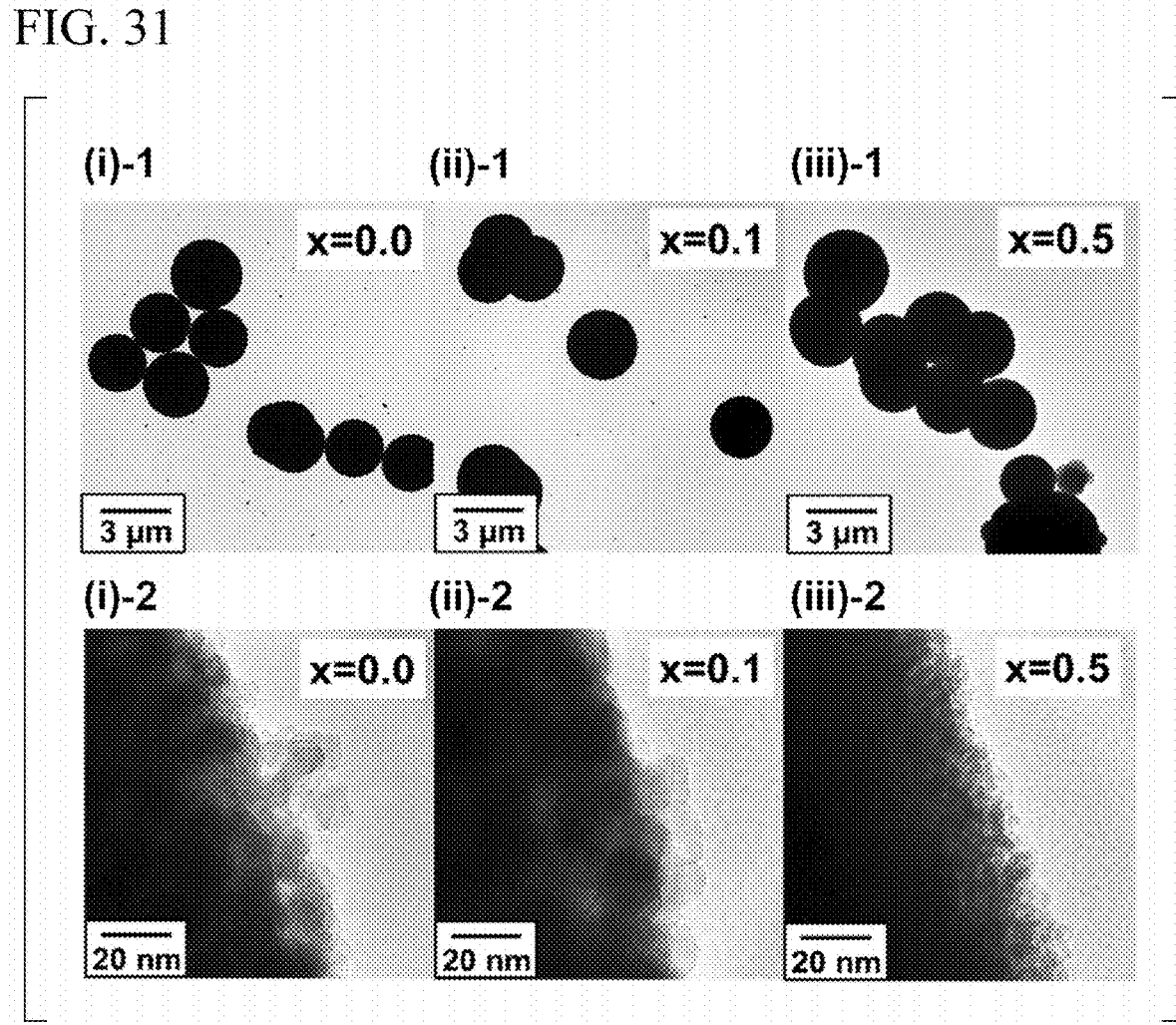

(i)-1 of FIG. 31 is a TEM image of the Ti—Zr composite oxide (that is, titanium oxide) in a case of X=0.0 in Test Example 11. (ii)-1 of FIG. 31 is a TEM image of the Ti—Zr composite oxide ($Ti_{0.9}Zr_{0.1}O_2$) in a case of X=0.1 in Test Example 11. (iii)-1 of FIG. 31 is a TEM image of the Ti—Zr composite oxide ($Ti_{0.5}Zr_{0.5}O_2$) in a case of X=0.5 in Test Example 11. (i)-2 of FIG. 31 is a magnified image of the TEM image in (i)-1. (ii)-2 of FIG. 31 is a magnified image of the TEM image in (ii)-1. (iii)-2 of FIG. 31 is a magnified image of the TEM image in (iii)-1.

Figure 32A:
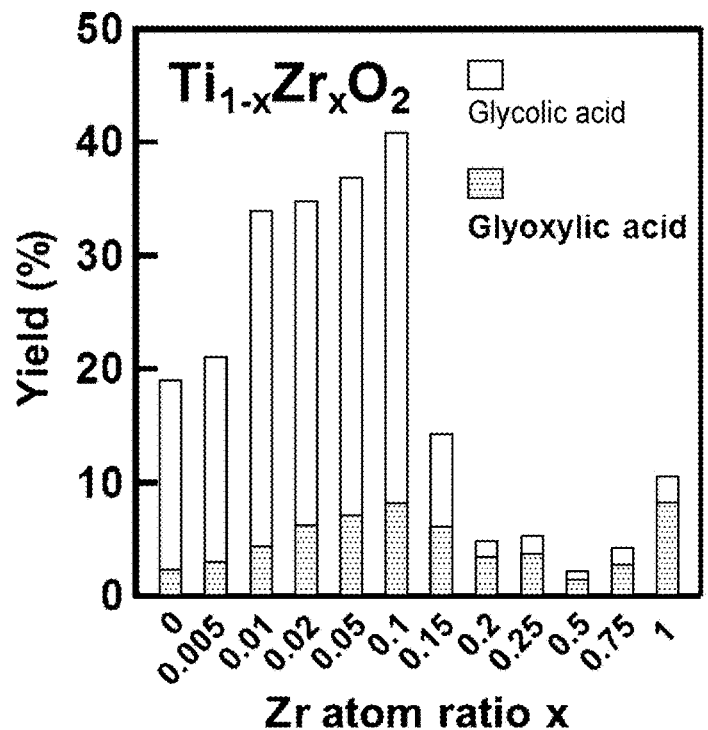

FIG. 32A is a graph illustrating yields of glycolic acid and glyoxylic acid in chronoamperometry using 12 kinds of Ti—Zr composite oxides with different metal compositions of titanium and zirconium in Test Example 12.

Figure 32B:
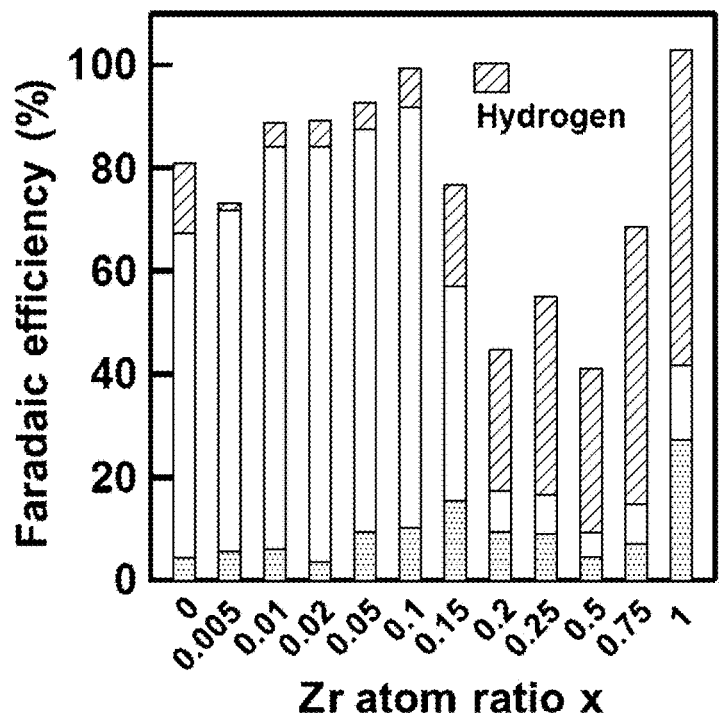

FIG. 32B is a graph illustrating Faraday efficiency of glycolic acid, glyoxylic acid, and hydrogen production in chronoamperometry using 12 kinds of Ti—Zr composite oxides with different metal compositions of titanium and zirconium in Test Example 12.

Figure 33A:
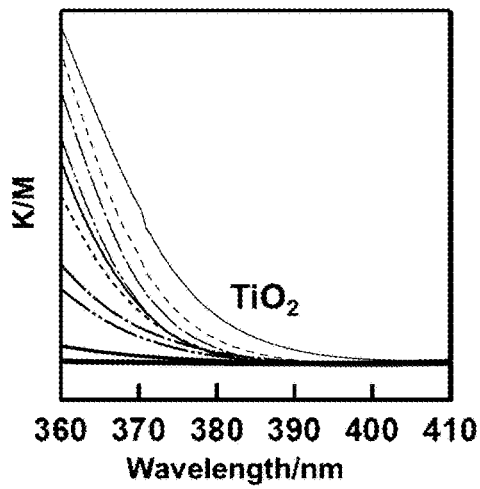

FIG. 33A is a graph illustrating UV-Vis diffuse reflection spectra of 12 kinds of Ti—Zr composite oxides with different metal compositions of titanium and zirconium in Test Example 12.

Figure 33B:
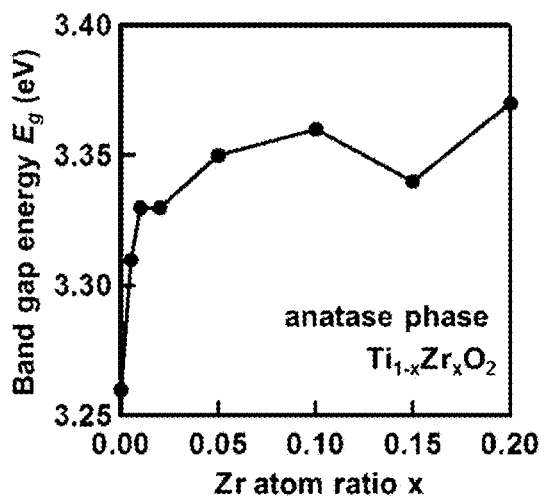

FIG. 33B is a graph illustrating band gap energy (Eg) obtained from an absorption edge of the UV-Vis diffuse reflection spectra of 12 kinds of Ti—Zr composite oxides with different metal compositions of titanium and zirconium in Test Example 12.

Figure 34:
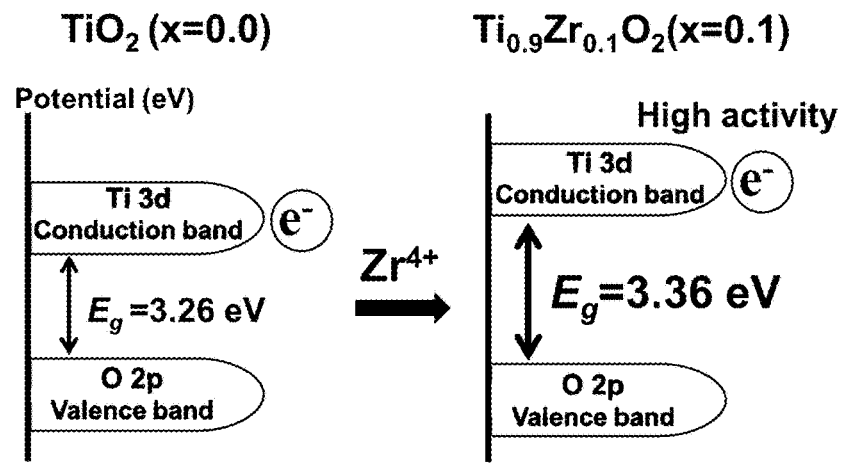

FIG. 34 is a diagram schematically illustrating an energy unit of the band gap energy (Eg) in the Ti—Zr composite oxide of the anatase phase (that is, titanium oxide) in a case of X=0.0 and Ti—Zr composite oxide ($Ti_{0.9}Zr_{0.1}O_2$) in a case of X=0.1 in Test Example 12.

Figure 35:
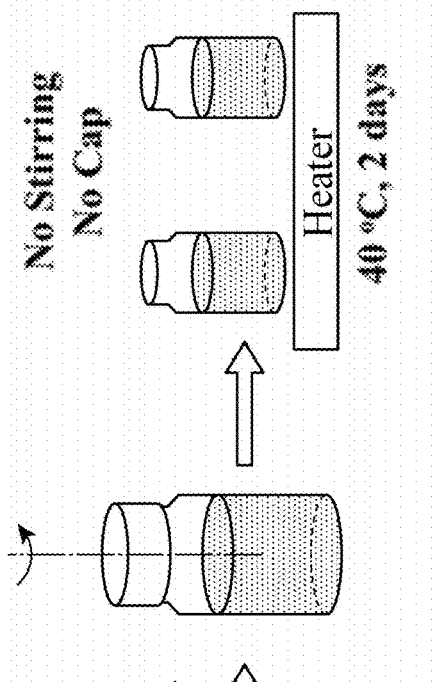
Figure 35:
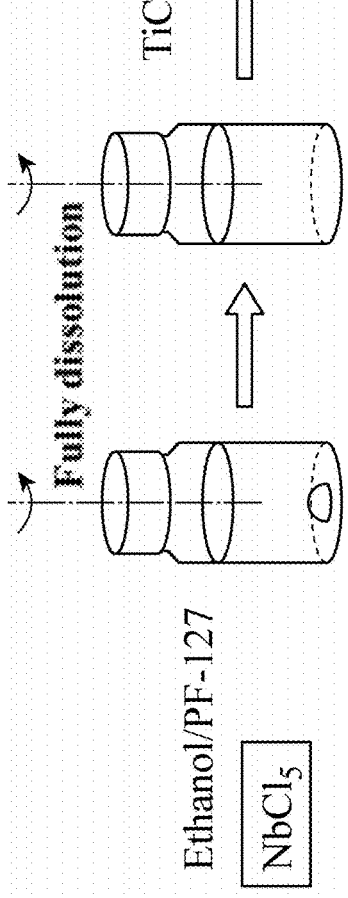
Figure 35:
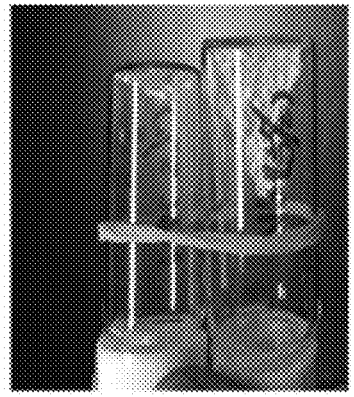
Figure 35:
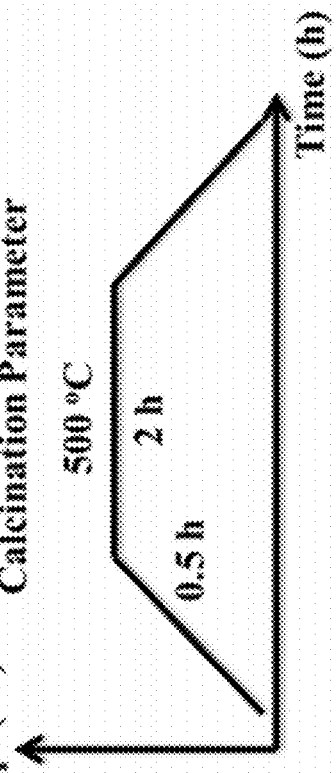

FIG. 35 is a processing diagram illustrating a method for producing a Ti—Nb composite oxide in Production Example 16.

Figure 36:
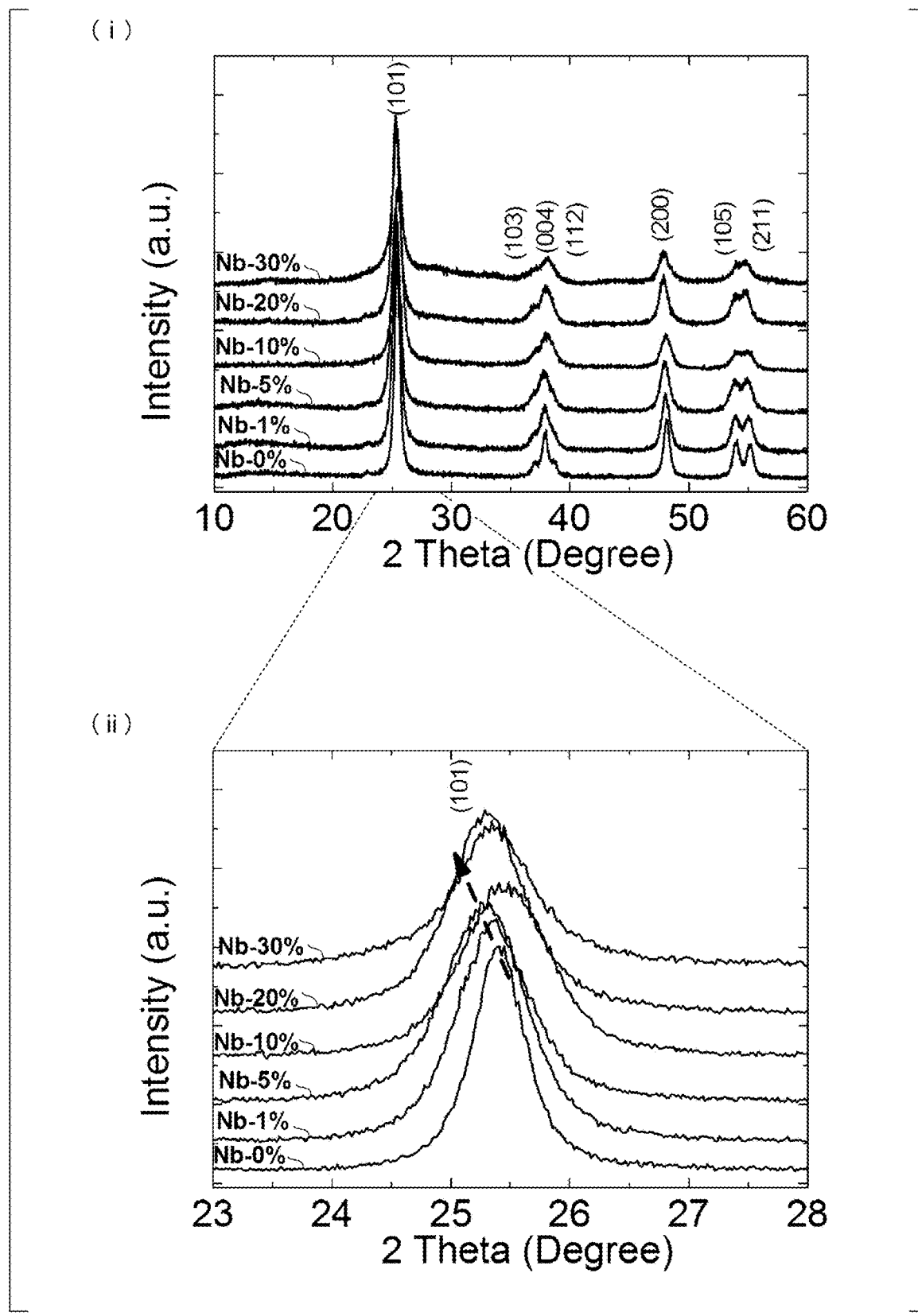

(i) of FIG. 36 is a graph illustrating powder X-ray diffraction patterns of six kinds of Ti—Nb composite oxides with different Nb compounding ratios in Test Example 13. (ii) of FIG. 36 is a graph illustrating a diffraction peak on a 101 plane of the anatase-type crystal structure of the six kinds of Ti—Nb composite oxides with different Nb compounding ratios in Test Example 13.

Figure 37:
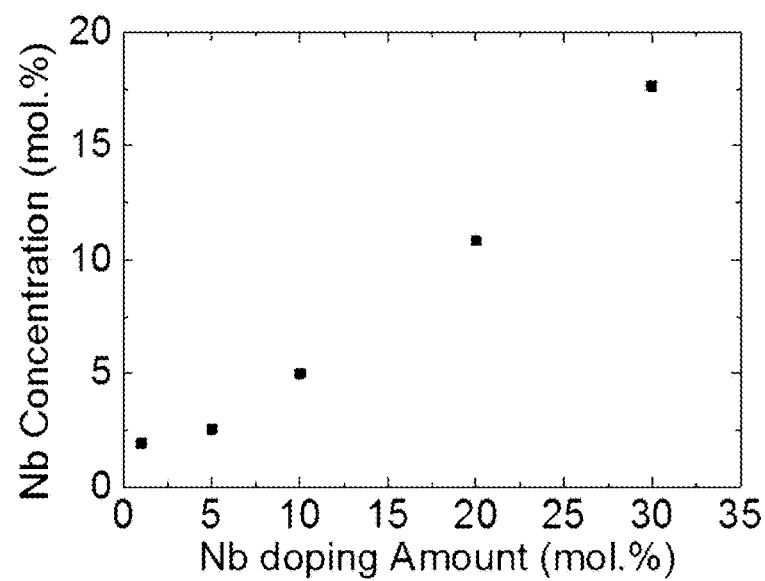

FIG. 37 is a graph illustrating the content of niobium calculated from SEM-EDS measurement results of five kinds of Ti—Nb composite oxides in which niobium is compounded, among six kinds of Ti—Nb composite oxides with different Nb compounding ratios in Test Example 13.

Figure 38:
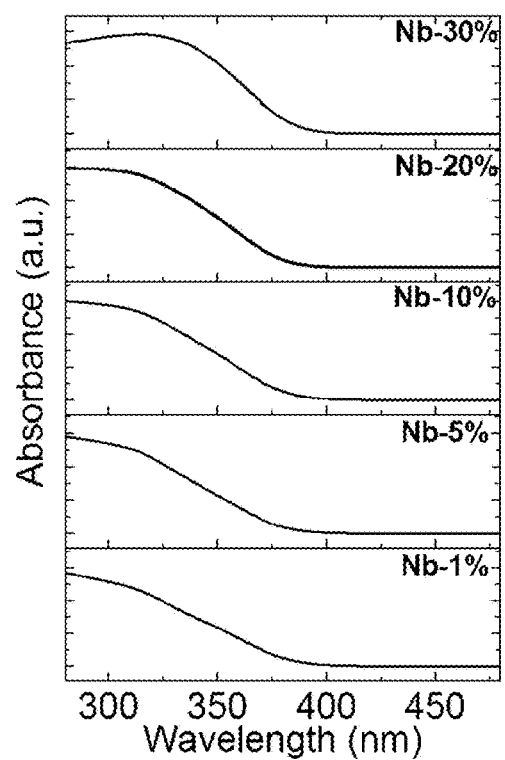

FIG. 38 is a graph illustrating UV-Vis diffuse reflection spectra of five kinds of Ti—Nb composite oxides in which niobium is compounded, among six kinds of Ti—Nb composite oxides with different Nb compounding ratios in Test Example 13.

Figure 39A:
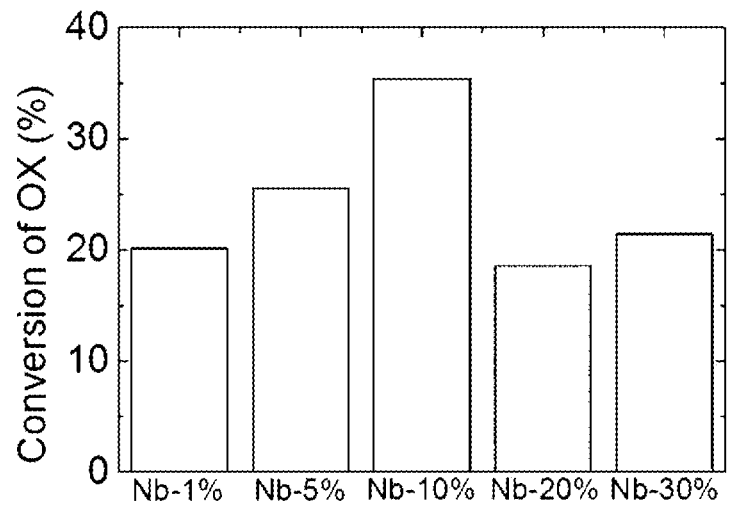

FIG. 39A is a graph illustrating an oxalic acid conversion rate in chronoamperometry using an electrode including five kinds of Ti—Nb composite oxides in which niobium is compounded, among six kinds of Ti—Nb composite oxides with different Nb compounding ratios in Test Example 14.

Figure 39B:
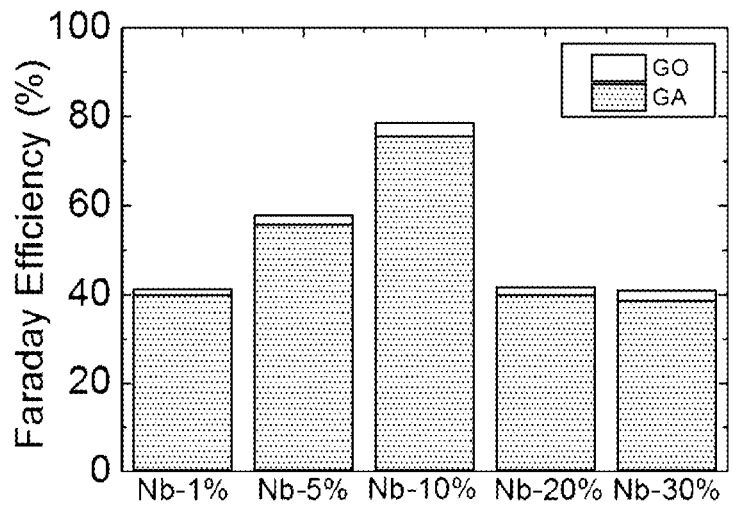

FIG. 39B is a graph illustrating Faraday efficiency of glycolic acid and glyoxylic acid production in chronoamperometry using an electrode including five kinds of Ti—Nb composite oxides in which niobium is compounded, among six kinds of Ti—Nb composite oxides with different Nb compounding ratios in Test Example 14.

Figure 40:
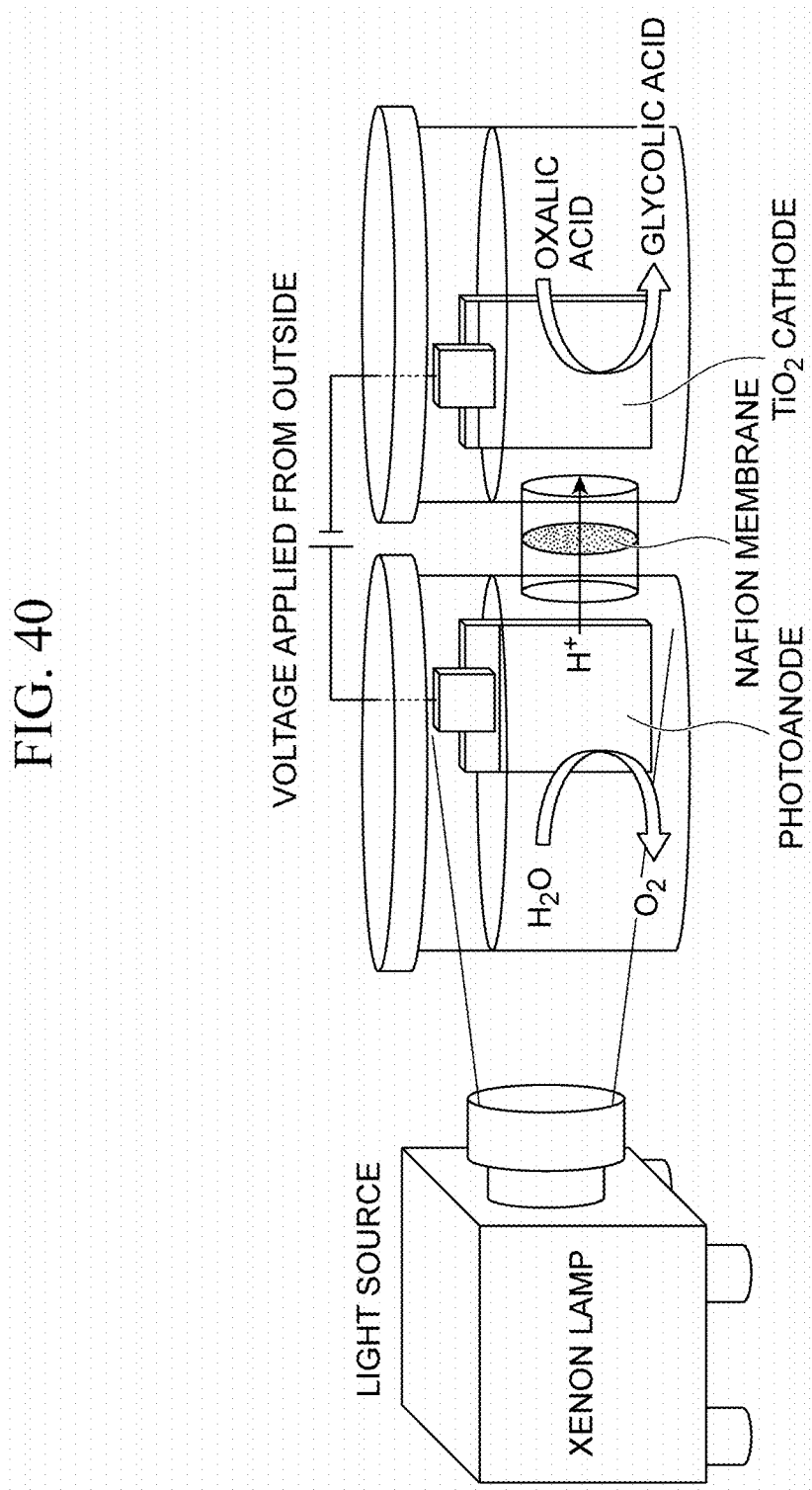

FIG. 40 is a schematic configuration diagram of a two-compartment type glass cell in Test Example 15.

Figure 41A:
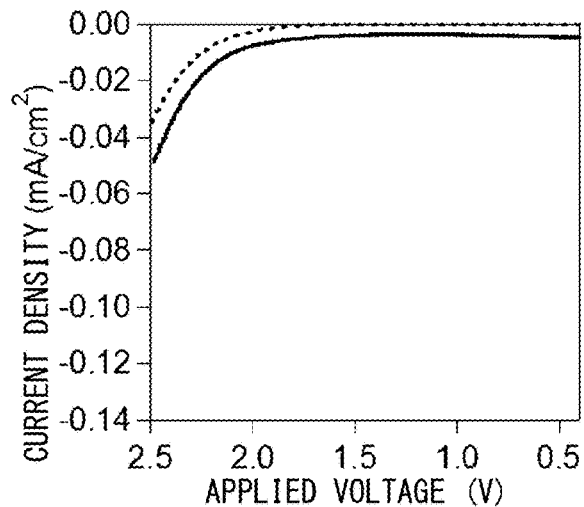

FIG. 41A is a graph illustrating a current voltage curve in a dark place and under irradiation with light in an electrochemical reaction test using a $Ga_2O_3$ photoanode and a titanium oxide cathode coated with TIO-8 in Test Example 15.

Figure 41B:
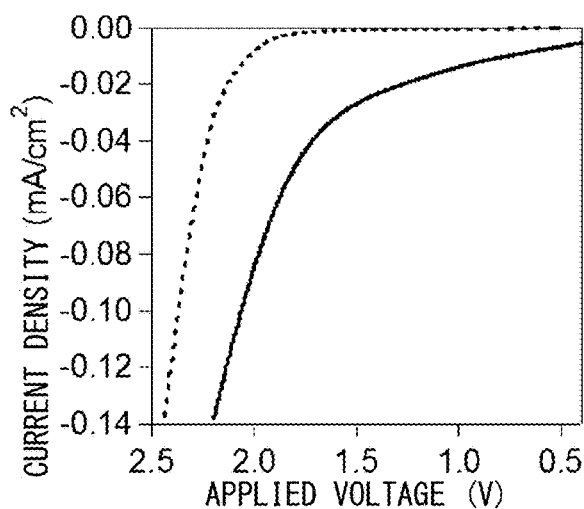

FIG. 41B is a graph illustrating a current voltage curve in the dark place and under irradiation with light in an electrochemical reaction test using a $BiVO_4$ photoanode and a titanium oxide cathode coated with TIO-8 in Test Example 15.

Figure 41C:
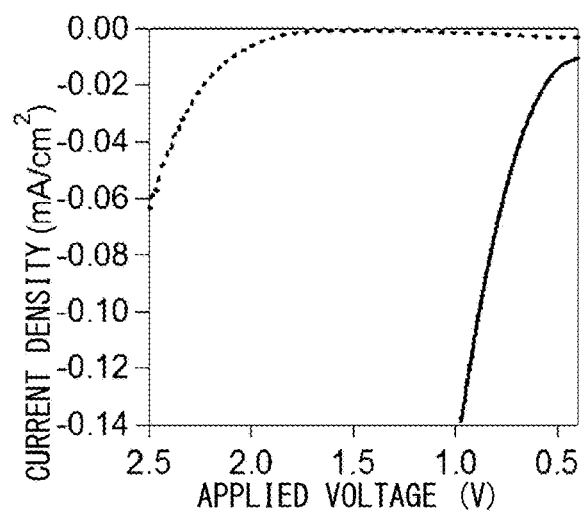

FIG. 41C is a graph illustrating a current voltage curve in the dark place and under irradiation with light in an electrochemical reaction test using a $WO_3$ photoanode and a titanium oxide cathode coated with TIO-8 in Test Example 15.

Figure 42:
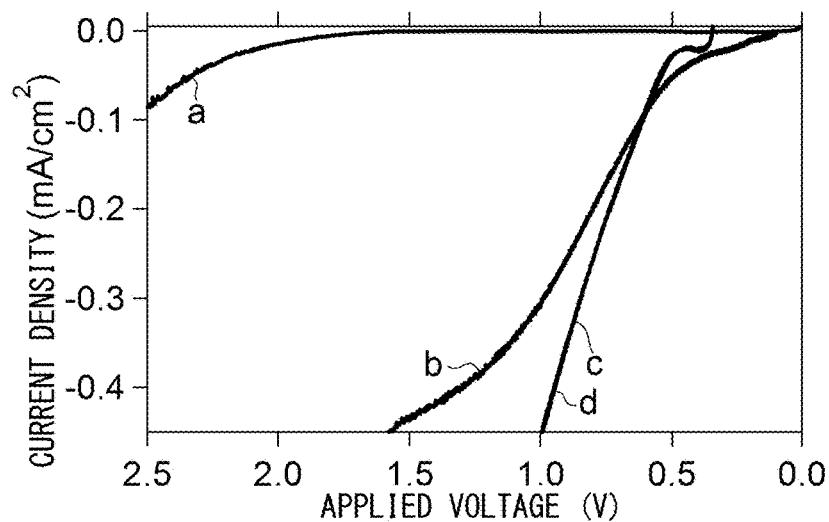

FIG. 42 is a graph illustrating a current voltage curve in the dark place and under irradiation with light in an electrochemical reaction test using a $WO_3$ photoanode and a titanium oxide cathode coated with TIO-7 in Test Example 15.

Figure 43:
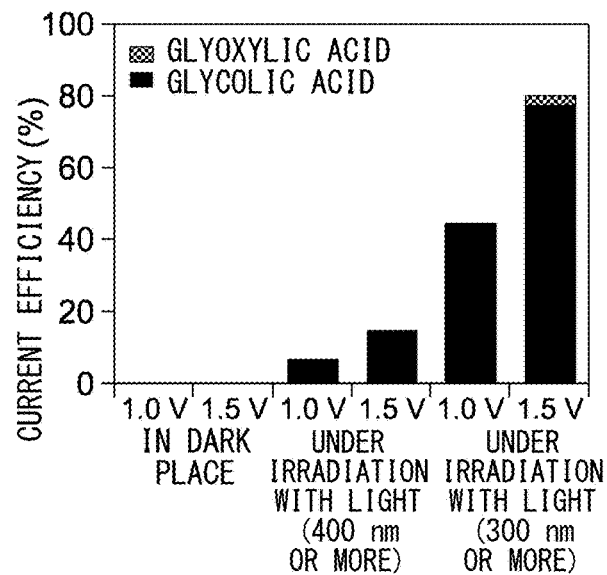

FIG. 43 is a graph illustrating current efficiency of an oxalic acid reduction product (glyoxylic acid and glycolic acid) in chronoamperometry using a $WO_3$ photoanode and titanium oxide cathode coated with TIO-7 in Test Example 15.

Figure 44:
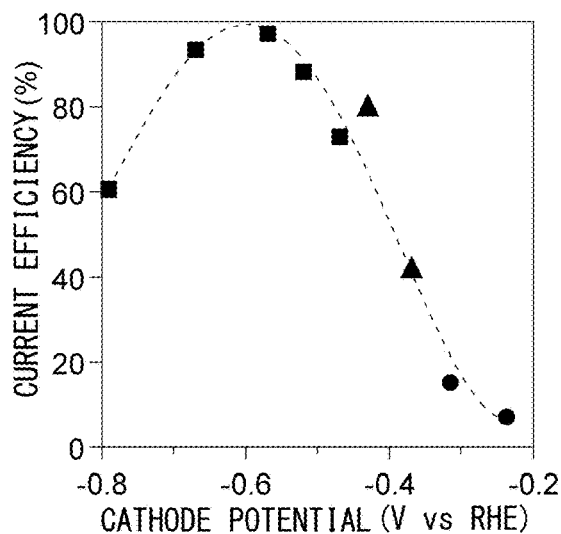

FIG. 44 is a graph illustrating current efficiency of an oxalic acid reduction product in chronoamperometry using a $WO_3$ photoanode or a platinum anode and a titanium oxide cathode coated with TIO-7 in Test Example 15.

Figure 45A:
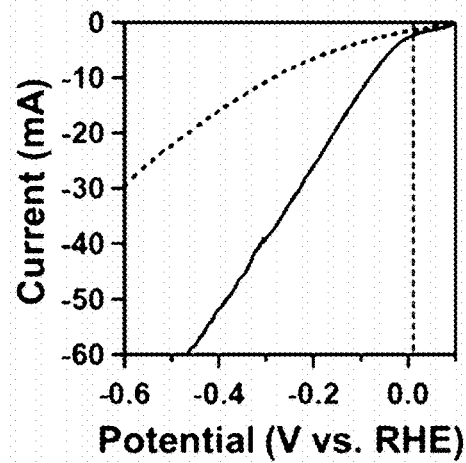

FIG. 45A is a graph illustrating a cyclic voltammogram in cyclic voltammetry using the titanium oxide/titanium mesh electrode by using glyoxylic acid as a substrate in Test Example 16.

Figure 45B:
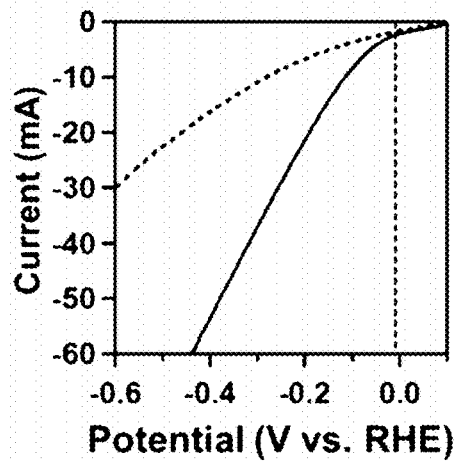

FIG. 45B is a graph illustrating a cyclic voltammogram in cyclic voltammetry using the titanium oxide/titanium mesh electrode by using pyruvic acid as a substrate in Test Example 16.

Figure 45C:
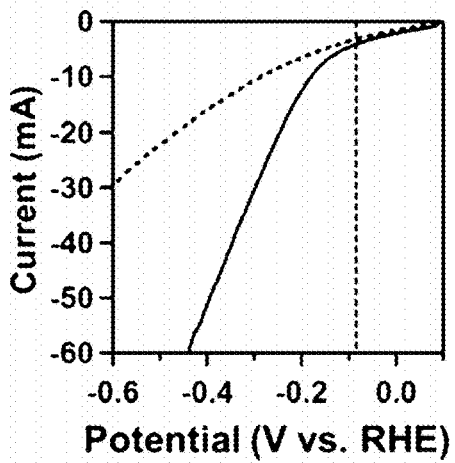

FIG. 45C is a graph illustrating a cyclic voltammogram in cyclic voltammetry using the titanium oxide/titanium mesh electrode by using trimethyl pyruvic acid as a substrate in Test Example 16.

Figure 46A:
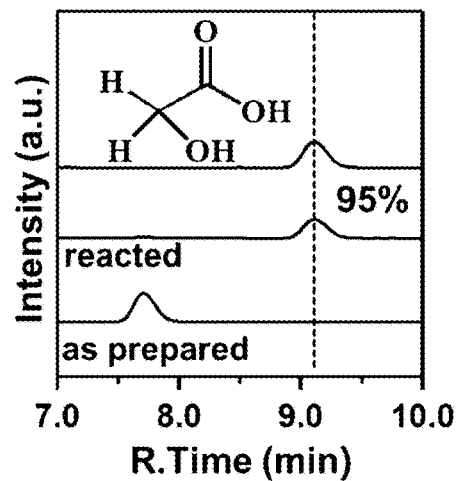

FIG. 46A is a graph illustrating a chromatogram of a reaction solution of the substrate chronoamperometry using the titanium oxide/titanium mesh electrode by using glyoxylic acid as a substrate in Test Example 16.

Figure 46B:
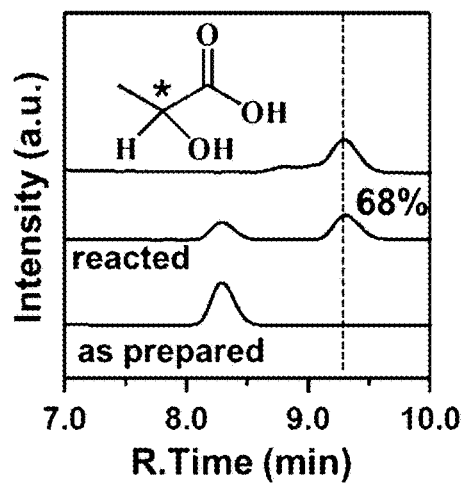

FIG. 46B is a graph illustrating a chromatogram of a reaction solution of the substrate chronoamperometry using the titanium oxide/titanium mesh electrode by using pyruvic acid as a substrate in Test Example 16.

Figure 46C:
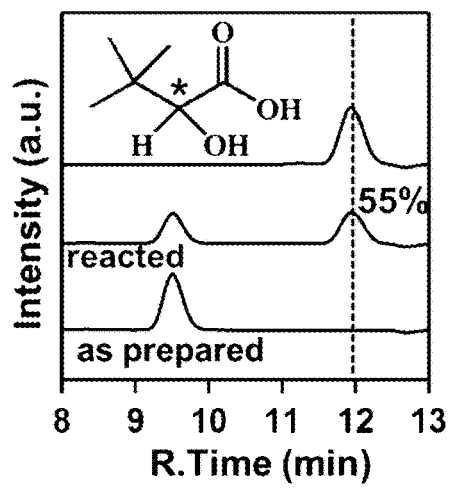

FIG. 46C is a graph illustrating a chromatogram of a reaction solution of the substrate chronoamperometry using the titanium oxide/titanium mesh electrode by using trimethyl pyruvic acid as a substrate in Test Example 16.

Figure 47:
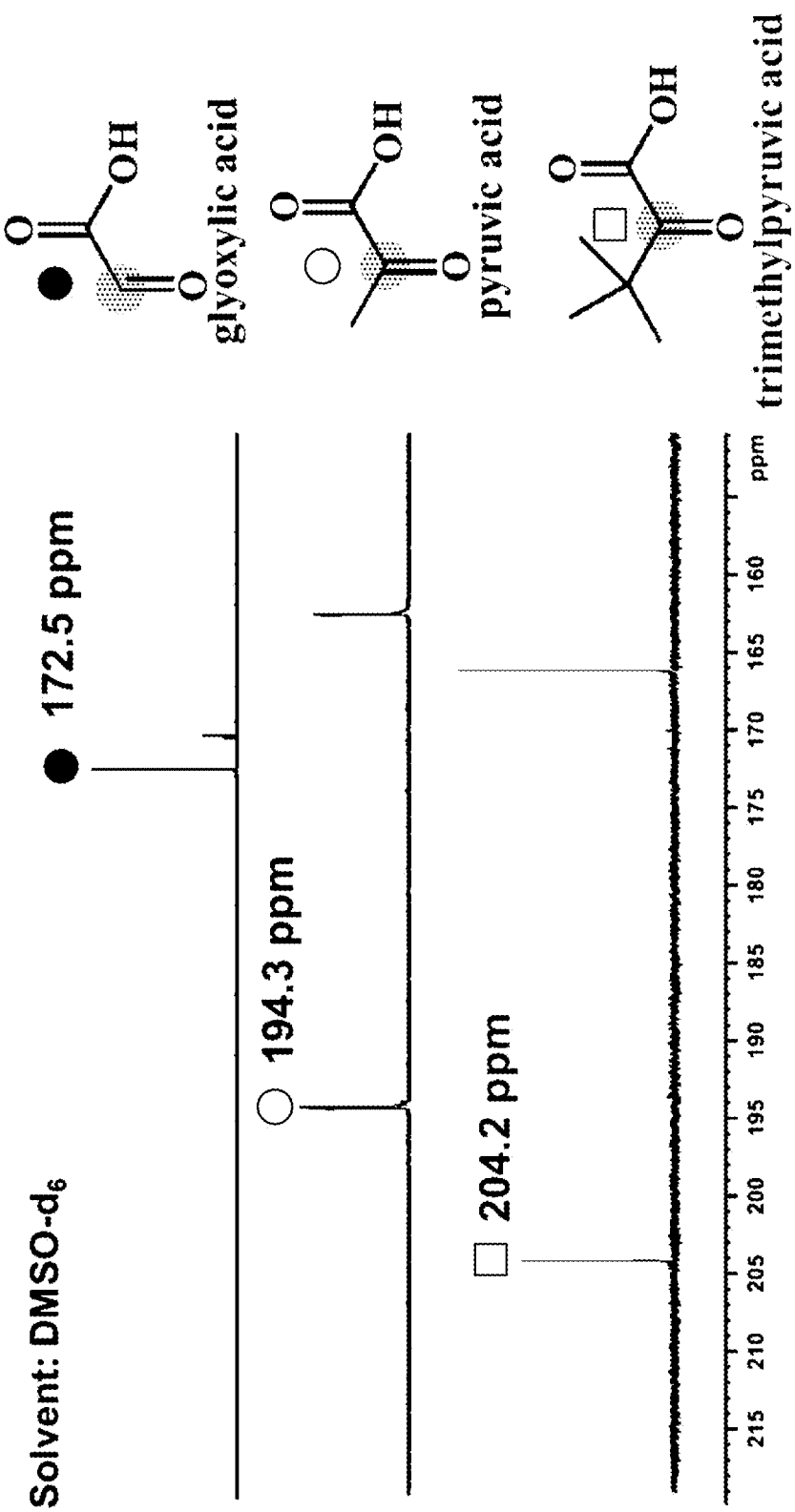

FIG. 47 is a graph illustrating $^{13}C$-NMR measurement results of glyoxylic acid, pyruvic acid, and trimethyl pyruvic acid in Test Example 16.

Figure 48A:
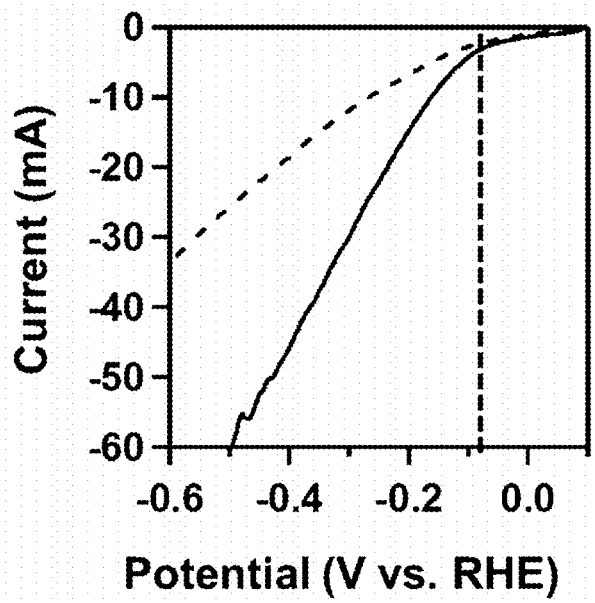

FIG. 48A is a graph illustrating a cyclic voltammogram in cyclic voltammetry using the titanium oxide/titanium mesh electrode by using 2-oxopentanoic acid as a substrate in Test Example 17.

Figure 48B:
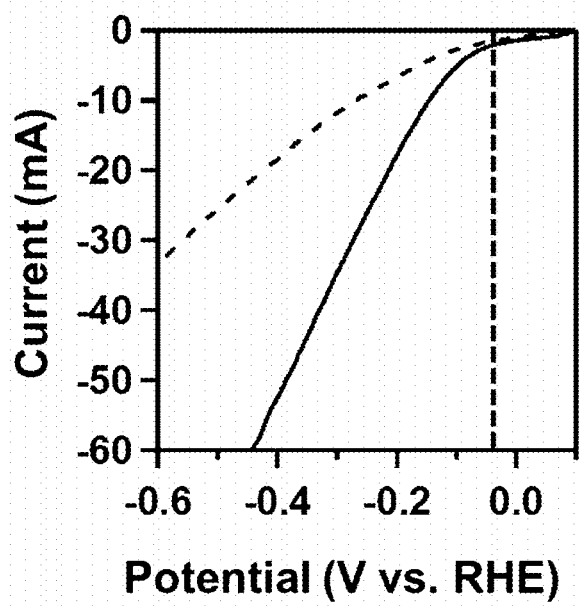

FIG. 48B is a graph illustrating a cyclic voltammogram in cyclic voltammetry using the titanium oxide/titanium mesh electrode by using 2-oxoglutaric acid as a substrate in Test Example 17.

Figure 49A:
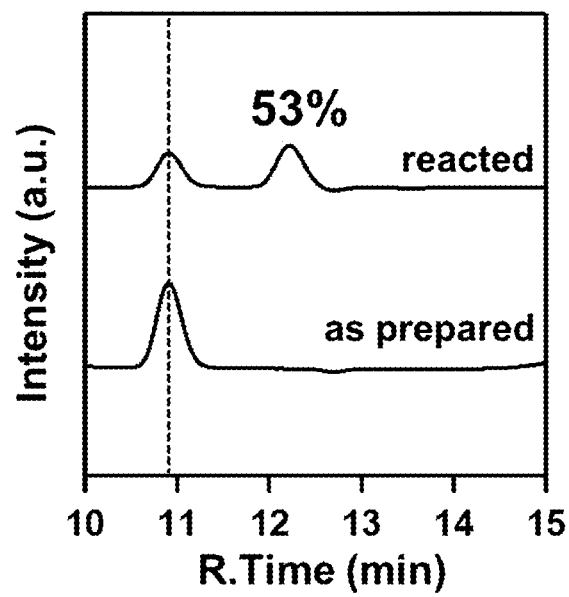

FIG. 49A is a graph illustrating a chromatogram of a reaction solution of the substrate chronoamperometry using the titanium oxide/titanium mesh electrode by using 2-oxopentanoic acid as a substrate in Test Example 17.

Figure 49B:
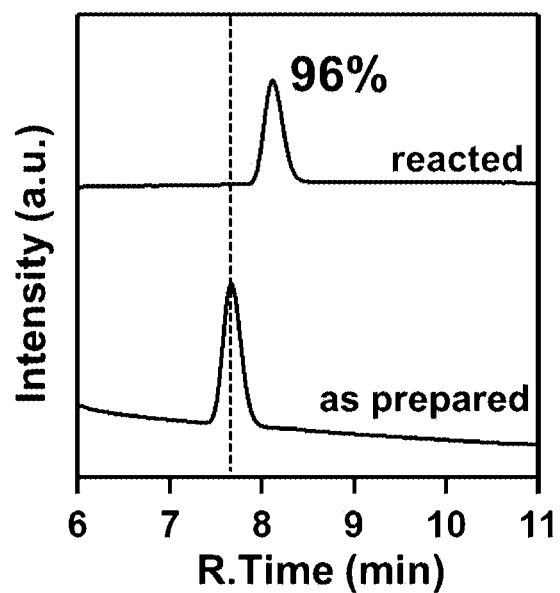

FIG. 49B is a graph illustrating a chromatogram of a reaction solution of the substrate chronoamperometry using the titanium oxide/titanium mesh electrode by using 2-oxoglutaric acid as a substrate in Test Example 17.

Figure 50A:
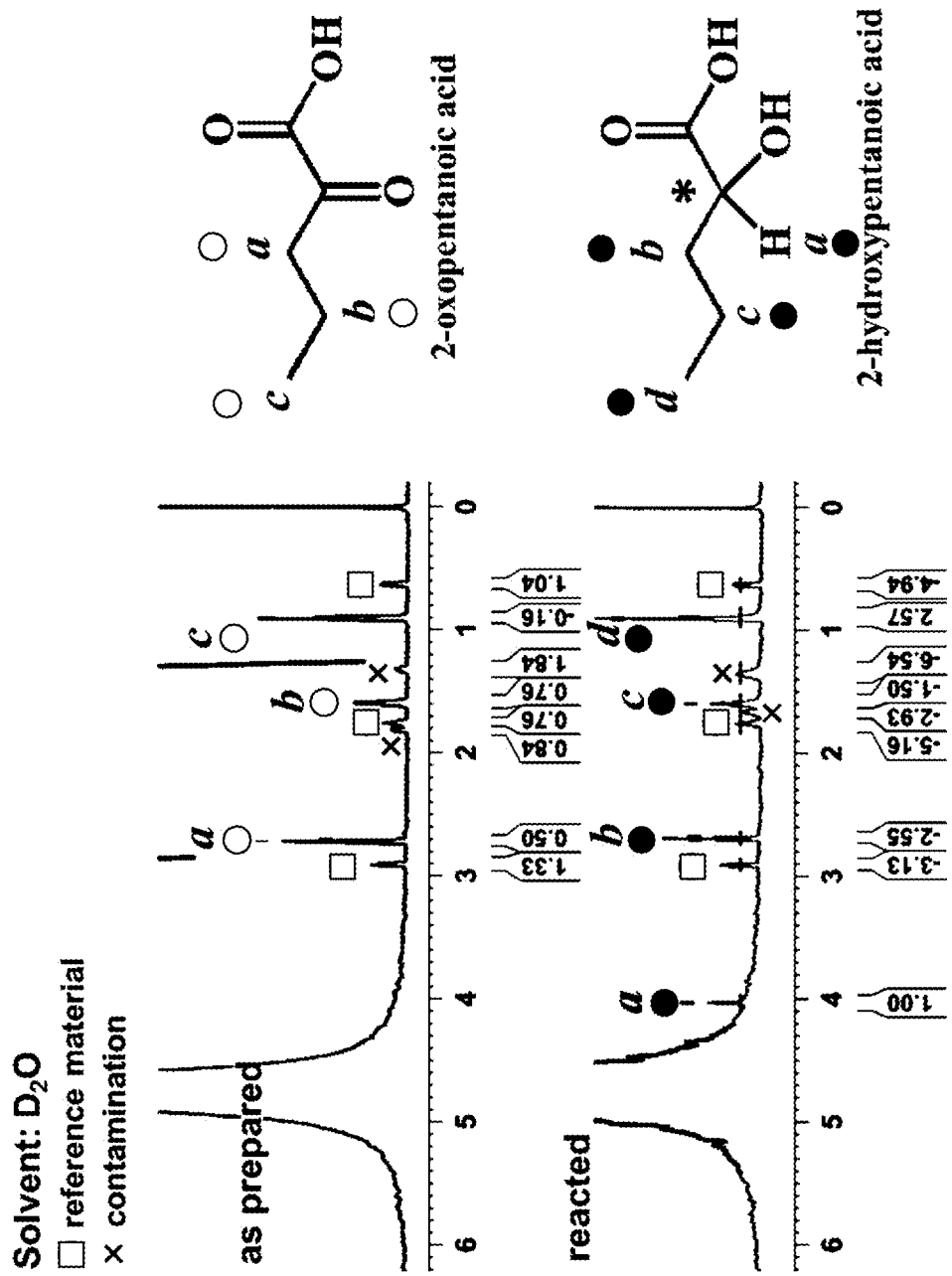

FIG. 50A is a graph illustrating $^1H$-NMR measurement results of a raw material solution (2-oxopentanoic acid) and a reaction solution (2-hydroxypentanoic acid) in Test Example 17.

Figure 50B:
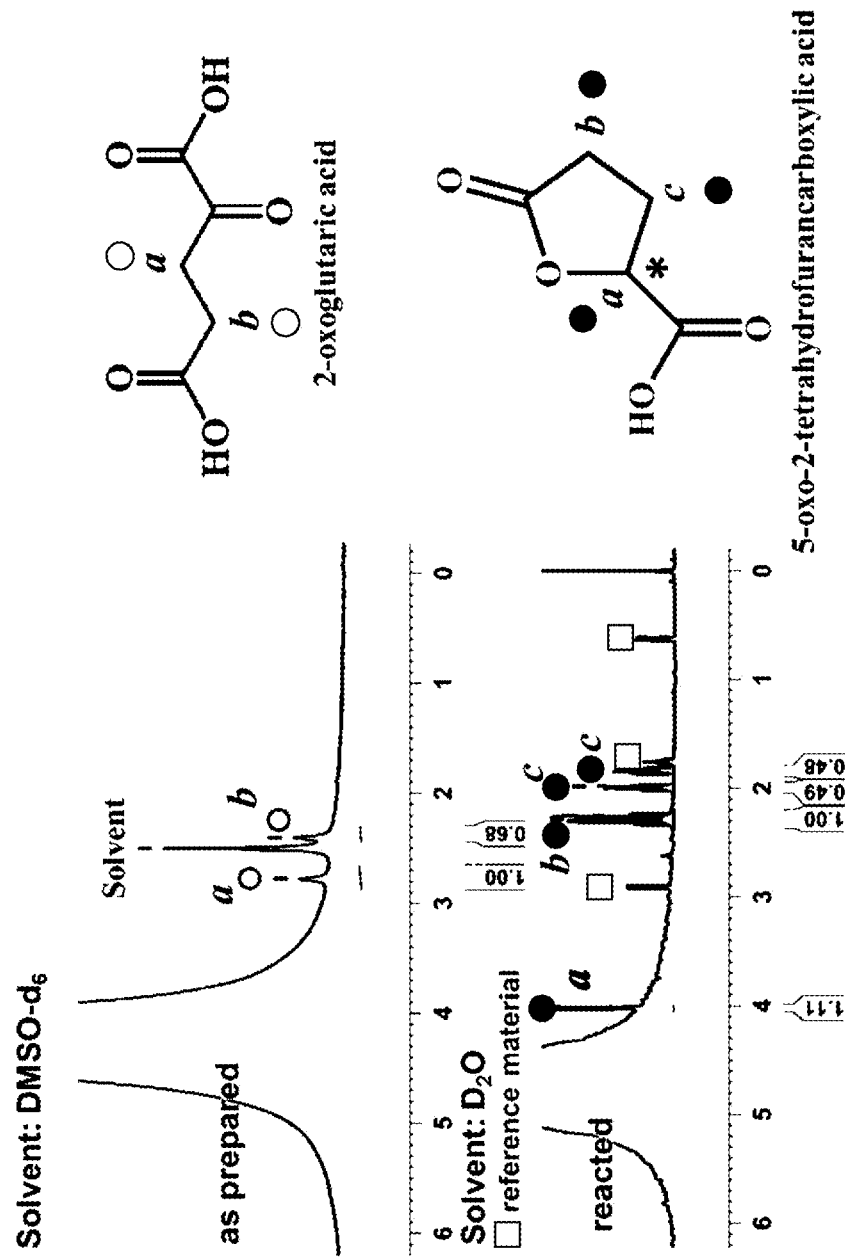

FIG. 50B is a graph illustrating $^1H$-NMR measurement results of a raw material solution (2-oxoglutaric acid) and a reaction solution (5-oxo-2-tetrahydrofurancarboxylic acid) in Test Example 17.

Figure 51:
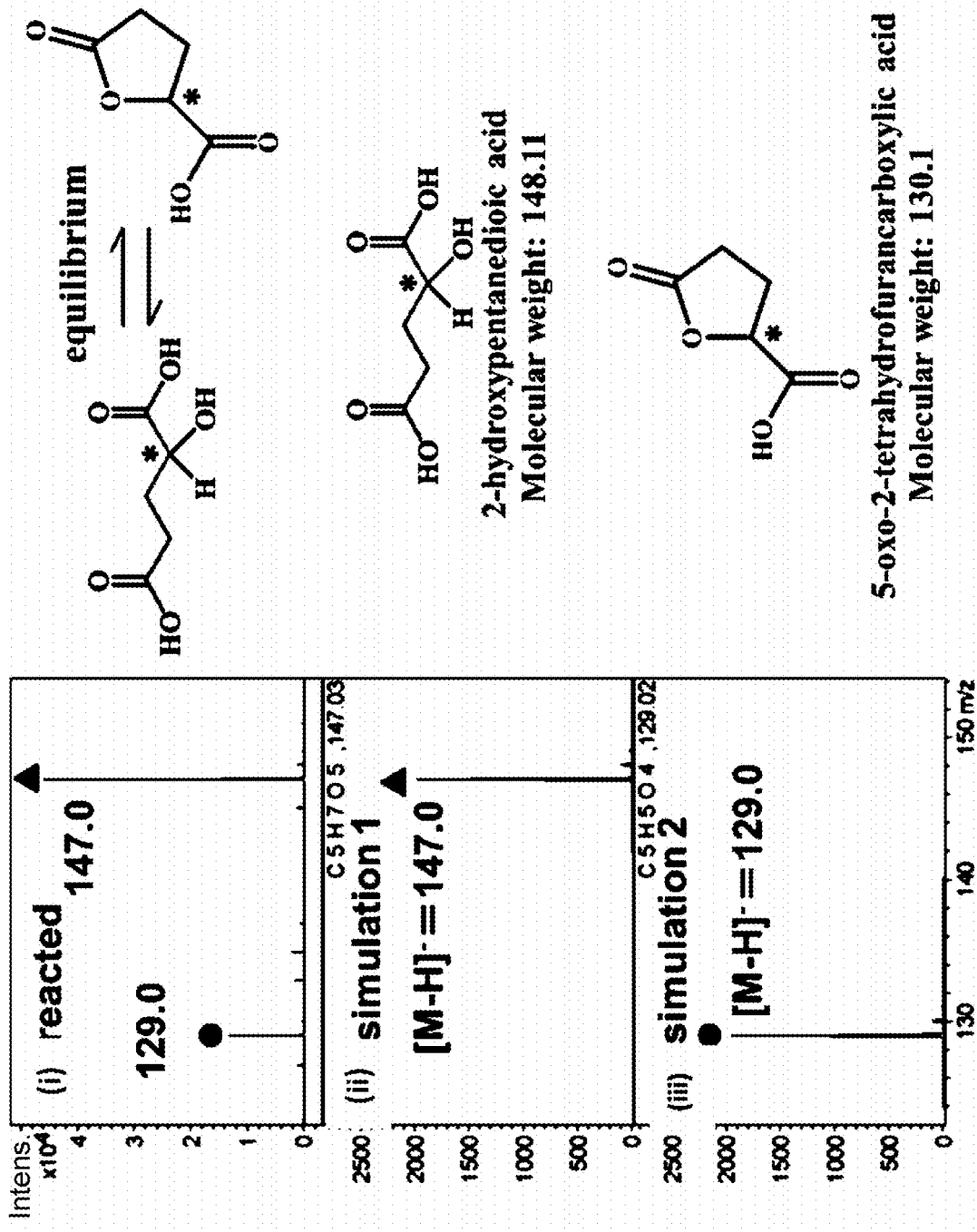

FIG. 51 is a graph illustrating mass spectrometry results of a reaction solution (i), 2-hydroxyglutaric acid (ii), and 5-oxo-2-tetrahydrofurancarboxylic acid (iii) of the substrate in chronoamperometry using the titanium oxide/titanium mesh electrode by using 2-oxoglutaric acid as a substrate in Test Example 17.

Figure 52:
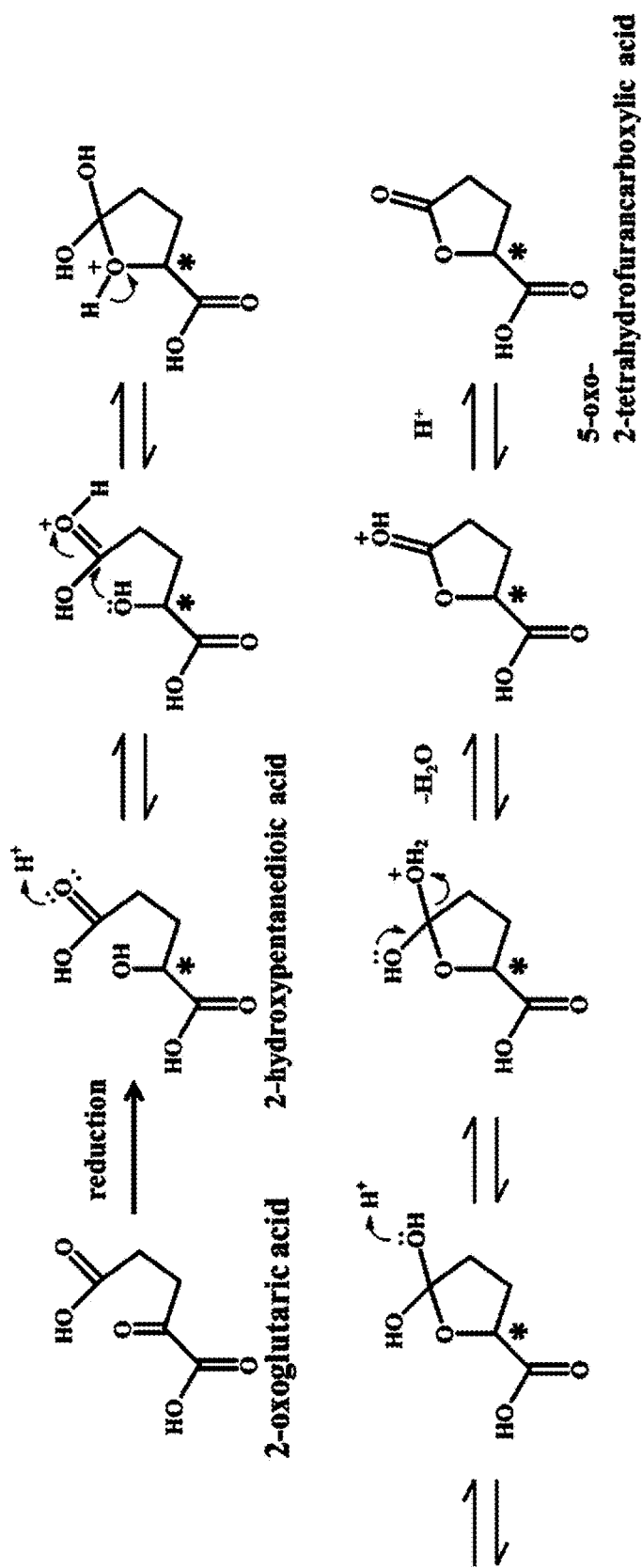

FIG. 52 is a diagram illustrating a synthetic route from 2-hydroxyglutaric acid which is a reduction product of 2-oxoglutaric acid to 5-oxo-2-tetrahydrofurancarboxylic acid by a dehydration reaction in Test Example 17.

Figure 53:
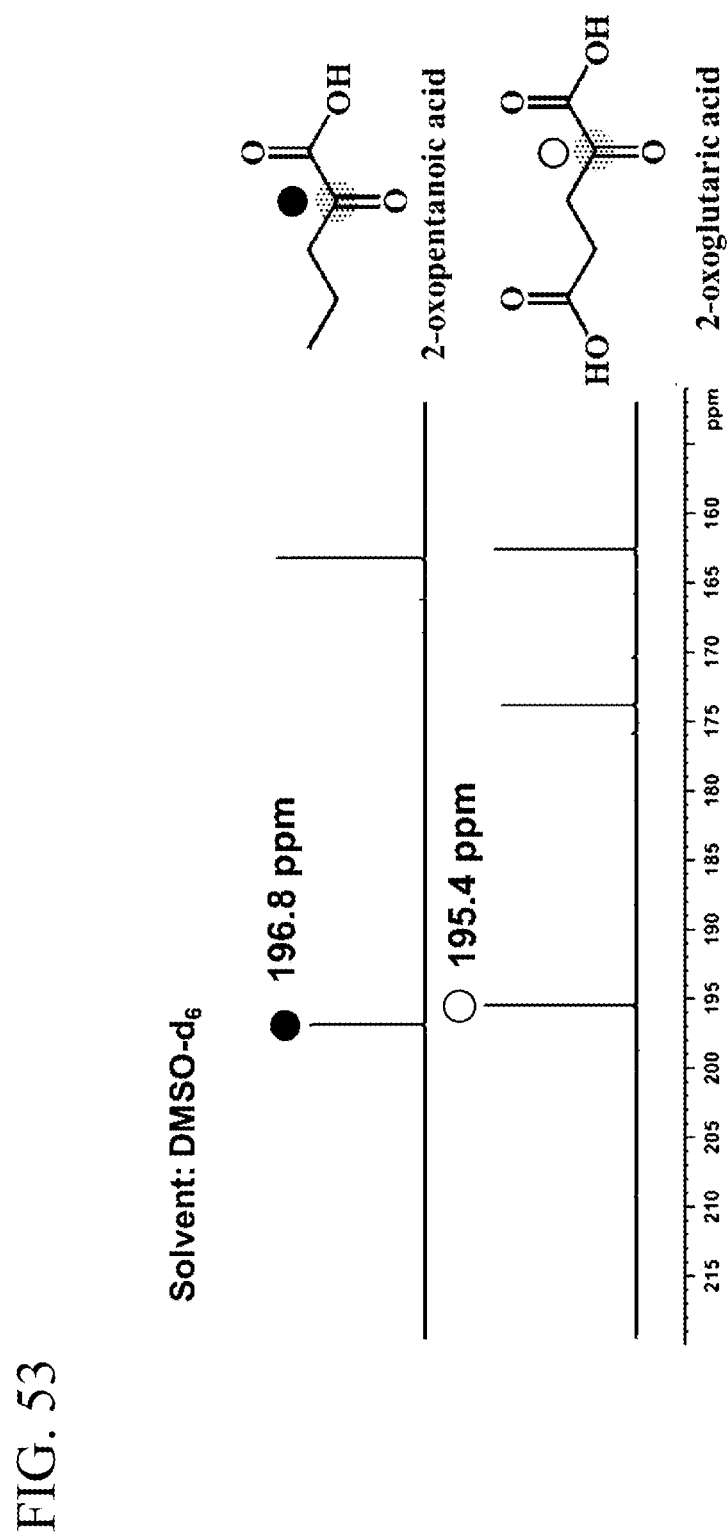

FIG. 53 is a graph illustrating $^{13}C$-NMR measurement results of 2-oxopentanoic acid and 2-oxoglutaric acid in Test Example 17.

DESCRIPTION OF EMBODIMENTS

<<Titanium Oxide Electrochemical Catalyst>>

The electrochemical catalyst according to one embodiment of the present invention contains titanium oxide having an anatase-type crystal structure. In a single titanium oxide particle, a vertex density per unit surface area is $8.0 \times 10^{-4}$ $nm^{-2}$ or more, or a vertex density per unit volume is $7.0 \times 10^{-4}$ $nm^{-3}$ or more, and a ridge line density per unit surface area is $5.0 \times 10^{-2}$ $nm^{-1}$ or more, or a ridge line density per unit volume is $8.0 \times 10^{-3}$ $nm^{-2}$ or more.

Alternatively, in the single titanium oxide particle, the vertex density per unit surface area is $8.0 \times 10^{-4}$ $nm^{-2}$ or more, and the ridge line density per unit surface area is $5.0 \times 10^{-2}$ $nm^{-1}$ or more, or the ridge line density per unit volume is $8.0 \times 10^{-3}$ $nm^{-2}$ or more.

Alternatively, in the single titanium oxide particle, the vertex density per unit volume is $7.0 \times 10^{-4}$ $nm^{-3}$ or more, and the ridge line density per unit surface area is $5.0 \times 10^{-2}$ $nm^{-1}$ or more, or the ridge line density per unit volume is $8.0 \times 10^{-3}$ $nm^{-2}$ or more.

Alternatively, in the single titanium oxide particle, the vertex density per unit surface area is $8.0 \times 10^{-4}$ $nm^{-2}$ or more, or the vertex density per unit volume is $7.0 \times 10^{-4}$ $nm^{-3}$ or more, and the ridge line density per unit surface area is $5.0 \times 10^{-2}$ $nm^{-1}$ or more.

Alternatively, in the single titanium oxide particle, the vertex density per unit surface area is $8.0 \times 10^{-4}$ $nm^{-2}$ or more, or the vertex density per unit volume is $7.0 \times 10^{-4}$ $nm^{-3}$ or more, or the ridge line density per unit volume is $8.0 \times 10^{-3}$ $nm^{-2}$ or more.

Alternatively, in the single titanium oxide particle, the vertex density per unit surface area is $8.0 \times 10^{-4}$ nm$^{-2}$ or more, and the ridge line density per unit surface area is $5.0 \times 10^{-2}$ nm$^{-1}$ or more.

Alternatively, in the single titanium oxide particle, the vertex density per unit surface area is $8.0 \times 10^{-4}$ nm$^{-2}$ or more, and the ridge line density per unit volume is $8.0 \times 10^{-3}$ nm$^{-2}$ or more.

Alternatively, in the single titanium oxide particle, the vertex density per unit volume is $7.0 \times 10^{-4}$ nm$^{-3}$ or more, and the ridge line density per unit surface area is $5.0 \times 10^{-2}$ nm$^{-1}$ or more.

Alternatively, in the single titanium oxide particle, the vertex density per unit volume is $7.0 \times 10^{-4}$ nm$^{-3}$ or more, and the ridge line density per unit volume is $8.0 \times 10^{-3}$ nm$^{-2}$ or more.

The electrochemical catalyst of this embodiment is titanium oxide having an anatase-type crystal structure, and has an active site of sufficient density necessary for reduction of carboxylic acids by having the above-described specific structure. For this reason, under relatively mild conditions, alcohols can be synthesized from carboxylic acids with high selectivity and high yield.

The expression "relatively mild conditions" in the present specification means conditions of a temperature which is, for example, 150° C. or lower, is preferably 130° C. or lower, and is more preferably 120° C. or lower. Also, it means conditions of a pressure which is, for example, 5 MPa or lower, is preferably 3 MPa or lower, and is more preferably 2 MPa or lower.

Note that, in this embodiment, examples of the carboxylic acids corresponding to the substrate of the electrochemical catalyst include the following compounds, but are not limited thereto.

(1) Monovalent carboxylic acids such as formic acid, acetic acid, propionic acid, butyric acid, valeric acid, linoleic acid, linolenic acid, and acrylic acid.

(2) Divalent carboxylic acids such as oxalic acid, malonic acid, succinic acid, glutaric acid, adipic acid, maleic acid, and fumaric acid.

(3) Trivalent or higher polyvalent carboxylic acids such as 1,2,3-propanetricarboxylic acid and aconitic acid.

(4) Aromatic carboxylic acids such as benzoic acid, phthalic acid, isophthalic acid, terephthalic acid, salicylic acid, and gallic acid.

(5) Hydroxy acids such as lactic acid, malic acid, and citric acid.

(6) Keto acids including α-keto acids such as glyoxylic acid, pyruvic acid, trimethyl pyruvic acid, oxaloacetic acid, 2-oxopentanoic acid, and 2-oxoglutaric acid; β-keto acids such as acetoacetic acid, oxaloacetic acid, and acetone dicarboxylic acid; and γ-keto acids such as levulinic acid and α-ketoglutaric acid.

Among them, as the carboxylic acid which corresponds to the substrate of the electrochemical catalyst, a carboxylic acid having a carboxy group at an α position or a carboxylic acid having a ketone group at the α position is preferable, polyvalent carboxylic acid having a carboxy group at the α-position or α-keto acid is more preferable, and oxalic acid, glyoxylic acid, pyruvic acid, trimethyl pyruvic acid, oxaloacetic acid, 2-oxopentanoic acid, or 2-oxoglutaric acid is still more preferable.

When the titanium oxide in this embodiment has the above-described specific structure, a carboxy group or a ketone group present at the α-position can be hydrogenated more selectively and carboxylic acids can be reduced to alcohols with high yield.

The alcohol produced by reducing the carboxylic acids in this embodiment is a hydrocarbon compound having at least one hydroxy (hydroxyl) group in the molecule. Specific examples of the alcohol include methanol, ethanol, propanol, butanol, isopropyl alcohol, pentanol, ethylene glycol, glycolic acid, lactic acid, 2-hydroxy-3,3-dimethyl butyric acid, 2-hydroxy pentanoic acid, and 2-hydroxy glutaric acid. In this embodiment, it is possible to obtain alcohols corresponding to the carboxylic acids which become a substrate.

<Structure of Titanium Oxide>

A particle in the titanium oxide in this embodiment has an anatase-type structure, and a vertex and a ridge line are preferably formed into a particle shape present at high density. A plurality of crystal planes are observed on the surface of the titanium oxide particle in this embodiment and each vertex where three or more faces of the crystal plane intersect with each other is called "vertex", and a line segment formed by the intersection of the two crystal planes is called "ridge line". As will be described in examples, the shape of the particle of the titanium oxide in this embodiment can be observed a transmission electron microscope (TEM) image or a scanning electron microscope (SEM) image of titanium oxide. Regarding the particles observed in the TEM image or the SEM image of the focused single titanium oxide particle, a surface area, a volume, the number of vertices, and a total extension length of the ridge line can be obtained by constructing a structural model of a polyhedron by substituting the particle surface with several flat crystal planes, and actually measuring the length of the ridge line or the like, the size of the polyhedron in the height direction, and the like. Then, the vertex density per unit surface area or the vertex density per unit volume can be calculated by dividing the number of vertices obtained from the structural model in which the single titanium oxide particle is constructed by the surface area or volume. Alternatively, the ridge line density per unit surface area or the ridge line density per unit volume can be calculated by dividing the total extension length of the ridge line obtained from the structural model in which the single titanium oxide particle is constructed by the surface area or volume.

Such a technique can be used before or after the titanium oxide particles of this embodiment are carried on an electrode or the like. The same can be applied to a porous material obtained by growing titanium oxide particles on a carrier.

[Vertex Density]

The titanium oxide in this embodiment has a vertex density per unit surface area which is $8.0 \times 10^{-4}$ nm$^{-2}$ or more, is preferably $2.0 \times 10^{-3}$ nm$^{-2}$ or more, is more preferably $1.0 \times 10^{-2}$ nm$^{-2}$ or more, and is still more preferably $8.0 \times 10^{-2}$ nm$^{-2}$ or more, in a single titanium oxide particle. The vertex density per volume is $7.0 \times 10^{-4}$ nm$^{-3}$ or more, is preferably $1.0 \times 10^{-3}$ nm$^{-3}$ or more, is more preferably $3.9 \times 10^{-1}$ nm$^{-2}$ or more, and is still more preferably $1.0 \times 10^{-1}$ nm$^{-2}$ or more, in a single titanium oxide particle.

As the vertex density per unit surface area or the vertex density per unit volume is increased, titanium oxide can electrochemically hydrogenate and reduce carboxylic acids to alcohols more selectively while suppressing the generation of hydrogen. This tendency is also the same in a case where the titanium oxide crystal is used while being supported by a carrier or the titanium oxide is generated and grown on the carrier.

[Ridge Line Density]

The titanium oxide in this embodiment has a ridge line density per unit surface area which is $5.0 \times 10^{-2}$ nm$^{-1}$ or more, is preferably $6.2 \times 10^{-2}$ nm$^{-1}$ or more, is more preferably $2.0 \times 10^{-1}$ nm$^{-1}$ or more, and is still more preferably $5.0 \times 10^{-1}$ nm$^{-1}$ or more, in a single titanium oxide particle.

The ridge line density per volume is $8.0 \times 10^{-3}$ nm$^{-2}$ or more, is preferably $1.3 \times 10^{-2}$ nm$^{-2}$ or more, is more preferably $7.6 \times 10^{-2}$ nm$^{-2}$ or more, and is still more preferably $1.0 \times 10^{-1}$ nm$^{-2}$ or more, in a single titanium oxide particle.

When the ridge line density per unit surface area or the ridge line density per unit volume is set to be in the above range, titanium oxide can electrochemically hydrogenate and reduce carboxylic acids to alcohols more selectively while suppressing the generation of hydrogen. This tendency is also the same in a case where the titanium oxide crystal is used while being supported by a carrier or the titanium oxide is generated and grown on the carrier.

In the electrochemical catalyst in this embodiment, the content of the titanium oxide having the above-described specific structure is preferably 5% or more, is more preferably 20% or more, is still more preferably 50% or more, is particularly preferably 90%, and is most preferably 100%, with respect to the entire mass of the catalyst.

<Other Constitutional Components>

In addition, the electrochemical catalyst of this embodiment may contain a composite oxide obtained by substituting a part of titanium in the titanium oxide with at least one selected from the group consisting of a metal element other than titanium, an element belonging to the carbon group, an element belonging to the nitrogen group, and an element belonging to the oxygen group other than oxygen. Note that the electrochemical catalyst of this embodiment may contain the titanium oxide and the composite oxide, or may contain only the composite oxide.

In addition, in the composite oxide, one kind or two or more kinds of elements substituting for a part of titanium may be used.

[Metal Element Other than Titanium]

Examples of the metal element other than titanium include elements belonging to Group 3, Group 4, Group 5 of the periodic table, and the like, but are not limited thereto.

Examples of the element belonging to Group 3 of the periodic table include scandium (Sc), yttrium (Y); lanthanoids such as lanthanum (La), cerium (Ce), praseodymium (Pr), neodymium (Nd), promethium (Pm), and samarium (Sm); actinoids such as actinium (Ac), thorium (Th), and Protactinium (Pa), but are not limited thereto.

Examples of the element belonging to Group 4 of the periodic table include zirconium (Zr), hafnium (Hf), and rutherfordium (Rf), but are not limited thereto.

Examples of the element belonging to Group 5 of the periodic table include vanadium (V), niobium (Nb), tantalum (Ta), and dubnium (Db), but are not limited thereto.

Among them, as the metal element other than titanium, the element belonging to Group 4 of the periodic table or the element belonging to Group 5 of the periodic table is preferable, and zirconium, hafnium, niobium, or tantalum is more preferable.

In the electrochemical catalyst of this embodiment, as a part of titanium is a composite oxide in which the metal element other than titanium is substituted, the electrons stored in the conduction band formed in the Ti3d orbit have a stronger reducing power as will be described in examples. Therefore, when the catalyst of this embodiment contains the composite oxide in which a part of titanium is substituted with the metal element other than titanium, alcohols can be obtained from carboxylic acids with higher yield.

[Element Belonging to Carbon Group]

Examples of the element belonging to the carbon group include carbon (C), silicon (Si), germanium (Ge), tin (Sn), lead (Pb), and flerovium (Fl), but are not limited thereto.

[Element Belonging to Nitrogen Group]

Examples of the element belonging to the nitrogen group include nitrogen (N), phosphorus (P), arsenic (As), antimony (Sb), bismuth (Bi), moscovium (Mc), but are not limited thereto.

[Element Belonging to Oxygen Group Other than Oxygen]

Examples of the element belonging to the oxygen group other than oxygen include sulfur (S), selenium (Se), tellurium (Te), polonium (Po), and livermorium (Lv), but are not limited thereto.

In a case where the electrochemical catalyst of this embodiment contains the composite oxide, among the titanium oxides, the proportion of titanium being substituted with an element other than titanium varies depending on the kinds of the substituted elements, but may be, for example, 90% or less, 0.05% to 20%, or 1% to 15%.

In a case where the electrochemical catalyst of this embodiment contains the composite oxide, the content of the composite oxide is preferably 5% or more, is more preferably 20% or more, is still more preferably 50% or more, is particularly preferably 90% or more, and is most preferably 100%, with respect to the entire mass of the catalyst.

<<Method for Producing Electrochemical Catalyst>>

As a method for producing the electrochemical catalyst in this embodiment, the electrochemical catalyst can be produced based on a known method for producing a titanium oxide having an anatase-type crystal structure, which is controlled in shape (references: Wu Qiang Wu, et al., "Hierarchical Oriented Anatase TiO$_2$ Nanostructure arrays on Flexible Substrate for Efficient Dye-sensitized Solar Cells", Sci. Rep., 3:1892, 2013; Zhouyou Wang, et al., "Study on the shape control and photocatalytic activity of high-energy anatase titania", Appl. Catal. B, Vol. 100, issues 1-2, p 378-385, 2010).

Specifically, for example, first, an ammonium halide (for example, ammonium fluoride or the like) is added to distilled water and stirred. Next, tetraisopropyl orthotitanate is added and the mixture is stirred for about 30 minutes to about one hour. Subsequently, the obtained solution is transferred to a Teflon container or the like, and a hydrothermal treatment is performed using a stainless steel autoclave or the like at a temperature of 150° C. to 250° C. for a time of 12 hours to 36 hours. Next, the particles obtained by the hydrothermal treatment are washed with distilled water, acetone or the like, and the fine particles are recovered by centrifugation. Next, the recovered particles are dried to obtain an anatase type titanium oxide having the above structure.

Alternatively, for example, first, tetrabutyl orthotitanate is added to distilled water and stirred for 30 minutes. The obtained solution is transferred to a Teflon (registered trademark) container or the like, and a hydrothermal treatment is performed using a stainless steel autoclave or the like at a temperature of 150° C. to 250° C. for a time of 12 hours to 36 hours. Next, the particles obtained by the hydrothermal treatment are washed with distilled water, acetone or the like, and the fine particles are recovered by centrifugation. Next, the recovered particles are dried to obtain an anatase type titanium oxide having the above structure.

In a case where the electrochemical catalyst in this embodiment contains the composite oxide, the electrochemical catalyst can be produced by using a known method (for example, a solvothermal method or the like) in order to obtain the composite oxide in which a part of titanium is substituted with a certain element.

In a case of a Ti—Zr composite oxide, for example, titanium(IV) tetraisopropoxide, zirconium(IV) tetrapropoxide, and an appropriate organic solvent (for example, about 70% 1-propanol solution or the like) are mixed together with anhydrous acetone in an autoclave, and the mixture is heated at a temperature of 150° C. to 250° C. for about 6 hours to 24 hours.

At this time, a molar mass of zirconium(IV) tetrapropoxide with respect to a total molar mass of titanium(IV) tetraisopropoxide and zirconium(IV) tetrapropoxide may be, for example, 15% or less, 0.5% to 15%, and 1% to 10%.

Next, a white precipitate obtained by the reaction is separated using a centrifuge or the like. Then, the separated precipitate is washed with methanol, acetone, or the like, and dried at room temperature. Subsequently, the obtained powder is subjected to calcination at a temperature of about 150° C. to 250° C. for 12 hours to 36 hours so as to obtain a Ti—Zr composite oxide.

Further, in a case of a Ti—Nb composite oxide, as will be described in examples later, the Ti—Nb composite oxide can be produced, for example, by using a known method illustrated in FIG. 35 (reference: Ad V. Mater., Vol. 13, no. 18, p 1377-1380, 2011).

Specifically, first, as a first step [Step 1], a nonionic surfactant polyol (for example, Pluronic (registered trademark) F-127 or the like) and a niobium halide are mixed in an appropriate organic solvent (for example, distilled ethanol, or the like).

Next, the obtained mixed solution is stirred at 30° C. to 50° C. for 10 minutes to 30 minutes so as to obtain a colorless solution. Subsequently, a titanium halide is added while gently stirring the obtained solution so as to obtain a yellow solution.

At this time, a molar mass of the niobium halide may be, for example, 15% or less, 0.5% to 15%, and 1% to 10% with respect to a total molar mass of the niobium halide and the titanium halide.

Further, it is left to stand at 30° C. to 50° C. for 2 or 3 days so as to obtain a sticky jelly-like substance. Finally, as illustrated in [Step 2] of FIG. 35, calcination is performed at 450° C. to 550° C. for 2 hours to 4 hours so as to obtain a Ti—Nb composite oxide (milky powder).

<<Method for Using Electrochemical Catalyst>>

The electrochemical catalyst of this embodiment can be mainly used in a system for synthesizing alcohols from carboxylic acids by electrochemical reduction reaction. Specifically, for example, it is possible to obtain alcohols with high selectivity and high yield by the electrochemical reduction reaction of carboxylic acids using the cathode electrode including the electrochemical catalyst of this embodiment.

<<Cathode>>

A cathode according to the first embodiment of the present invention includes the electrochemical catalyst which is carried on at least a surface.

According to the cathode of this embodiment, it is possible to obtain alcohols with high selectivity and high yield from carboxylic acids due to the electrochemical reduction reaction using the above-described catalyst.

<Structure>

The cathode in this embodiment includes a first carrier and a layer of a catalyst (which may hereinafter be referred to as "cathode catalyst layer") carried on at least the surface of the first carrier. In the cathode catalyst layer, the carried titanium oxide particles can be observed by an electron microscope, and the ridge lines and vertices are preferably present. The shape of the cathode of this embodiment is not particularly limited, and examples thereof include a rod shape and a plate shape. In addition, the cathode of this embodiment preferably has a porous structure. In the present specification, the term "porous structure" means a structure having large and small pores inside and outside. Specific examples of the porous structure include a mesh structure, a three-dimensional network structure, and the like. In a case where the cathode of this embodiment has a mesh structure, each lattice constituting the mesh may further have a three-dimensional network structure. When the cathode of this embodiment has a porous structure, the electrochemical catalyst carried on at least the surface of the first carrier can have an active site with sufficient density necessary for reduction of carboxylic acids.

The thickness of the cathode of this embodiment may be, for example, 10 μm to 1 cm, and 50 μm to 500 μm. "Thickness of the cathode" as used herein means the total thickness of the first carrier and the cathode catalyst layer. In the case where the first carrier and the cathode catalyst layer are composed of a plurality of layers, the thickness of the cathode is the total thickness thereof.

In addition, the thickness of the cathode catalyst layer may be, for example, 100 nm to 500 μm. When the thickness of the cathode catalyst layer is set to the above lower limit value or more, the catalyst is more sufficiently carried. On the other hand, when the thickness of the cathode catalyst layer is the above upper limit value or lower, a resistance of proton conduction and a resistance of electron conduction become smaller, and a diffusion resistance of the substrate (carboxylic acids) can be more reduced. "Thickness of the cathode catalyst layer" as used herein means the thickness of the entire cathode catalyst layer, and in a case where the cathode catalyst layer is formed of a plurality of layers, the thickness of the cathode catalyst layer is the total thickness thereof.

<Material>

The first electrode carrier in the cathode of the embodiment is preferably formed of a material having metal conductivity. When the material has the metal conductivity, electrons supplied from the anode can be transferred and carboxylic acids can be electrochemically reduced on the electrochemical catalyst.

Examples of the material having conductivity include carbon based materials such as acetylene black, Ketjenblack (registered trademark), amorphous carbon, and carbon nanohorns; base metals such as Ni, V, Ti, Co, Mo, Fe, Cu, Zn, Sn, W, and Zr, and oxides, carbides, nitrides, or carbonitrides thereof, but the material having conductivity is not limited thereto. Also, noble metals such as Pt, Pd, Au, Rh, and Ru may be included. One or a combination of two or more of these materials may be used as the first carrier.

Among them, the material of the first carrier is preferably a base metal, and is more preferably titanium (Ti). When the material of the first carrier is titanium, the first carrier is preferably formed of the same element as the electrochemical catalyst from the viewpoint of production. Specific examples of the first carrier in the cathode of this embodiment include a titanium mesh and a titanium felt, but are not limited thereto.

<<Method for Producing Cathode>>

A method for producing a cathode according to the first embodiment of the present invention includes a processing step of processing a surface of titanium having a porous structure with the electrochemical catalyst in a cathode including the titanium having a porous structure on a surface.

According to the method for producing a cathode of this embodiment, it is possible to simply produce a cathode capable of synthesizing alcohols with high selectivity and high yield from carboxylic acids by an electrochemical reduction reaction using the electrochemical catalyst.

<Processing Step>

In the processing step of this embodiment, a surface of titanium having a porous structure is processed with the electrochemical catalyst in a cathode including the titanium having a porous structure on a surface.

The processing step includes at least one of a catalyst forming step, a coating step, or an immersion step which will be described later. In addition, the processing step may include one or two or more steps among the above three steps.

Specifically, after performing the catalyst forming step, the coating step or the immersion step may be performed, or after performing the coating step, the immersion step may be performed.

Note that, in a case where a plurality of processing steps are provided with the catalyst forming step, for the order of the steps, because it is preferable to directly grow and form a catalyst using titanium of a porous structure as a raw material, the coating step or the immersion step is preferably provided after the catalyst forming step. In addition, in the processing step, a titanium raw material other than titanium having a porous structure or a metal raw material may be added.

First Embodiment

In the method for producing a cathode according to one embodiment of the present invention, the processing step includes a catalyst forming step of growing the electrochemical catalyst from the surface of the titanium having a porous structure.

(Catalyst Forming Step)

In the catalyst forming step, the electrochemical catalyst is grown from the surface of the titanium having a porous structure by using titanium having a porous structure as a raw material. As this method, for example, the following method and the like can be mentioned.

Figure 1:
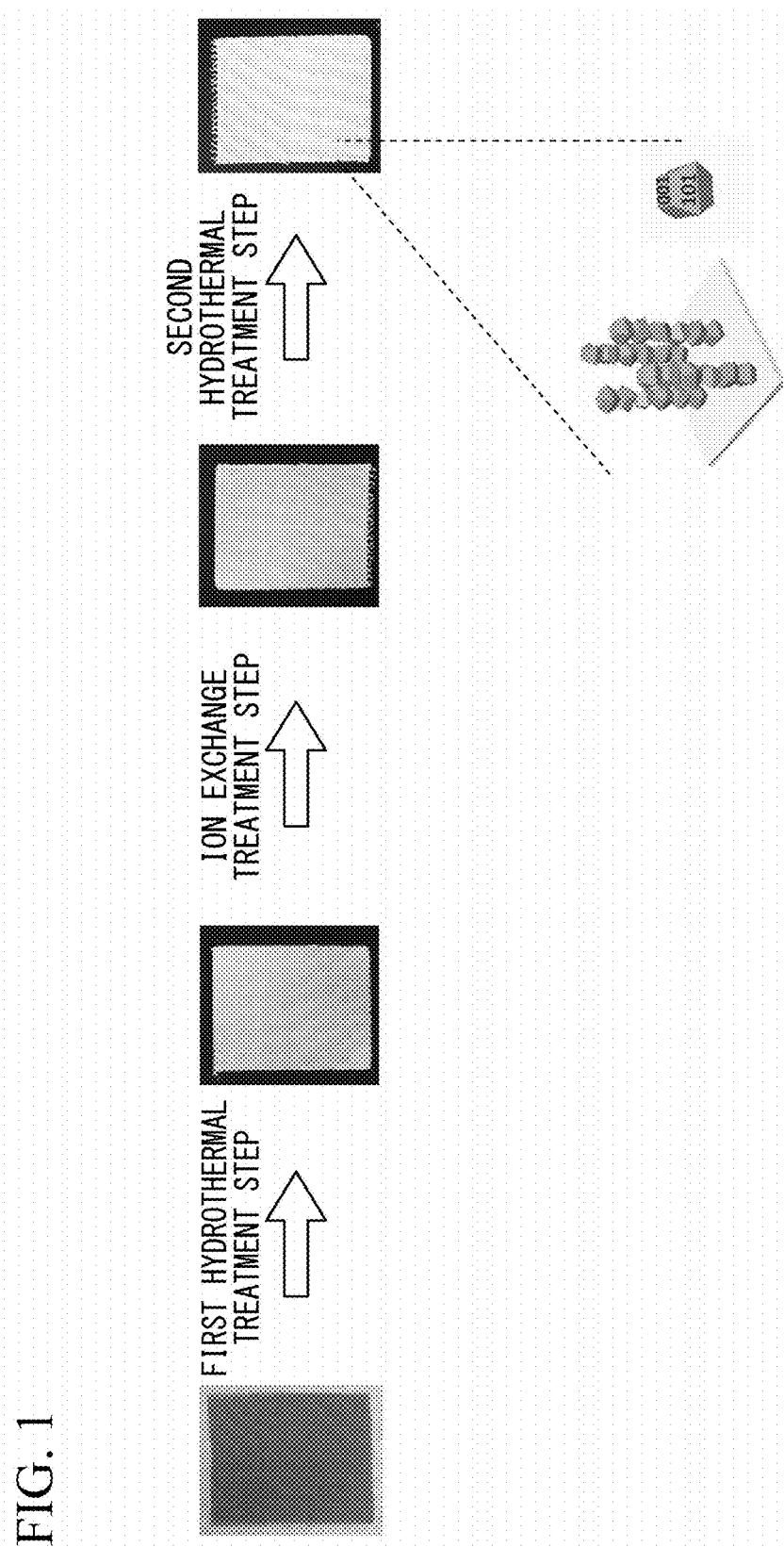
FIG. 1 is a schematic processing diagram illustrating a method for producing a cathode according to a first embodiment of the present invention.
Figure 2:
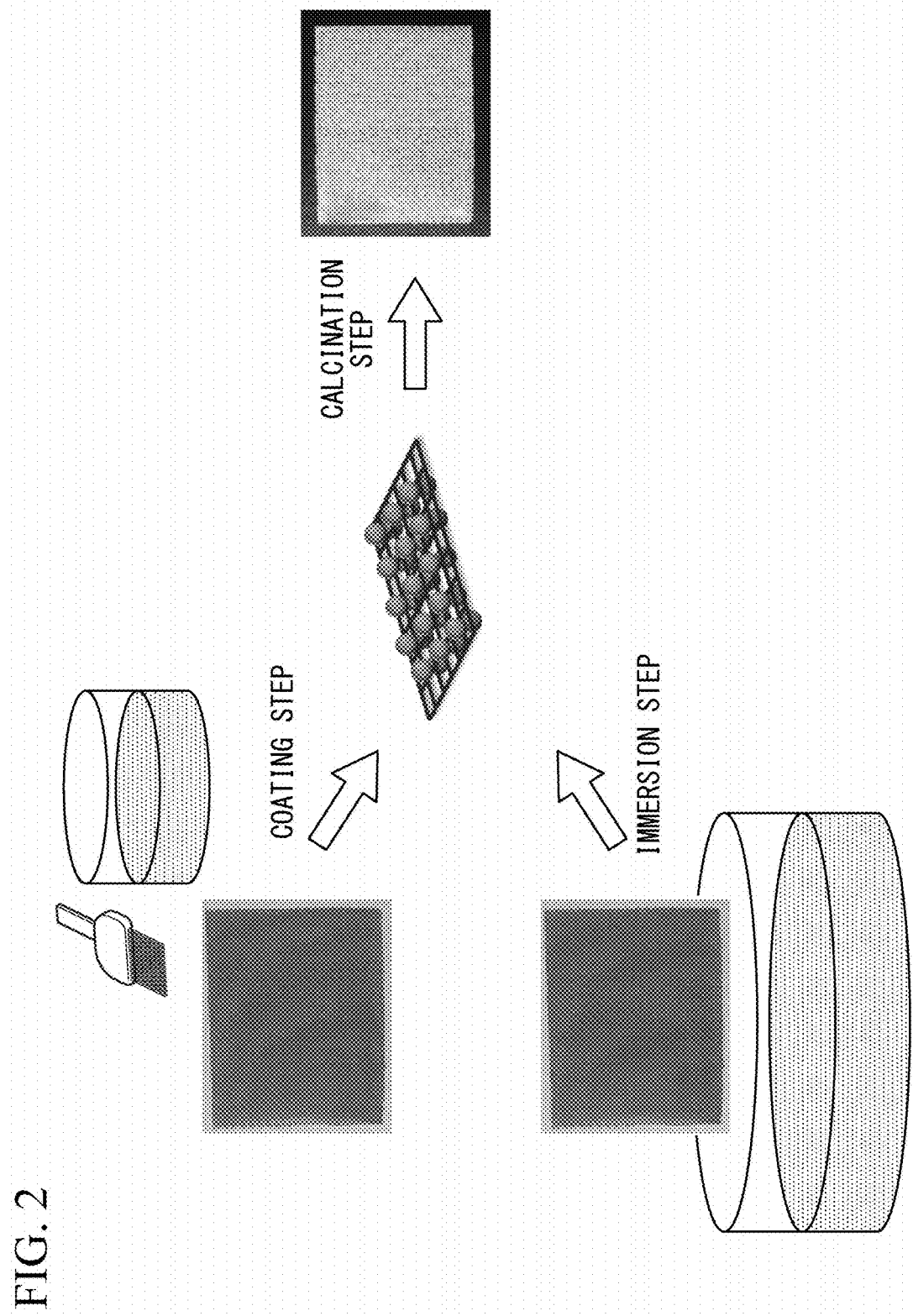
FIG. 2 is a schematic processing diagram illustrating a method for producing a cathode according to a second embodiment of the present invention.

FIG. 1 is a schematic configuration processing diagram illustrating a method for producing a cathode according to a first embodiment of the present invention. The catalyst forming step includes a first hydrothermal treatment step, an ion exchange treatment step, and a second hydrothermal treatment step.

First Hydrothermal Treatment Step

First, the surface of the titanium having a porous structure is subjected to a hydrothermal reaction treatment by using an alkaline solution.

Examples of the alkali include sodium hydroxide, potassium hydroxide, ammonia, and the like, but are not limited thereto.

The reaction temperature may be, for example, 150° C. to 250° C.

The reaction time may be, for example, 3 hours to 72 hours, 6 hours to 48 hours, or 12 hours to 48 hours.

When the reaction temperature and the reaction time are within the above range, it is possible to form a titanium oxide catalyst having an anatase-type crystal structure having the above structure on the surface of the titanium having a porous structure more sufficiently.

Ion Exchange Treatment Step

Next, the surface of the titanium having a porous structure after the first hydrothermal treatment step is subjected to an ion exchange treatment with an acid solution.

Examples of the acid include hydrochloric acid, sulfuric acid, nitric acid, and the like, but not limited thereto.

A temperature in the ion exchange treatment may be, for example, 15° C. to 100° C., and 20° C. to 50° C. A treatment time may be, for example, 10 minutes to 60 minutes, or 15 minutes to 45 minutes. After the ion exchange treatment, titanium having a porous structure may be washed with water, ethanol or the like and further dried.

Second Hydrothermal Treatment Step

Next, the surface of the titanium having a porous structure after the ion exchange treatment step is subjected to a hydrothermal reaction treatment with water. With this, it is possible to obtain a cathode electrode formed of titanium having a porous structure obtained by growing and forming a titanium oxide catalyst having an anatase-type crystal structure on the surface. The reaction temperature may be, for example, 150° C. to 250° C. The reaction time may be, for example, 1 hours to 72 hours, 6 hours to 48 hours, and 10 hours to 48 hours. After the second hydrothermal treatment, titanium having a porous structure may be washed with water, ethanol or the like and further dried.

In the catalyst forming step, the catalyst is firmly bonded to the surface of the titanium having the porous structure, so that the reduction reaction of the carboxylic acids can proceed more smoothly in the cathode produced in the catalyst forming step.

Second Embodiment

In the method for producing a cathode according to a second embodiment of the present invention, the processing step may include a coating step of coating the surface of the titanium having a porous structure with a solution containing the electrochemical catalyst, or an immersion step of immersing the surface of the titanium having a porous structure into a solution containing the electrochemical catalyst.

Coating Step

First, the surface of the titanium having a porous structure is coated with a solution containing the catalyst.

The solution containing the catalyst is obtained by dispersing the catalyst in a solvent, and the solvent is not particularly limited as long as the structure and activity of the catalyst are not impaired. Specific examples of the solvent include water, methanol, and ethanol.

The concentration of the catalyst contained in the solution may be, for example, 1% by mass to 90% by mass.

The coating amount of the solution containing the catalyst may be, for example, 1 mg/cm$^2$ to 50 mg/cm$^2$, after the drying of the catalyst.

In addition, the solution containing the catalyst preferably contains polyethylene glycol. When the solution contains polyethylene glycol, it is possible to improve adhesion of the catalyst to the surface of the titanium having a porous structure.

The concentration of polyethylene glycol contained in the solution may be, for example, 1 mM or more, or may be, for example, 5 mM to 500 mM.

Immersion Step

Alternatively, the surface of the titanium having a porous structure is immersed into a solution containing the catalyst.

A composition of the solution containing the catalyst is the same as that of the above-described "Coating step".

An immersion temperature may be, for example, 15° C. to 90° C., or 20° C. to 50° C. An immersion time may be, for example, 1 minute to 60 minutes, or 3 minutes to 30 minutes.

Calcination Step

Further, a calcination step of calcinating the titanium having a porous structure may be further included after the coating step or the immersion step. With the calcination step included, a solvent can be evaporated and a catalyst can be firmly adhered to the surface of the titanium having a porous structure. A calcination temperature may be, for example, 100° C. to 900° C., and 250° C. to 550° C. A calcination time may be, for example, 10 minutes to 6 hours, or 1 hour to 5 hours.

<<Membrane Electrode Assembly for Alcohol Synthesis>>

A membrane electrode assembly for alcohol synthesis according to this embodiment of the present invention is provided with an anode, the cathode, and an electrolyte membrane between the anode and the cathode.

According to the membrane electrode assembly for alcohol synthesis of this embodiment, it is possible to obtain alcohols with high selectivity and high yield from carboxylic acids due to an electrochemical reduction reaction using the above-described catalyst. In addition, in the membrane electrode assembly for alcohol synthesis of this embodiment, water or steam is decomposed at the anode and protons that have passed through the electrolytic membrane are supplied to the cathode, and thus a means for separately supplying hydrogen to the cathode side is not required. Therefore, the hydrogenation (that is, reduction) of the carboxylic acid proceeds promptly and an alcohol can be produced with high efficiency.

The members constituting the membrane electrode assembly for alcohol synthesis of this embodiment will be described in detail below with reference to FIG. 3.

Figure 3:
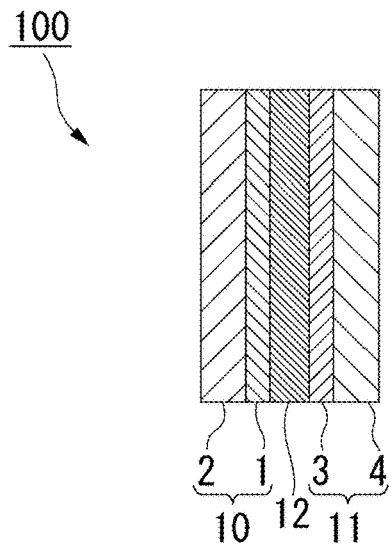
FIG. 3 is a schematic configuration diagram schematically illustrating a membrane electrode assembly for alcohol synthesis according to the first embodiment of the present invention.

A membrane electrode assembly for alcohol synthesis 100 as illustrated in FIG. 3 is provided with an anode 11, a cathode 10, and an electrolyte membrane 12 between the anode 11 and the cathode 10. In other words, the membrane electrode assembly for alcohol synthesis of this embodiment 100 has the cathode 10, the electrolyte membrane 12, and the anode 11 stacked in this order.

<Anode>

The anode in this embodiment includes a second carrier 4 and a layer 3 of a catalyst (which may hereinafter be referred to as "anode catalyst layer") carried on at least the surface of the second carrier 4. The thickness of the anode of this embodiment may be, for example, 10 μm to 1 cm, or 50 μm to 500 μm. "Thickness of the anode" as used herein means the total thickness of the second carrier and the anode catalyst layer. In the case where the second carrier and the anode catalyst layer are composed of a plurality of layers, the thickness of the anode is the total thickness thereof.

In addition, the thickness of the anode catalyst layer may be, for example, 10 nm to 1 mm. When the thickness of the anode catalyst layer is set to the above lower limit value or more, the catalyst is more sufficiently carried. On the other hand, when the thickness of the anode catalyst layer is the above upper limit value or lower, a resistance of proton conduction and a resistance of electron conduction become smaller, and a diffusion resistance of a proton source (water or steam) can be more reduced. "Thickness of the anode catalyst layer" as used herein means the thickness of the entire anode catalyst layer, and in a case where the anode catalyst layer is formed of a plurality of layers, the thickness of the cathode catalyst layer is the total thickness thereof.

[Second Electrode Carrier]

A second electrode carrier is preferably formed of a material having conductivity. When the material has the conductivity, electrons obtained by decomposition of water on the anode catalyst can be efficiently transferred from the anode to the cathode, and the carboxylic acids can be electrochemically reduced on the cathode catalyst.

Examples of the material having conductivity include carbon based materials such as acetylene black, Ketjenblack (registered trademark), amorphous carbon, and carbon nanohorns; conductive glass; noble metals such as Pt, Ru, Au, Ag, Rh, Pd, Os, and Ir; base metals such as Ni, V, Ti, Co, Mo, Fe, Cu, Zn, Sn, and Zr, and oxides, carbides, nitrides, or carbonitrides thereof, but the material having conductivity is not limited thereto. One or a combination of two or more of these materials may be used as the second carrier.

[Anode Catalyst Layer]

Examples of the catalyst contained in the anode catalyst layer include noble metals such as Pt, Ru, Au, Ag, Rh, Pd, Os, and Ir; base metals such as Ni, V, Ti, Co, Mn, Fe, Cu, Zn, Sn, and Zr, and oxides or alloys thereof, but the catalyst is not limited thereto. In addition, the catalyst contained in the anode catalyst layer may be a photocatalyst. Examples of the photocatalyst include gallium oxide, tungsten oxide, and bismuth vanadate, but the photocatalyst is not limited thereto.

The average particle size of the metal constituting the anode catalyst layer may be, for example, 10 Å to 500 μm.

In addition, from the viewpoint of cost and performance balance, the amount of catalyst carried on the anode catalyst layer may be, for example, 0.001 mg/cm$^2$ to 10 mg/cm$^2$.

<Method for Producing Anode>

As the anode in this embodiment, commercially available anodes may be used and may be produced based on a known method (for example, a squeegee method (references: S. Kitano, et al., "Bifunctionality of Rh$^{3+}$ Modifier on TiO$_2$ and Working Mechanism of Rh$^{3+}$/TiO$_2$ Photocatalyst under Irradiation of Visible Light", J Phys Chem C, Vol. 117, p 11008-11016, 2013.) and the like). For example, first, a suspension is prepared by dispersing an anode catalyst in a solution containing water, an organic solvent, a surfactant or the like. The suspension is then dripped onto the second carrier. Next, a glass rod set at a position several tens of micrometers away from the surface of the second carrier is slid at a constant speed, and the dropped suspension is spread on the glass electrode substrate to be uniformly coated. Next, the anode can be obtained by calcination treatment under an air atmosphere at 100° C. to 700° C. (rate of temperature rise: 10° C./min) for 1 minute to 1440 minutes.

<Electrolyte Membrane>

The electrolyte membrane in this embodiment has excellent ionic conductivity in a wet state and functions as an ion exchange membrane that moves protons between the anode and the cathode.

The thickness of the electrolyte membrane in this embodiment may be, for example, 10 μm to 1 mm, and 30 μm to 200 μm, from the viewpoints of film strength and membrane resistance.

The material of the electrolyte membrane in this embodiment is not particularly limited as long as it is a material having proton conductivity. Specific examples of the material of the electrolyte membrane include conventionally known appropriate polymer membranes, inorganic membranes, composite membranes, and the like. Examples of the polymer membrane include perfluorosulfonic acid type electrolyte membranes (Nafion (registered trademark; produced by DuPont), Dow membrane (manufactured by Dow Chemical Company), ACIPLEX (registered trademark; produced by Asahi Kasei Corporation), and Flemion (produced by Asahi Glass Co., Ltd.)), and hydrocarbon type electrolyte membranes such as polystyrene sulfonic acid and sulfonated polyether ether ketone. Examples of the inorganic membranes include phosphate glass, cesium hydrogen sulfate, polytungstophosphoric acid, and ammonium polyphosphate. As the composite film, for example, a Gore select membrane (Gore Select (registered trademark; produced by Gore & Associates, Inc.)) and the like can be mentioned.

<Method of Producing Electrolyte Membrane>

Commercially available electrolyte membranes may be used in this embodiment, and may be produced by using a known method. Specifically, first, a coating solution formed of a resin composition containing components constituting an electrolyte membrane is applied to a substrate or a support. Examples of the coating method of the coating solution include a gravure coating method, a slot die coating method, a curtain coating method, an extrusion coating method, an air knife coating method, a slide coating method, a nip roll coating method, a dip coating method, a kiss coating method, a rod bar coating method, and a spray coating method; however, the coating method is not limited thereto. Next, if necessary, the resin composition is cured by heating or irradiation with ultraviolet rays. The curing conditions can be appropriately selected depending on the contained components. Subsequently, the electrolyte membrane can be produced by washing with water or the like, and evaporating the solvent or the like by calcination or the like.

<<Method for Producing Membrane Electrode Assembly for Alcohol Synthesis>>

The anode, the cathode, and the electrolyte membrane were produced as described above.

As the producing method for the membrane electrode assembly for alcohol synthesis, for example, the anode, the cathode, and the electrolyte membrane obtained by the above producing method are hot-pressed at 100° C. to 200° C. for 2 minutes to 30 minutes in a state where an electrolyte membrane is sandwiched between a catalyst layer of the anode and a catalyst layer of the cathode, and thereby a membrane electrode assembly can be produced.

<<Method for Producing Alcohols>>

A method for producing alcohols according to the first embodiment of the present invention uses the above-described membrane electrode assembly for alcohol synthesis.

According to the method for producing alcohols of this embodiment, it is possible to obtain alcohols with high selectivity and high yield from carboxylic acids due to an electrochemical reduction reaction using the above-described catalyst. In addition, in the method for producing alcohols of this embodiment, water or steam is decomposed at the anode and protons that have passed through the electrolytic membrane are supplied to the cathode, and thus a means for separately supplying hydrogen to the cathode side is not required. Therefore, the hydrogenation (that is, reduction) of the carboxylic acids proceeds promptly and alcohols can be produced with high efficiency.

Alcohol Synthesizing Apparatus

First Embodiment

An alcohol synthesizing apparatus according to the first embodiment of the present invention includes an electrosynthesis unit that includes the membrane electrode assembly for alcohol synthesis, a first supply means for supplying water or steam to the anode of the electrosynthesis unit, a second supply means for supplying carboxylic acids to the cathode of the electrosynthesis unit, and a recovery means for recovering alcohols generated in the cathode of the electrosynthesis unit.

According to the alcohol synthesizing apparatus of this embodiment, it is possible to obtain alcohols with high selectivity and high yield from carboxylic acids due to an electrochemical reduction reaction using the above-described catalyst. In addition, in the alcohol synthesizing apparatus of this embodiment, water or steam is decomposed at the anode and protons that have passed through the electrolytic membrane are supplied to the cathode, and thus a means for separately supplying hydrogen to the cathode side is not required. Therefore, the hydrogenation (that is, reduction) of the carboxylic acids proceeds promptly and alcohols can be produced with high efficiency.

Figure 4:
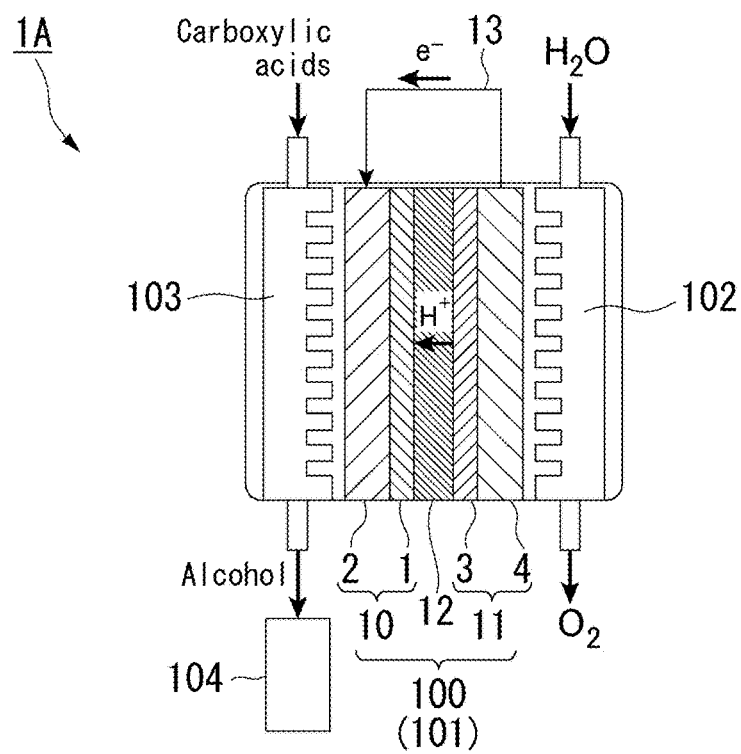
FIG. 4 is a schematic configuration diagram schematically illustrating an alcohol synthesizing apparatus according to the first embodiment of the present invention.

FIG. 4 is a schematic configuration diagram schematically illustrating an alcohol synthesizing apparatus according to the first embodiment of the present invention.

An alcohol synthesizing apparatus 1A as illustrated in FIG. 4 is provided with an electrosynthesis unit 101, a first supply means 102, a second supply means 103, and a recovery means 104.

Further, in the electrosynthesis unit 101, the cathode 10 and the anode 11 are energized by a conducting wire 13, and electrons are supplied from the anode 11 to the cathode 10.

[Electrosynthesis Unit]

The electrosynthesis unit 101 is provided with the above-described membrane electrode assembly for alcohol synthesis 100.

In the membrane electrode assembly for alcohol synthesis 100, protons generated by decomposition of water on the catalyst on the anode 11 side pass through the electrolyte membrane 12 and are transferred onto the catalyst on the cathode 10 side. With this, carboxylic acids can be hydrogenated (reduced) on the catalyst on the cathode 10 side so as to produce alcohols.

[First Supply Means]

The first supply means is for supplying water or steam to the anode 11. The flow rate of water or steam may be, for example, 0.1 mL/min to 10 mL/min. The first supply means may be provided with a reservoir for water or steam and a flow path in communication with the reservoir and the anode. Further, the flow path may further include a valve or a pump. With a valve or a pump provided, the flow rate of water or steam supplied to the anode can be adjusted within the above range. Further, an apparatus for measuring oxygen concentration (for example, a dissolved oxygen measuring instrument, gas chromatography, and the like) may be provided in the vicinity of an outlet of the flow path. The decomposition reaction rate of water can be calculated by measuring the concentration of oxygen produced by decomposition of water or steam, and thereby the flow rate of water or steam to be supplied to the anode can be adjusted.

Further, the first supply means may include a separator. In general, a separator is a part sandwiched between the membrane electrode assemblies and having a function of sealing the fuel gas or air supplied to the anode or the cathode from the outside air, in a fuel cell in which membrane electrode assemblies are stacked. In this embodiment, it is a substrate sandwiched between the membrane electrode assemblies and supplied to the cathode or the anode, or a part serving to seal water or steam. In addition to the function of sealing the membrane electrode assembly, the separator may have a substrate or a flow path (manifold hole) through which water or steam flows, and may have a function of supplying the substrate or water or steam to the cathode or the anode. The separator is preferably made of a material having conductivity, corrosion resistance, and thermal conductivity. Specific examples of the material of the separator include, for example, carbon, stainless steel, and the like, but are not limited thereto.

[Second Supply Means]

Second supply means is for supplying the carboxylic acids serving as a substrate to the cathode 10. The flow rate of the carboxylic acids serving as the substrate may be, for example, 0.1 mL/min to 10 mL/min. The second supply means may be provided with a reservoir for carboxylic acids and a flow path in communication with the reservoir and the cathode. In the reservoir, the carboxylic acids are preferably stored in the form of a solution. As a solvent for dissolving or dispersing the carboxylic acids, for example, ion exchanged water and the like, can be exemplified.

A concentration of the carboxylic acids contained in the solution may be, for example, 1 mM to 12 M.

Further, the flow path may further include a valve or a pump. With a valve or a pump provided, the flow rate of carboxylic acids supplied to the cathode can be adjusted within the above range.

Further, the second supply means may include a separator.

As the separator, the same materials as those exemplified in the above [First supply means] can be mentioned.

[Recovery Means]

The recovery means is for recovering the reduction products of the produced carboxylic acids, that is, alcohols, on the catalyst of the cathode 10.

The recovery means is disposed at an outlet of the flow path of the second supply means and may include a collector for reduction products and a detector for the reduction products. It is possible to confirm the production of alcohols in the detector after storing a certain amount of reduction products generated in the collector. Further, it may further include an alcohol refining device. By using the refining device, the purity of the produced alcohols can be increased. Examples of the refining devices include a high performance liquid chromatograph, a membrane separation device, and the like.

Second Embodiment

The alcohol synthesizing apparatus according to the second embodiment of the present invention may further include a first control means for controlling an applied voltage between the anode and the cathode of the electrosynthesis unit.

Figure 5:
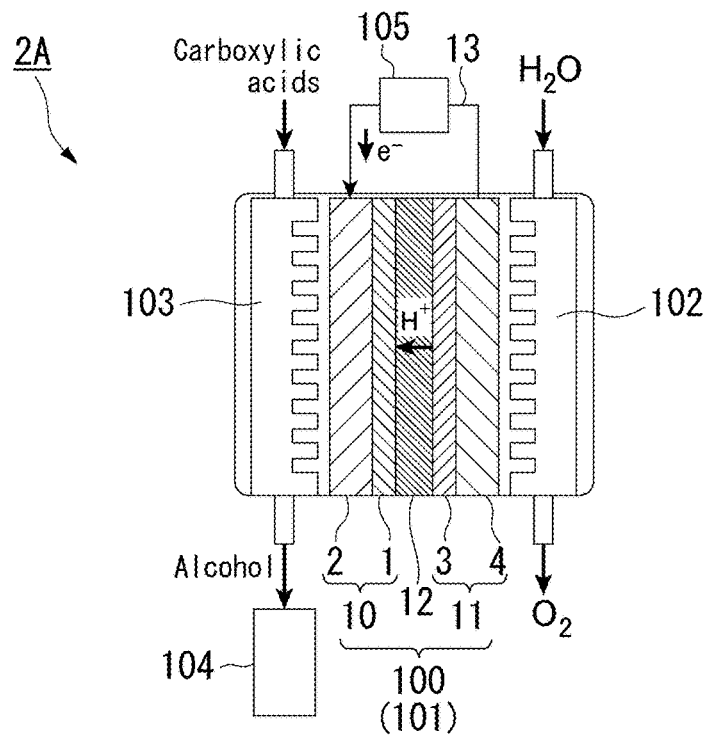
FIG. 5 is a schematic configuration diagram schematically illustrating an alcohol synthesizing apparatus according to the second embodiment of the present invention.

FIG. 5 is a schematic configuration diagram schematically illustrating an alcohol synthesizing apparatus according to the second embodiment of the present invention.

An alcohol synthesizing apparatus 2A illustrated in FIG. 5 is the same as the alcohol synthesizing apparatus 1A illustrated in FIG. 4 except that the first control means 105 is provided. That is, the alcohol synthesizing apparatus 2A controls the voltage applied to the electrosynthesis unit 101 by the first control means 105. In addition, the first control means 105 is connected to the cathode 10 and the anode 11.

In the figures after FIG. 5, the same reference numerals are given to the same constituent elements as those shown in the already described figures, and the detailed description thereof will be not be repeated.

[First Control Means]

The first control means may include a voltmeter and a voltage controlled voltage source.

A potential difference of the cathode with respect to the anode may be, for example, 1.09 V to 3.4 V, 1.09 V to 3.0 V, or 1.09 V to 2.8 V.

Also, in a case where the anode includes a photocatalyst, a potential difference between the voltages to be applied to the cathode and the anode is not necessary, or may be smaller than the potential difference in the above range. Specifically, a potential difference of the cathode with respect to the anode may be, for example, 0.001 V or more, or 0.1 V to 2.0 V.

The potential difference between the cathode and the anode is measured with a voltmeter and the applied voltage may be adjusted using a voltage controlled voltage source so that the potential difference of the cathode with respect to the anode falls within the above range.

Third Embodiment

The alcohol synthesizing apparatus according to the third embodiment of the present invention may further include a second control means for controlling a temperature of the electrosynthesis unit.

Figure 6:
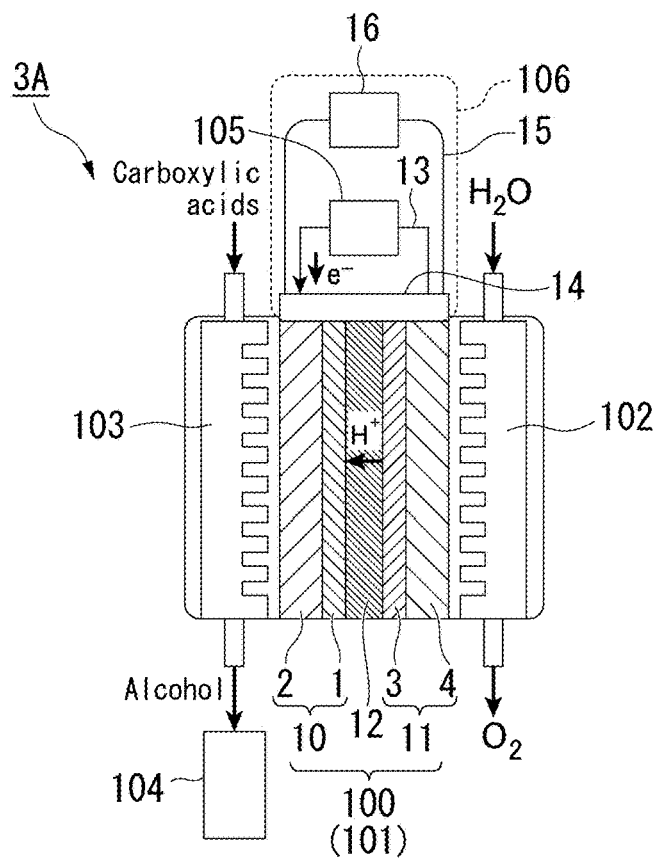
FIG. 6 is a schematic configuration diagram schematically illustrating an alcohol synthesizing apparatus according to a third embodiment of the present invention.

FIG. 6 is a schematic configuration diagram schematically illustrating an alcohol synthesizing apparatus according to the third embodiment of the present invention.

An alcohol synthesizing apparatus 3A illustrated in FIG. 6 is the same as the alcohol synthesizing apparatus 2A illustrated in FIG. 5 except that the second control means 106 is provided. That is, the alcohol synthesizing apparatus 3A controls the temperature in the electrosynthesis unit 101 by the second control means 106. Further, the second control means 106 is disposed in a membrane electrode assembly 100.

[Second Control Means]

The second control means may be provided with a cooler 14, a cooling water circulation flow path 15, and a heat exchanger 16. In addition, the second control means may be provided with a thermometer. The temperature in the electrosynthesis unit may be, for example, 200° C. or lower, 0° C. to 200° C., or 5° C. to 180° C. The temperature in the membrane electrode assembly is measured with the passage of time using a thermometer and the temperature is adjusted by circulating cooling water so that the temperature in the membrane electrode assembly falls within the above range. The cooling water circulation flow path 15 may include a valve or a pump so as to adjust the flow rate of the cooling water.

Further, the second control means may further include a cooling water storage tank.

<Other Configurations>

In the alcohol synthesizing apparatus of this embodiment, in a case where the anode in the electrosynthesis unit has a photocatalyst, the alcohol synthesizing apparatus may further include a light source that irradiates only the anode side with light.

Examples of the light source include a mercury arc lamp, a carbon dioxide arc lamp, a low pressure mercury lamp, a medium pressure mercury lamp, a high pressure mercury lamp, a swirl flow plasma arc lamp, a metal halide lamp, a xenon lamp, a tungsten lamp, a halogen lamp, a laser, and an ultraviolet light emitting diode but are not limited thereto.

As the wavelength of the light to be irradiated, for example, light such as that from a halogen lamp having a wavelength of 1400 to 400 nm, UV-A (400 to 320 nm), UV-B (320 to 280 nm), and UV-C (280 to 200 nm) may be used.

An energy output of the light source is preferably 1 W/cm² to 100 kW/cm², and more preferably 40 W/cm² to 500 W/cm².

In addition, the light intensity on the anode surface is preferably 0.1 mW/cm² or to 10 W/cm², and is more preferably 50 mW/cm² to 500 mW/cm².

Method for Using Alcohol Synthesizing Apparatus

First Embodiment

The alcohol synthesizing apparatus of this embodiment can be used, for example, by the following method. That is, on the anode side, water or steam is allowed to flow while adjusting the flow rate to be 0.1 mL/min to 500 mL/min by means of a valve, a pump, or the like, through a flow path from the first supply means, specifically a reservoir for water or steam to the anode. On the cathode side, a solution containing carboxylic acids of 1 mM to 12 M is allowed to flow while adjusting the flow rate to be 0.1 mL/min to 500 mL/min by means of a valve, a pump, or the like, through a flow path from the second supply means, specifically a reservoir for carboxylic acids to the cathode. At this time, the flow rate of water or steam and the flow rate of the solution containing carboxylic acids may be the same speed. Then, a voltage is applied to the anode and the cathode. A potential difference of the cathode with respect to the anode may be, for example, 1.09 V to 3.4 V. The potential difference between the cathode and the anode is measured with the first control means, specifically a voltmeter if necessary, and the applied voltage may be adjusted using a voltage controlled voltage source so that the potential difference of the cathode with respect to the anode falls within the above range. The temperature in the electrosynthesis unit during the reaction may be, for example, 200° C. or lower. On the other hand, there are cases in which the temperature in the electrosynthesis unit rises with application of voltage. Therefore, the temperature in the membrane electrode assembly may be measured with the passage of time using the second control means, specifically a thermometer if necessary, and the temperature may be adjusted by circulating cooling water so that the temperature in electrosynthesis unit falls within the above range.

In an electrode unit of the alcohol synthesizing apparatus of this embodiment, the reaction described below is performed.

Cathode: R—COOH+4H⁺+4e⁻→R—CH₂—OH+H₂O

Anode: 2H₂O→4H⁺+4e⁻+O₂

Total reaction: R—COOH+H₂O→R—CH₂—OH+O₂

Alternatively,

Cathode: R—CO—COOH+2H⁺+2e⁻→R—CHOH—COOH

Anode: H₂O→2H⁺+2e⁻+½O₂

Total reaction: R—CO—COOH+H₂O→R—CHOH—COOH+½O₂

Alcohols are synthesized from carboxylic acids by the electrochemical reduction reaction described above.

Next, on the cathode side, the reduction product such as alcohols produced is stored in the recovery means, specifically the collector of the reduction product, and it may be confirmed whether or not alcohols are periodically produced in the detector. In order to increase the purity of the alcohols in the reduction product, if necessary, the alcohols may be purified using a refining device.

Second Embodiment

Further, in a case where the anode includes a photocatalyst, the alcohol synthesizing apparatus of this embodiment can be used, for example, by the following method. Before applying the voltage, the same method as that used in <First embodiment> may be used. Next, a voltage is applied to the anode and the cathode while performing irradiation with light of 200 nm to 1400 nm from the light source so that the light intensity on the anode surface becomes 0.1 mW/cm² to 10 W/cm². For the cathode with respect to the anode, a potential difference is not necessary at all, or for example, a potential difference of 0.001 V or more, or a potential difference of 0.1 V to 2.5 V may be made. The potential difference between the cathode and the anode is measured with the first control means, specifically a voltmeter if necessary, and the applied voltage may be adjusted using a voltage controlled voltage source so that the potential difference of the cathode with respect to the anode falls within the above range. Subsequently, the temperature adjustment and the recovery of the reduction products may be performed by using the same method as that used in <First embodiment> described above.

EXAMPLES

Hereinafter, the present invention will be described in further detail with reference to examples, but the present invention is not limited to these examples and the like.

In the following Examples and the like, the conversion rate of oxalic acid and Faraday yield of glycolic acid production used for the evaluation of catalyst performance were determined as follows. The conversion rate is an index corresponding to the catalytic activity, and the Faraday efficiency is an index corresponding to the selectivity of the catalyst.

Conversion rate (%) of oxalic acid={(amount (mol) of produced glycolic acid+amount (mol) of glyoxylic acid produced)/amount (mol) of oxalic acid before reaction}×100

Faraday yield of glycolic acid production (%)={(number of moles of produced glycolic acid×4×96,485)/charge amount flowing in circuit (coulombs)}×100

[Production Example 1] Production of Anatase-Type Titanium Oxide 1

An anatase-type titanium oxide 1 (101 facet, large TiO₂) in which the shape was controlled based on a known producing method (reference: Jiazang Chen, et al., "Thermodynamically Driven One-Dimensional Evolution of Anatase TiO₂ Nanorods: One-Step Hydrothermal Synthesis for Emerging Intrinsic Superiority of Dimensionality", J. Am. Chem. Soc., Vol. 136, no. 43, p 15310-15318, 2014) was produced. Specifically, first, 0.8 g of ammonium chloride was added to 8 mL of 2-propanol and stirred for 5 minutes. Next, 0.2 mL of tetraisopropyl orthotitanate was added, and the mixture was stirred for 30 minutes. Then, 10 mL of aqueous ammonia (28%) was added and the mixture was stirred for 5 minutes. The obtained solution was transferred to a Teflon container, placed in a stainless steel autoclave, and hydrothermally treated at 170° C. for 72 hours. The particles obtained by the hydrothermal treatment were washed with distilled water and acetone and recovered by centrifugation. Next, the recovered particles were dried to obtain the anatase-type titanium oxide 1.

[Production Example 2] Production of Anatase-Type Titanium Oxide 2

An anatase-type titanium oxide 2 (101 facet, small $TiO_2$) controlled in shape was produced based on a known producing method (reference: Wu Qiang Wu, et al., "Hierarchical Oriented Anatase $TiO_2$ Nanostructure arrays on Flexible Substrate for Efficient Dye-sensitized Solar Cells", Sci. Rep., 3:1892, 2013). Specifically, first, 0.65 g of ammonium fluoride was added to 35 mL of distilled water and stirred. Next, 1 mL of tetraisopropyl orthotitanate was added, and the mixture was stirred for 30 minutes. The obtained solution was transferred to a Teflon container, placed in a stainless steel autoclave, and hydrothermally treated at 200° C. for 24 hours. The particles obtained by the hydrothermal treatment were washed with distilled water and acetone, and the fine particles were recovered by centrifugation. Next, the recovered particles were dried to obtain the anatase-type titanium oxide 2.

[Production Example 3] Production of Anatase-Type Titanium Oxide 3

An anatase-type titanium oxide 3 (101 and 001 facet $TiO_2$) controlled in shape was produced based on a known producing method (references: Zhouyou Wang, et al., "Study on the shape control and photocatalytic activity of high-energy anatase titania", Appl. Catal. B, Vol. 100, issues 1-2, p 378-385, 2010; Wu Qiang Wu, et al., "Hierarchical Oriented Anatase $TiO_2$ Nanostructure arrays on Flexible Substrate for Efficient Dye-sensitized Solar Cells", Sci. Rep., 3:1892, 2013). Specifically, first, 1 mL of tetrabutyl orthotitanate was added to 30 mL of distilled water and stirred for 30 minutes. The obtained solution was transferred to a Teflon container, placed in a stainless steel autoclave, and hydrothermally treated at 200° C. for 24 hours. The particles obtained by the hydrothermal treatment were washed with distilled water and acetone, and the fine particles were recovered by centrifugation. Next, the recovered particles were dried to obtain the anatase-type titanium oxide 3.

[Production Example 4] Production of Anatase-Type Titanium Oxide 4

An anatase-type titanium oxide 4 (001 facet, hierarchical sphere $TiO_2$) controlled in shape was produced based on a known producing method (reference: Jun Song Chen, et al., "Surface-Mediated Growth of Transparent, Oriented, and Well-Defined Nanocrystalline Anatase Titania Films", J. Am. Chem. Soc., Vol. 132, no. 17, p 6124-6130, 2010). Specifically, first, 0.03 mL of diethylenetriamine was added to 42 mL of 2-propanol, and the mixture was stirred for 5 minutes. Then, 1.5 mL of tetraisopropyl orthotitanate was added. This solution was transferred to a Teflon container, placed in a stainless steel autoclave, and heat-treated at 200° C. for 24 hours by a solvothermal method. The particles obtained by the solvothermal reaction were washed with ethanol and collected by centrifugation. Next, the powder was obtained by drying. This powder was heated at a heating rate of 1° C./min and then subjected to calcination at 400° C. for 2 hours so as to obtain the anatase-type titanium oxide 4.

[Production Example 5] Production of Anatase-Type Titanium Oxide 5

An anatase-type titanium oxide 5 (001 facet, microsphere $TiO_2$) controlled in shape was produced based on a known producing method (reference: Zhao, et al., "Phase control of hierarchically structured mesoporous anatase $TiO_2$ microspheres covered with {001} facets", J. Mater. Chem., Vol. 22, p 21965-219'71, 2012). Specifically, first, 6.6 mL of concentrated sulfuric acid was added to 53 mL of distilled water. 1 mL of tetrabutyl orthotitanate was added to the mixture and the resultant was left to stand for 30 minutes. 30 mL of the obtained solution was transferred to a Teflon container, placed in a stainless steel autoclave, and hydrothermally treated at 180° C. for 5 hours. The particles obtained by the hydrothermal treatment were collected by suction filtration and washed with distilled water. Next, the recovered particles were dried to obtain the anatase-type titanium oxide 5.

[Production Example 6] Production of Anatase-Type Titanium Oxide 6

An anatase-type titanium oxide 6 (201 and 401 facet $TiO_2$) controlled in shape was produced based on a known producing method (reference: Hao Bin Wu, et al., "Asymmetric anatase $TiO_2$ nanocrystals with exposed high-index facets and their excellent lithium storage properties", Nanoscale, Vol. 3, p 4082-4084, 2011). 32 mL of acetic acid was added to 47 mL of N,N-dimethyl formamide, and the mixture was stirred. 0.5 mL of tetrabutyl orthotitanate was added to 20 mL of the obtained solution. Next, the obtained solution was transferred to a Teflon container, placed in a stainless steel autoclave, and heat-treated at 200° C. for 10 hours by a solvothermal method. The particles obtained by the solvothermal reaction were washed with ethanol and collected by centrifugation. Next, the recovered particles were dried to obtain the anatase-type titanium oxide 6.

[Test Example 1] Identification of Anatase-Type Titanium Oxides 1 to 6

Regarding the anatase-type titanium oxides 1 to 6 obtained in Production Examples 1 to 6, confirmation that the crystal structure was anatase type and structure analysis of each sample were carried out.

1. Powder X-Ray Diffraction Measurement

Figure 7:
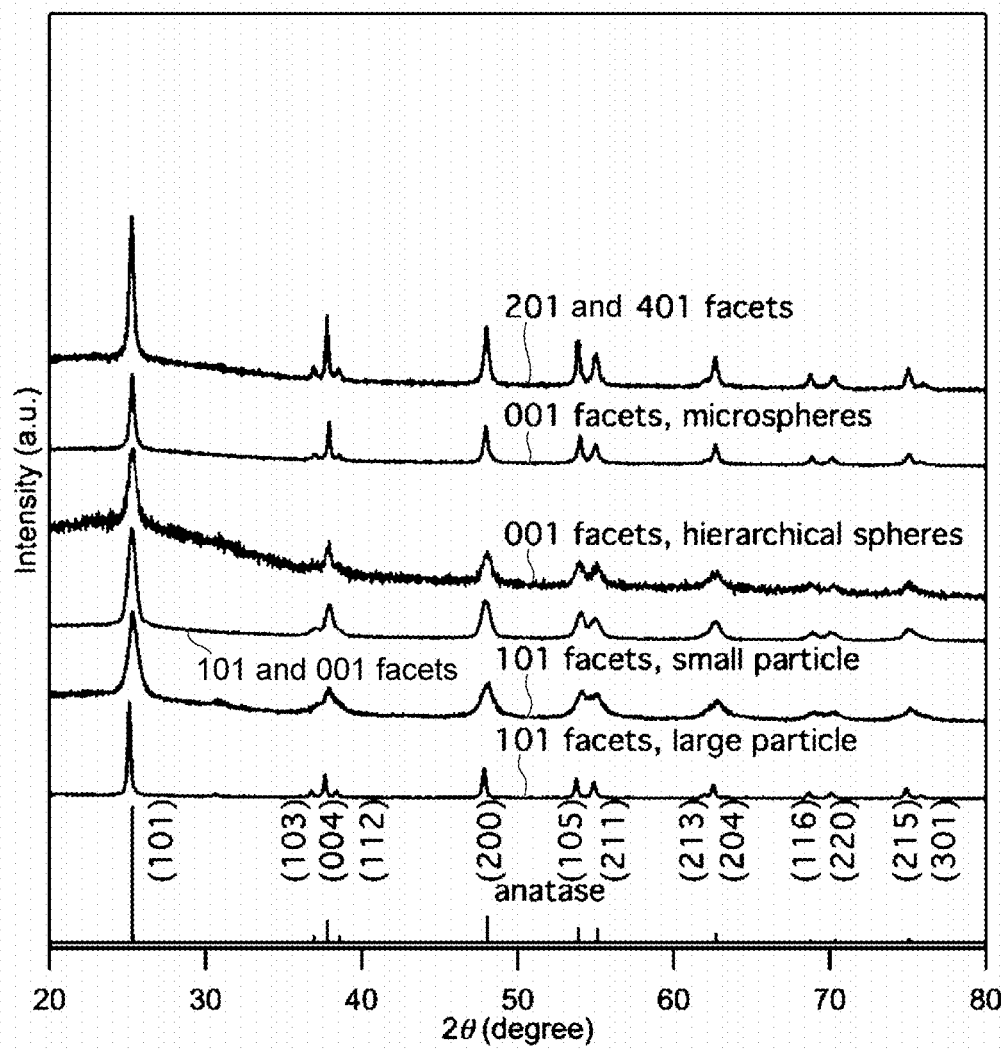
FIG. 7 is a graph illustrating a powder X-ray diffraction pattern of anatase-type titanium oxides 1 to 6 in Test Example 1.

Powder X-ray diffraction measurement was performed on the anatase-type titanium oxides 1 to 6 obtained in Production Examples 1 to 6 by using an X-ray diffractometer (SmartLab, Rigaku). The measurement was carried out under the conditions of Cu-Kα ray (λ=1.54059 Å), 45 kV, and 200 mA. The results are indicated in FIG. 7. In FIG. 7, "101 facets, large particle" represents the anatase-type titanium oxide 1, "101 facets, small particle" represents the anatase-type titanium oxide 2, "101 and 001 facets" represents the anatase-type titanium oxide 3, "001 facets, hierarchical spheres" represents the anatase-type titanium oxide 4, "001 facets, microspheres" represents the anatase-type titanium oxide 5, and "201 and 401 facets" represents the anatase-type titanium oxide 6.

From FIG. 7, it was possible to confirm that the respective samples obtained in Production Examples 1 to 6 represent diffraction patterns unique to the crystal structure attributed to the anatase phase, and thus all the samples produced by the above producing method are anatase-type titanium oxides.

2. Structural Analysis by Transmission Electron Microscope (TEM) Measurement and Ultraviolet-Visible Near-Infrared Spectrophotometry Next, the structures and the shapes of the anatase-type titanium oxides 1 to 6 obtained in Production Examples 1 to 6 were measured by using a transmission electron microscope (TEM) (JEM-2010HCKM, JEOL). The results are indicated on the left side of FIG. 8A to FIG. 8F.

The anatase-type titanium oxides 1 to 6 obtained in Production Examples 1 to 6 were measured by using an ultraviolet-visible near-infrared spectrophotometer (V670 spectrometer, JASCO). From the measurement result and the TEM measurement result, a structural model of particles of each sample was constructed. The results are indicated on the right side of FIG. 8A to FIG. 8F. Note that the analysis of structures of the anatase-type titanium oxide 4 (001 facet, hierarchical sphere $TiO_2$) and the anatase-type titanium oxide 5 (001 facet, microsphere $TiO_2$) was performed by using a structural model proposed in the reference mentioned in Production Example 4 and Production Example 5.

Figure 8A:
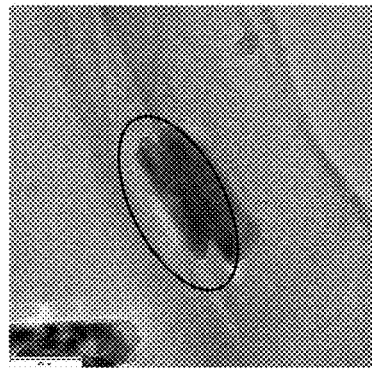
FIG. 8A is a diagram illustrating a transmission electron microscope (TEM) image (left) and a structural model (right) of an anatase-type titanium oxide 1 (101 facet, large $TiO_2$) in Test Example 1.
Figure 8A:
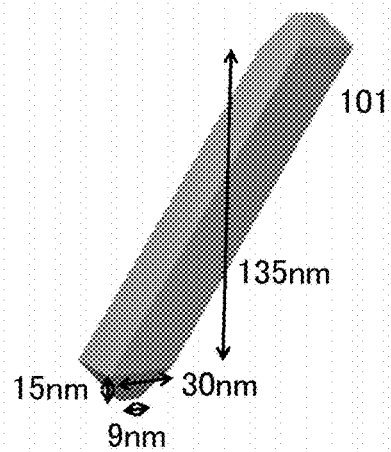

From the TEM image (the left in FIG. 8A) in FIG. 8A, a structural model (the right in FIG. 8A) which is formed of a parallelepiped with a base side of 30 nm×30 nm and a height of 135 nm and a regular quadrilateral pyramid with an upper side of 9 nm, a base side of 30 nm, and a height of 15 nm was constructed. Also, from the structural model, the surface area of 19,218 $nm^2$, the volume of 134,010 $nm^3$, the number of vertices of 16, and the length of the ridge line of 1,080 nm were obtained.

Figure 8B:
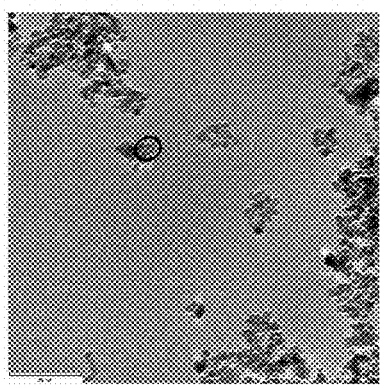
FIG. 8B is a diagram illustrating a TEM image (left) and a structural model (right) of an anatase-type titanium oxide 2 (101 facet, small $TiO_2$) in Test Example 1.
Figure 8B:
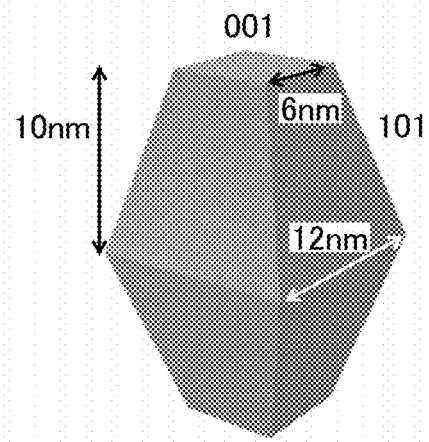

From the TEM image (the left in FIG. 8B) in FIG. 8B, a structural model (the right in FIG. 8B) which is formed of two regular quadrilateral pyramids with an upper side of 6 nm, a base side of 12 nm, and a height of 10 nm was constructed.

Also, from the structural model, the surface area of 824 $nm^2$, the volume of 1,680 $nm^3$, the number of vertices of 12, and the length of the ridge line of 183 nm were obtained.

Figure 8C:
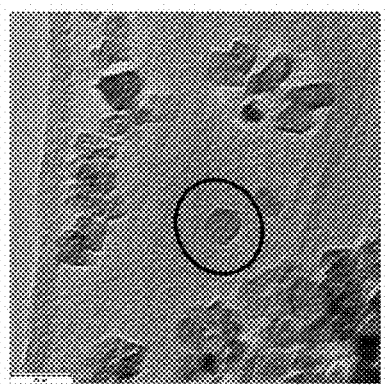
FIG. 8C is a diagram illustrating a TEM image (left) and a structural model (right) of an anatase-type titanium oxide 3 (101 and 001 facet $TiO_2$) in Test Example 1.
Figure 8C:
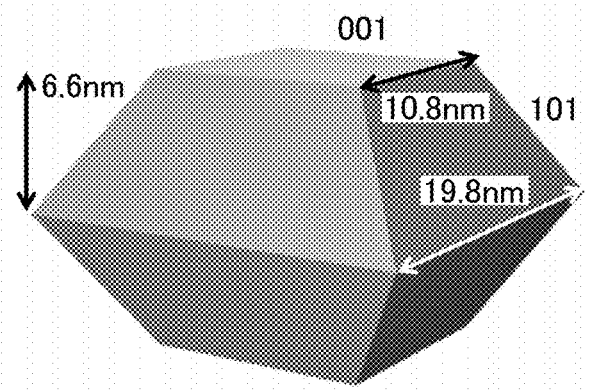

From the TEM image (the left in FIG. 8C) in FIG. 8C, a structural model (the right in FIG. 8C) which is formed of two regular quadrilateral pyramids with an upper side of 10.8 nm, a base side of 19.2 nm, and a height of 6.6 nm was constructed.

Also, from the structural model, the surface area of 1,172 $nm^2$, the volume of 3,048 $nm^3$, the number of vertices of 12, and the length of the ridge line of 234 nm were obtained.

Figure 8D:
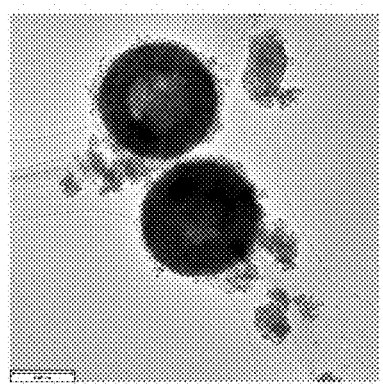
FIG. 8D is a diagram illustrating a TEM image (left) and a structural model (right) of an anatase-type titanium oxide 4 (001 facet, hierarchical sphere $TiO_2$) in Test Example 1.
Figure 8D:
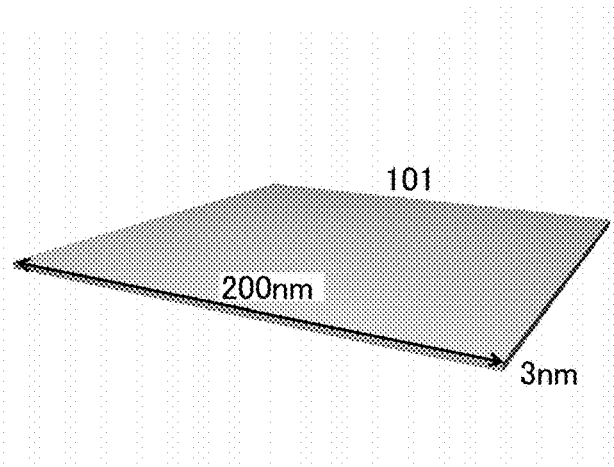

The TEM image on the left in FIG. 8D was confirmed and a sample having the same shape as the titanium oxide fine particles of the reference denoted in Production Example 4 was assumed to be obtained so that a structural model of a square pillar with a base side of 200 nm and a height of 3 nm (the right in FIG. 8D) was constructed from the sentences about the structural model in the reference denoted in Production Example 4 and scanning electron microscope (SEM) images.

Also, from the structural model, the surface area of 82,400 $nm^2$, the volume of 120,000 $nm^3$, the number of vertices of 8, and the length of the ridge line of 1,612 nm were obtained.

Figure 8E:
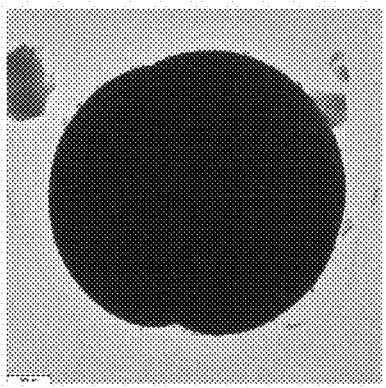
FIG. 8E is a diagram illustrating a TEM image (left) and a structural model (right) of an anatase-type titanium oxide 5 (001 facet, microsphere $TiO_2$) in Test Example 1.
Figure 8E:
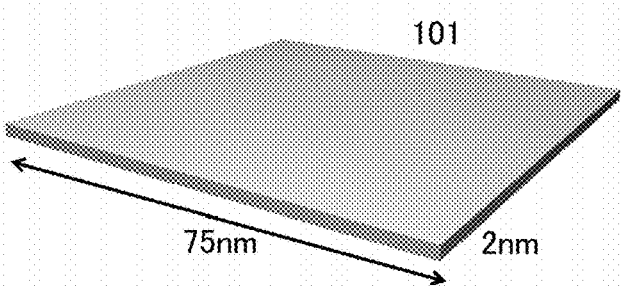

The TEM image on the left in FIG. 8E was confirmed so that a structural model of a square pillar with a base side of 75 nm and a height of 2 nm (the right in FIG. 8E) was constructed from the sentences about the structural model in the references denoted in Production Example 5 and the SEM images.

Also, from the structural model, the surface area of 11,850 $nm^2$, the volume of 11,250 $nm^3$, the number of vertices of 8, and the length of the ridge line of 608 nm were obtained.

Figure 8F:
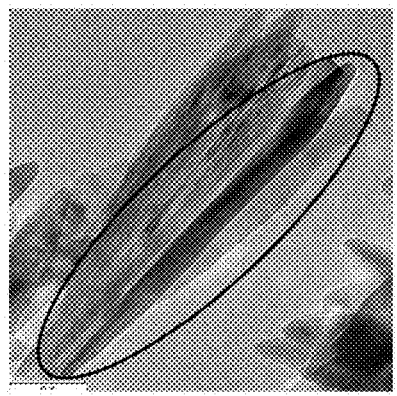
FIG. 8F is a diagram illustrating a TEM image (left) and a structural model (right) of an anatase-type titanium oxide 6 (201 and 401 facet $TiO_2$) in Test Example 1.
Figure 8F:
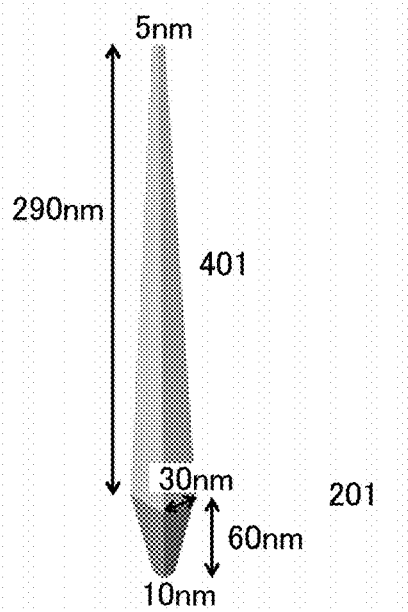

From the TEM image (the left in FIG. 8F) in FIG. 8F, a structural model (the right in FIG. 8F) which is formed of a regular quadrangular pyramid with an upper side of 10 nm, a base side of 30 nm, and a height of 60 nm and a regular quadrilateral pyramid with an upper side of 5 nm, a base side of 30 nm, and a height of 290 nm was constructed.

Also, from the structural model, the surface area of 25,310 $nm^2$, the volume of 129,917 $nm^3$, the number of vertices of 12, and the length of the ridge line of 1,589 nm were obtained.

Further, regarding the structural models of FIG. 8A to FIG. 8B, the surface area, the volume, the vertex, the ridge line, vertex/surface area, vertex/volume, ridge line/surface area, and ridge line/volume are summarized in Table 1.

TABLE 1

| No. | Image | Surface area [$nm^2$] | Volume [$nm^3$] | Vertex [Number] | Ridge line [nm] | Vertex/surface area [$10^{-4}$ $nm^{-2}$] | Vertex/volume [$10^{-4}$ $nm^{-3}$] | Ridge line/ surface area [$10^{-2}$ $nm^{-1}$] | Ridge line/ volume [$10^{-3}$ $nm^{-2}$] |
|---|---|---|---|---|---|---|---|---|---|
| 1 | FIG. 8A | 19218 | 134010 | 16 | 1080 | 8.3 | 1.2 | 5.6 | 8.1 |
| 2 | FIG. 8B | 824 | 1680 | 12 | 183 | 145.6 | 71.4 | 22.2 | 108.9 |
| 3 | FIG. 8C | 1172 | 3048 | 12 | 234 | 102.4 | 39.4 | 20.0 | 76.8 |
| 4 | FIG. 8D | 82400 | 120000 | 8 | 1612 | 1.0 | 0.7 | 2.0 | 13.4 |
| 5 | FIG. 8E | 11850 | 11250 | 8 | 608 | 6.8 | 7.1 | 5.1 | 54.0 |
| 6 | FIG. 8F | 25310 | 129917 | 12 | 1589 | 4.7 | 0.9 | 6.3 | 12.2 |

[Production Example 7] Production 1 of Cathode Electrode

Subsequently, electrodes provided with the anatase-type titanium oxides 1 to 6 were produced.

Specifically, first, 2 cm×2.5 cm titanium plates were calcinated at 450° C. for one hour. Next, 10 mg of each of the anatase-type titanium oxides 1 to 6 was dispersed in methanol, and this was applied on the calcinated titanium plates. Subsequently, the titanium plates coated with titanium oxides were heated at a rate of temperature rise of 100° C./hour and then calcinated at 500° C. for one hour. Then, grinding was performed so that the coated areas of the titanium oxides were 2 cm×2 cm on one side so as to produce six types of titanium oxide electrodes.

[Test Example 2] Reduction Property Confirmation Test of Catalyst

1. Chronoamperometry

Figure 9:
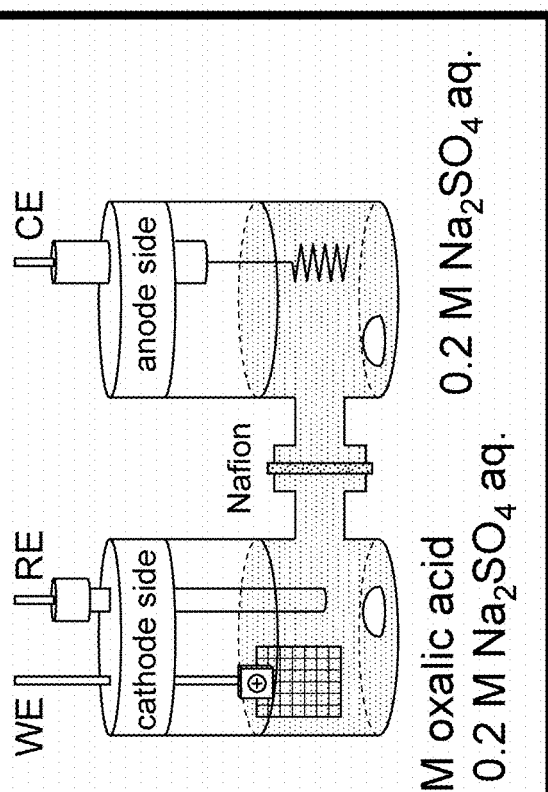
FIG. 9 is a schematic configuration diagram schematically illustrating a three-electrode system two-chamber electrical system cell in Test Example 2.
Figure 10A:
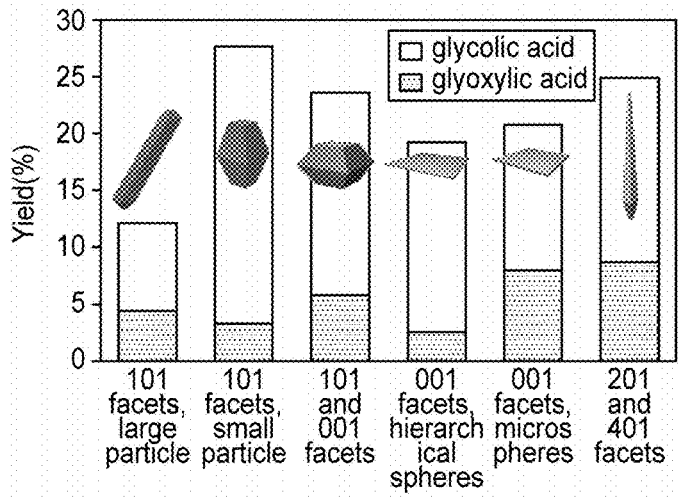
FIG. 10A is a graph illustrating yields of all products in chronoamperometry using electrodes provided with anatase-type titanium oxides 1 to 6 in Test Example 2.
Figure 10B:
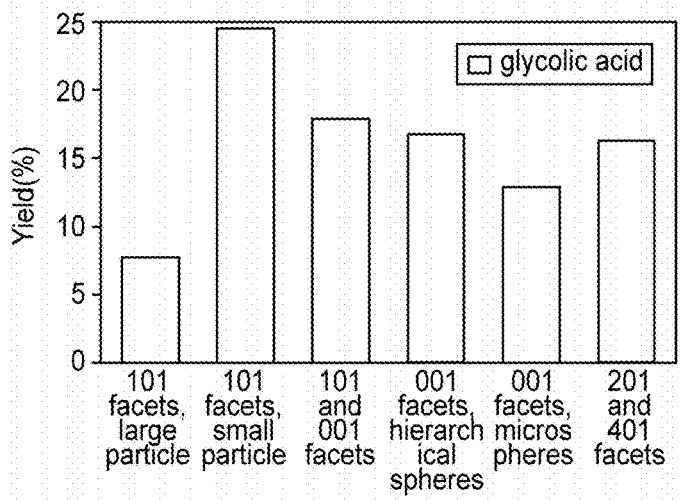
FIG. 10B is a graph illustrating a yield of glycolic acid in chronoamperometry using electrodes provided with anatase-type titanium oxides 1 to 6 in Test Example 2.
Figure 10C:
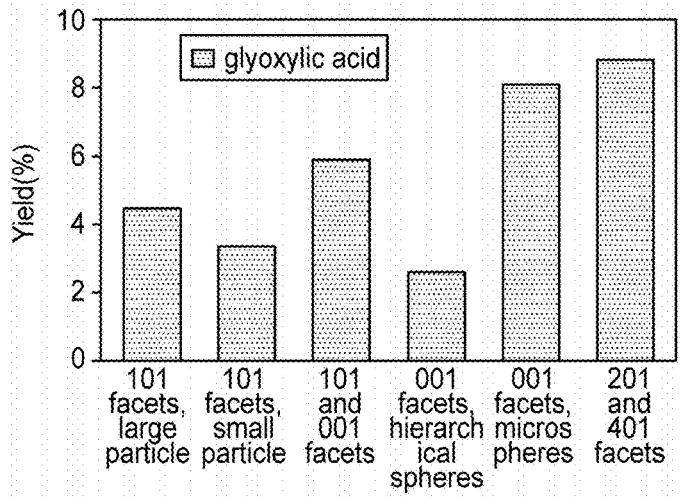
FIG. 10C is a graph illustrating a yield of glyoxylic acid in chronoamperometry using electrodes provided with anatase-type titanium oxides 1 to 6 in Test Example 2.
Figure 10D:
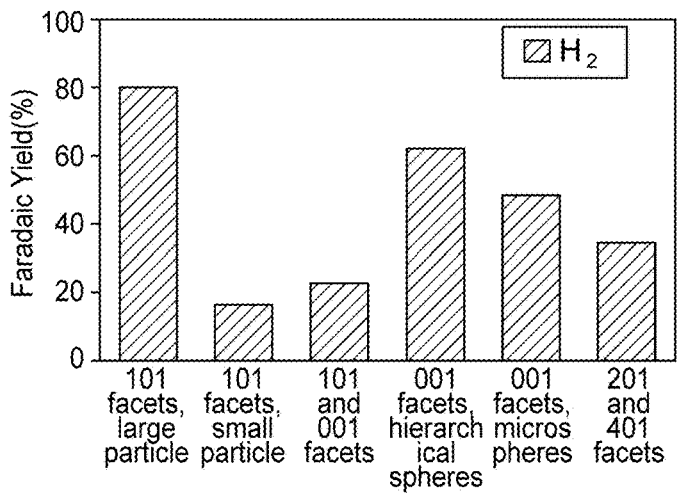
FIG. 10D is a graph illustrating Faraday efficiency of hydrogen production in chronoamperometry using electrodes provided with anatase-type titanium oxides 1 to 6 in Test Example 2.
Figure 10E:
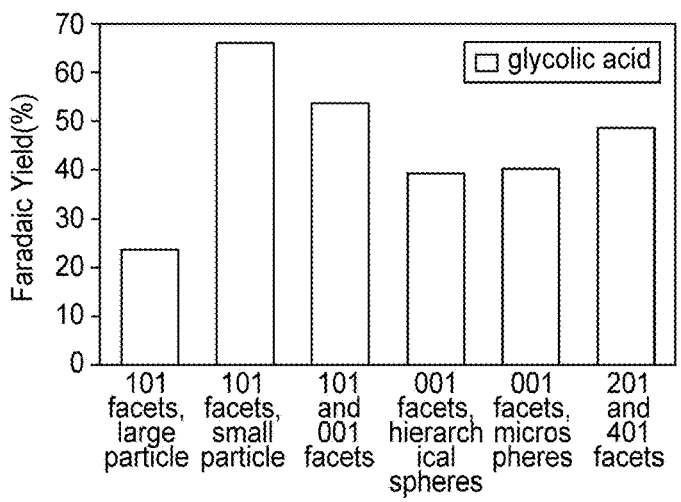
FIG. 10E is a graph illustrating Faraday efficiency of glycolic acid production in chronoamperometry using electrodes provided with anatase-type titanium oxides 1 to 6 in Test Example 2.
Figure 10F:
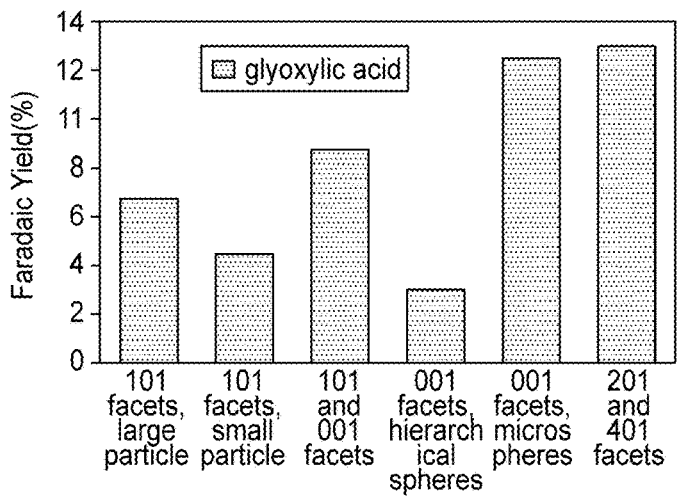
FIG. 10F is a graph illustrating Faraday efficiency of glyoxylic acid production in chronoamperometry using electrodes provided with anatase-type titanium oxides 1 to 6 in Test Example 2.
Figure 11A:
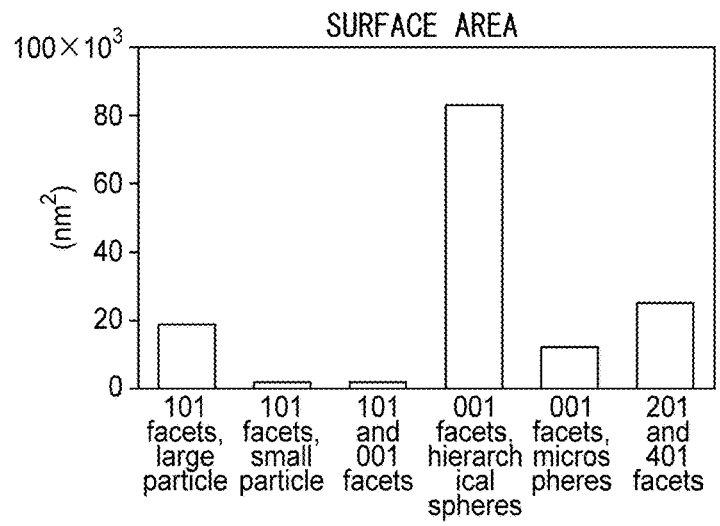
FIG. 11A is a graph illustrating a surface area per particle of anatase-type titanium oxides 1 to 6 in Test Example 2.
Figure 11B:
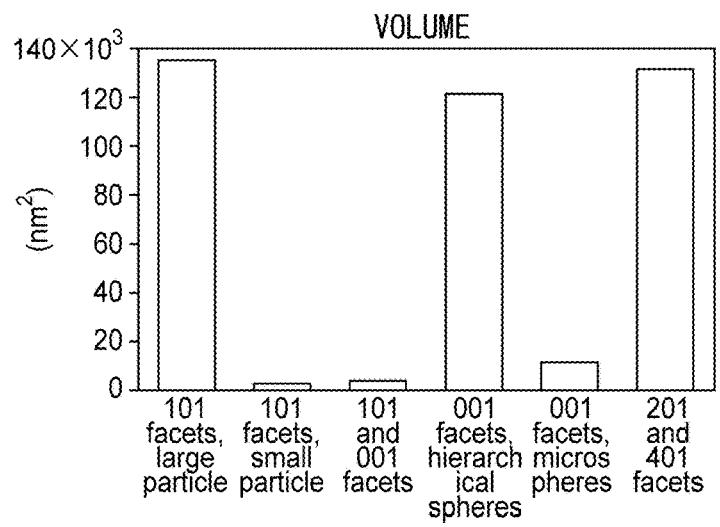
FIG. 11B is a graph illustrating a volume per particle of the anatase-type titanium oxides 1 to 6 in Test Example 2.
Figure 11C:
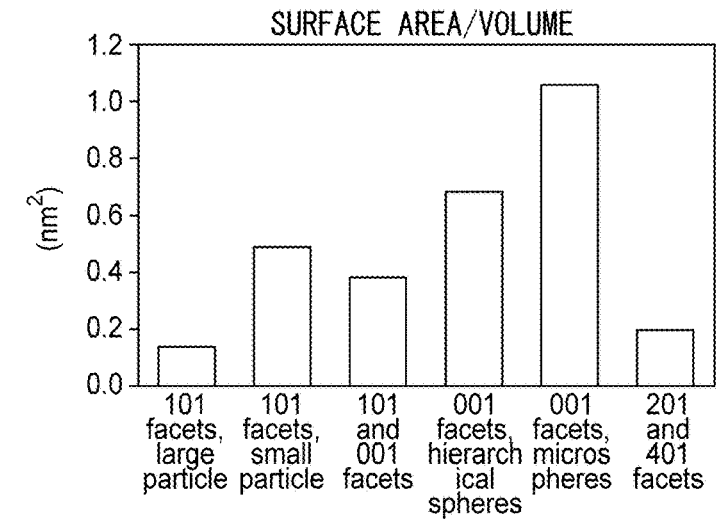
FIG. 11C is a graph illustrating a surface area/volume per particle of the anatase-type titanium oxides 1 to 6 in Test Example 2.
Figure 11D:
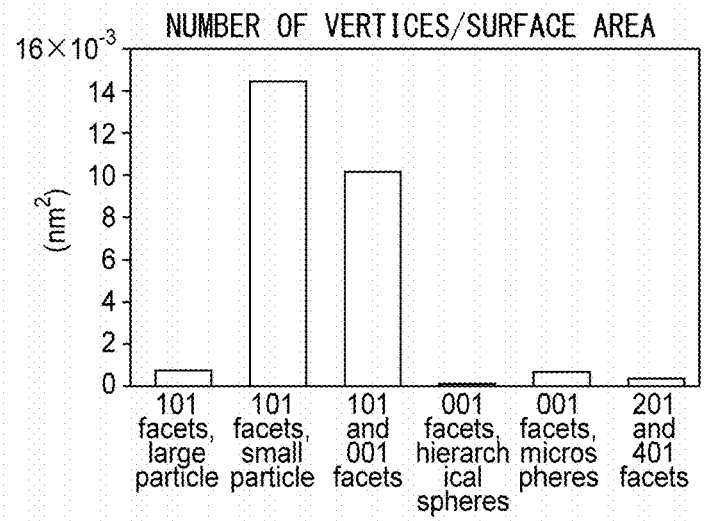
FIG. 11D is a graph illustrating a number of vertices/surface area per particle of the anatase-type titanium oxides 1 to 6 in Test Example 2.
Figure 11E:
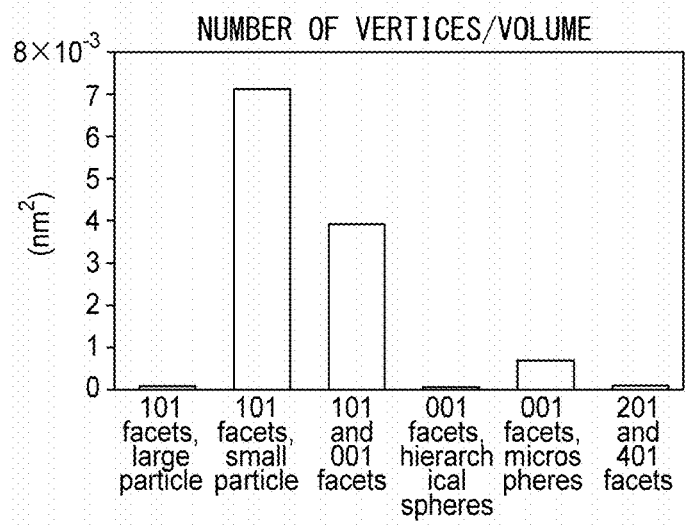
FIG. 11E is a graph illustrating a number of vertices/volume per particle of the anatase-type titanium oxides 1 to 6 in Test Example 2.
Figure 11F:
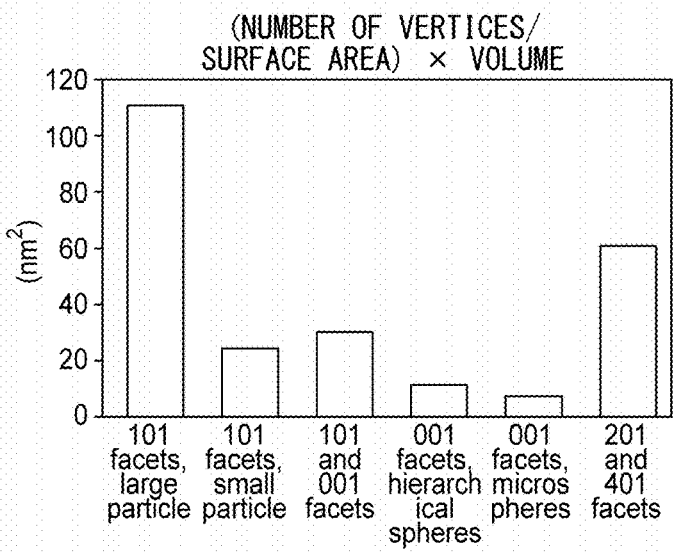
FIG. 11F is a graph illustrating (number of vertices/surface area)×volume per particle of the anatase-type titanium oxides 1 to 6 in Test Example 2.
Figure 11G:
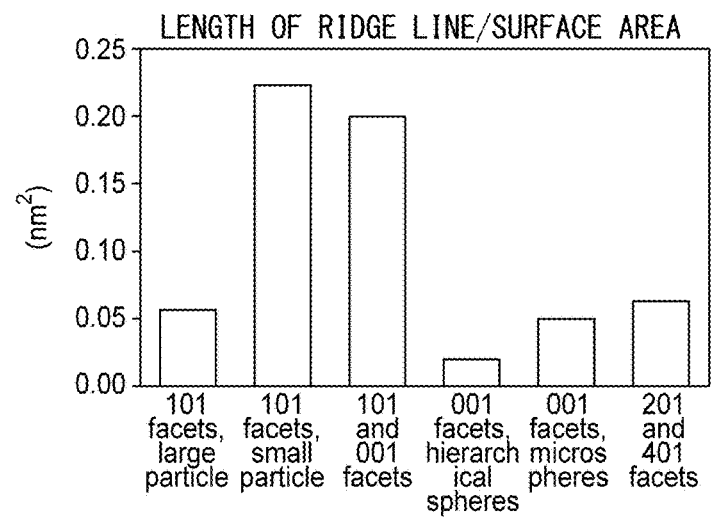
FIG. 11G is a graph illustrating a length of a ridge line/surface area per particle of the anatase-type titanium oxides 1 to 6 in Test Example 2.
Figure 11H:
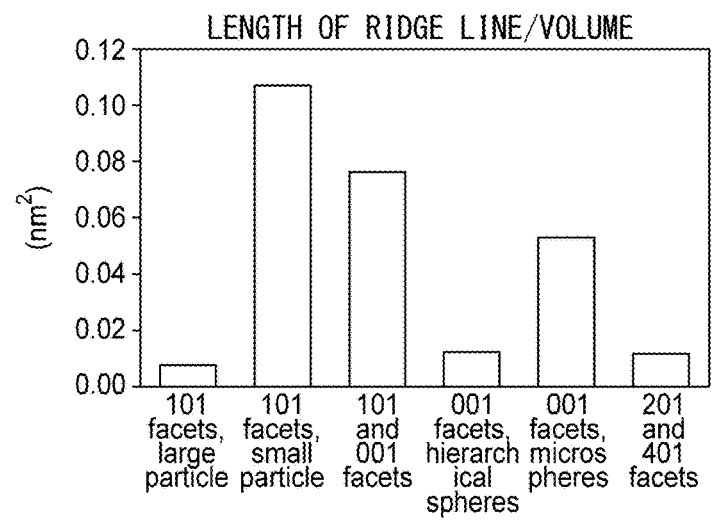
FIG. 11H is a graph illustrating the length of the ridge line/volume per particle of the anatase-type titanium oxides 1 to 6 in Test Example 2.
Figure 11I:
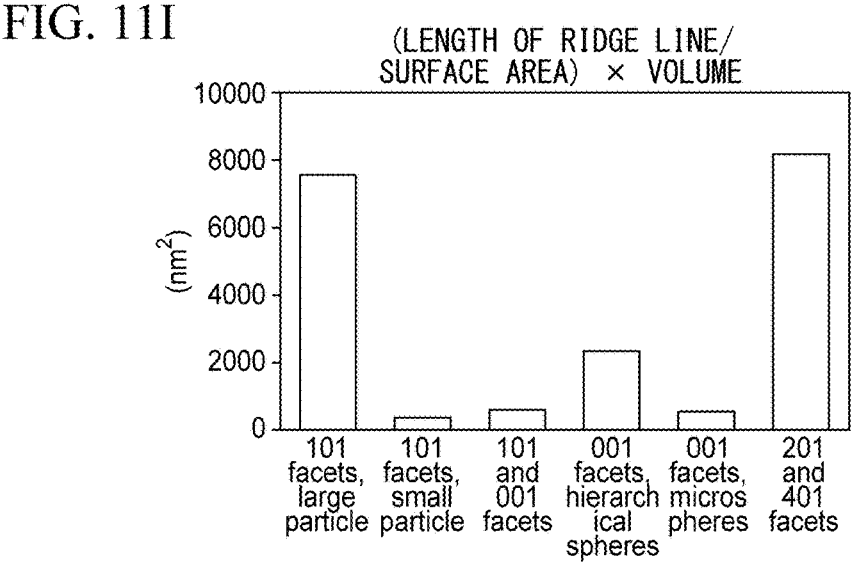
FIG. 11I is a graph illustrating (length of the ridge line/surface area)×volume per particle of the anatase-type titanium oxides 1 to 6 in Test Example 2.

With a three-electrode system two-compartment electrochemical cell (refer to FIG. 9), chronoamperometry was performed by using the six electrodes produced in Production Example 7 as cathodes. The measurement was performed by connecting the three-electrodes (a counter electrode, a working electrode and a reference electrode) to VersaSTAT4 potentiostat (AMETEC, Princeton Applied Research). In addition, a cell on the anode side and a cell on the cathode side were partitioned using a Nafion membrane (Nafion (registered trademark), NRE-212, Sigma-Aldrich) which is a proton conductive membrane. On the cathode side, a titanium oxide electrode was used as a working electrode and a silver-silver chloride electrode was used as a reference electrode. Coil-shaped platinum was used as a counter electrode on the anode side. 40 mL of a solution containing 0.2 M sodium sulfate and 0.03 M oxalic acid was put into the cell on the cathode side. 40 mL of 0.2 M sodium sulfate solution was put into the cell on the anode side. Each solution was adjusted to pH 2.1 with sulfuric acid. The electrochemical reduction reaction was performed at −0.7 V vs RHE, 50° C. for two hours. A reaction product was identified and quantified using high performance liquid chromatography (HPLC) (LC-20AD, Shimadzu). The gas as a side reaction product was identified and quantified using gas chromatography (GC-8A, Shimadzu). The results are indicated in FIG. 10A to FIG. 10F.

From FIG. 10A to FIG. 10F, it was found that the yield of glycolic acid was high on a catalyst in which the 101 face and the 001 face are exposed (anatase-type oxidation Titanium 2 (101 facet, small $TiO_2$)) as compared with the catalyst (anatase-type titanium oxide 1 (101 facet, large $TiO_2$)) in which only the 101 face is exposed (anatase-type oxidation Titanium 2 (101 facet, small $TiO_2$)). However, the yield of glycolic acid on the anatase-type titanium oxide 3 (101 and 001 facet $TiO_2$) in which the 001 face is widely exposed is slightly lower than that on the anatase-type titanium oxide 2 (101 facet, small $TiO_2$). Further, the yield of glycolic acid on the catalyst (anatase-type titanium oxide 4 (001 facet, hierarchical sphere $TiO_2$) in which the 001 surface of large area is exposed, the anatase-type titanium oxide 5 (001 facet, microsphere $TiO_2$)), and the catalyst (anatase-type titanium oxide 6 (201 and 401 facet $TiO_2$)) in which a 201 face and a 401 face are exposed was further lower than that on the anatase-type titanium oxide 2 (101 facet, small $TiO_2$). From the above results, it was presumed that crystal plane dependence of the catalyst in reduction of oxalic acid was not large.

Next, structural parameters per particle of each anatase-type titanium oxide catalyst are illustrated in FIG. 11A to FIG. 11I. Also, the conversion rates of oxalic acid, and the results of FIG. 10E, FIG. 11C, FIG. 11D, FIG. 11E, FIG. 11G, and FIG. 11H are summarized in Table 2.

surface area of the catalyst. On the other hand, the vertex/surface area and the ridge line/surface area were the highest in the anatase-type titanium oxide 2 (101 facet, small $TiO_2$) with the highest yield of glycolic acid 2, and were the second highest in the anatase-type titanium oxide 3 (101 facet and 001 facet, $TiO_2$) with the second highest yield of glycolic acid. From this fact, it was apparent that the concentration of the vertices or the ridge line on one catalyst particle is important for the production of glycolic acid from oxalic acid. That is, it has been shown that it is necessary for the reduction of the carboxylic acid that coordination unsaturated titanium present on the vertex or the ridge line, or active sites susceptible to charge concentration be present at a certain density.

Specifically, from FIGS. 11D, 11E, 11G, and 11H, it was clearly found for the first time that in a single titanium oxide particle, an anatase-type titanium oxide particle in which the vertex density per unit surface area is $8.0 \times 10^{-4}$ $nm^{-2}$ or more, or the vertex density per unit volume is $7.0 \times 10^{-4}$ $nm^{-3}$ or more, and the ridge line density per unit surface area is $5.0 \times 10^{-2}$ $nm^{-1}$ or more, or the ridge line density per unit volume is $8.0 \times 10^{-3}$ $nm^{-2}$ or more (hereafter, the above density may be referred to as "Condition 1") exhibits high activity for the synthesis of glycolic acid by electrochemical hydrogenation reduction of oxalic acid.

Further, it was clearly found for the first time that in a single titanium oxide particle, an anatase-type titanium oxide particle in which the vertex density per unit surface area is $1.0 \times 10^{-4}$ $nm^{-2}$ or more, or the vertex density per unit volume is $3.9 \times 10^{-3}$ $nm^{-3}$ or more, and the ridge line density per unit surface area is $2.0 \times 10^{-1}$ $nm^{-1}$ or more, or the ridge line density per unit volume is $7.5 \times 10^{-2}$ $nm^{-2}$ or more (hereafter, the above density may be referred to as "Condition 2") exhibits higher activity for the synthesis of glycolic acid by electrochemical hydrogenation reduction of oxalic acid.

Further, it was clearly found for the first time that in a single titanium oxide particle, an anatase-type titanium oxide particle in which the vertex density per unit surface area is $1.4 \times 10^{-2}$ $nm^{-2}$ or more, or the vertex density per unit volume is $7.0 \times 10^{-3}$ $nm^{-3}$ or more, and the ridge line density per unit surface area is $2.2 \times 10^{-1}$ $nm^{-1}$ or more, or the ridge line density per unit volume is $1.0 \times 10^{-1}$ $nm^{-2}$ or more (hereafter, the above density may be referred to as "Condition 3") exhibits particularly high activity for the synthesis of glycolic acid by electrochemical hydrogenation reduction of oxalic acid.

TABLE 2

|  | Specific surface area [$nm^2$] | Vertex/surface area [$10^{-4}$ $nm^{-2}$] | Vertex/volume [$10^{-4}$ $nm^{-3}$] | Ridge line/surface area [$10^{-2}$ $nm^{-1}$] | Ridge line/volume [$10^{-3}$ $nm^{-2}$] | Oxalic acid conversion rate [%] | Faraday efficiency of glycolic acid production [%] |
|---|---|---|---|---|---|---|---|
| Titanium 1/titanium plate | 19218.3 | 8.3 | 1.2 | 5.6 | 8.1 | 12.2 | 23.7 |
| Titanium 2/titanium plate | 823.7 | 145.6 | 71.4 | 22.2 | 108.9 | 27.9 | 66.1 |
| Titanium 3/titanium plate | 1172.1 | 102.4 | 39.4 | 20.0 | 76.9 | 23.8 | 53.6 |
| Titanium 4/titanium plate | 82400.0 | 1.0 | 0.7 | 2.0 | 13.4 | 19.4 | 39.2 |
| Titanium 5/titanium plate | 11850.0 | 6.8 | 7.1 | 5.1 | 54.0 | 21.0 | 40.2 |
| Titanium 6/titanium plate | 25310.1 | 4.7 | 0.9 | 6.3 | 12.2 | 25.1 | 48.5 |

Since the catalytic reaction usually proceeds on the surface of the catalyst, in general, the greater the specific surface area, the higher the activity of the catalyst. However, as is apparent from FIG. 11C, since the correlation between the surface area/volume and the catalytic activity is small, reduction of oxalic acid does not depend only on the specific In addition, from FIG. 11F and FIG. 11I, it was clearly found that the number of (the number of vertices/surface area)×volume and (length of ridge line/surface area)×volume corresponding to the total number of vertices and the total length of ridge lines included in each catalyst exhibit the same tendency as Faraday efficiency of hydrogen. Therefore, the reaction sites present on the vertices and the ridge line are active not only in the reduction of oxalic acid but also in hydrogen reduction, but in the same particle, in a case of the vertices and the ridge line having higher density than those of the above conditions 1, 2, or 3, the reduction of oxalic acid was preferable, and thus it was inferred that the generation of glycolic acid strongly depends on the density of reaction sites. On the other hand, it was inferred that the hydrogen reduction reaction does not depend on the arrangement or density of reaction sites but on the total amount of active sites included in the whole catalyst.

[Production Example 8] Production 2 of Cathode Electrode

Next, a titanium oxide/titanium mesh electrode in which a uniform anatase-type titanium oxide catalyst was firmly fixed on the surface of the titanium mesh was produced. Based on a known producing method (reference: Wu Qiang Wu, et al., "Hierarchical Oriented Anatase $TiO_2$ Nanostructure arrays on Flexible Substrate for Efficient Dye-sensitized Solar Cells", Sci. Rep., 3:1892, 2013.) as a producing method, titanium oxide was precipitated on a titanium mesh by a hydrothermal reaction treatment using titanium of the titanium mesh as a raw material so as to produce a cathode in which titanium oxide was chemically bonded to an electrode.

1. First Hydrothermal Treatment Step

Specifically, first, 2×2.5 $cm^2$ of a titanium mesh (100 mesh manufactured by Manabe Kogyo Co., Ltd.) and 30 mL of a 1M NaOH aqueous solution were put into a 50 mL Teflon crucible and sealed with a stainless steel jacket. Then, titanate ($H_2Ti_2O_5 \cdot H_2O$) was produced on the surface of the titanium mesh electrode by heating at 220° C. for 0, 1, 3, 6, 12, 18, 24, 48, or 72 hours.

2. Ion Exchange Treatment Step

Next, the titanium mesh was washed with ion exchanged water and immersed in 20 mL of 0.1 M HCl solution for 10 minutes. Subsequently, the titanium mesh was washed with ion exchanged water and ethanol and then air-dried.

3. First Hydrothermal Treatment Step

Next, the air-dried titanium mesh was put into a 50 mL Teflon crucible together with 40 mL of ion exchanged water and sealed with a stainless steel jacket. Then, an electrode which was heated at 200° C. for 24 hours and the titanium mesh surface covered with titanium oxide was produced. After reaction, nine kinds of titanium oxide/titanium mesh electrodes with different heating times at 220° C. in "1. First hydrothermal treatment step" were obtained by washing with ion exchanged water and air-drying.

[Test Example 3] Structural Analysis of Titanium Oxide/Titanium Mesh Electrode

1. Powder X-Ray Diffraction Measurement

Next, regarding nine kinds of titanium oxide/titanium mesh electrodes which were produced by changing the heating time at 220° C. in the above-described "1. First hydrothermal treatment step", a powder X-ray diffraction measurement was performed by using the same method as that in "1. Powder X-ray diffraction measurement" of Test Example 1. The results are indicated in FIG. 12.

Figure 12:
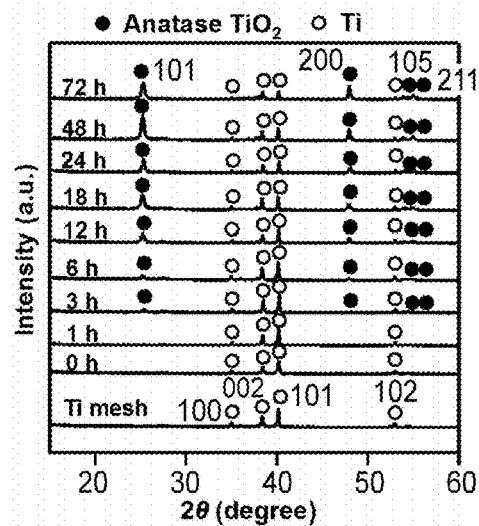
FIG. 12 is a graph illustrating powder X-ray diffraction patterns of nine kinds of titanium oxide/titanium mesh electrodes with different heating times at 220° C. in a first hydrothermal treatment step in Test Example 3.

From FIG. 12, a diffraction pattern derived from anatase-type titanium oxide was observed by heating for three hours or more. In addition, it was apparent that the diffraction intensity of the anatase-type titanium oxide was increased as the heating time was increased. From the above, it was apparent that a titanium mesh electrode coated with the anatase-type titanium oxide particle can be produced by the method of producing a cathode of the present invention.

2. Calculation of Produced Titanium Oxide Amount

Figure 13:
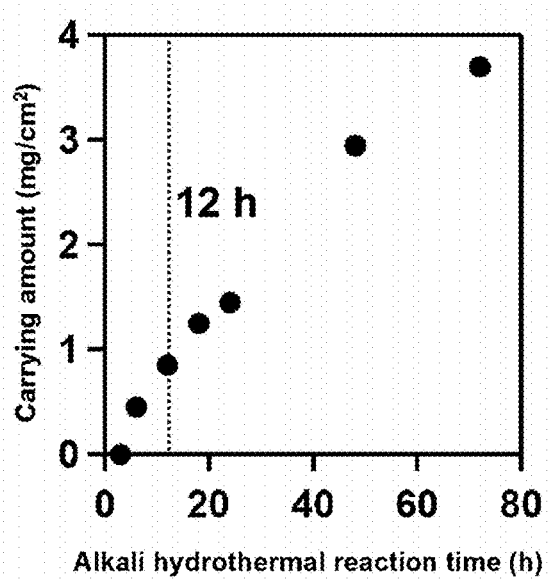
FIG. 13 is a graph illustrating a change due to a heating time of the amount of titanium oxide produced on a titanium mesh at 220° C. in the first hydrothermal treatment step in Test Example 3.

Subsequently, the weight of the titanium mesh of the raw material was subtracted from the weight of the produced titanium oxide/titanium mesh electrode to calculate the produced titanium oxide amount, and a graph illustrating the heating time dependency of the titanium oxide amount at 220° C. in the first hydrothermal treatment step is shown in FIG. 13.

From FIG. 13, it was apparent that as the heating time at 220° C. in the first hydrothermal treatment step was increased, the produced titanium oxide amount was increased.

3. Measurements of TEM and SEM

Next, the structures and the shapes of a titanium mesh as a raw material, and the titanium oxide/titanium mesh electrode of which a heating time at 220° C. in the first hydrothermal treatment step was 12 hours were measured by using a TEM (JEM-2010HCKM, JEOL).

Next, the structures and the shapes of the titanium oxide/titanium mesh electrode of which a heating time at 220° C. in the first hydrothermal treatment step was 12 hours were measured by using a SEM (JSM-IT100). The TEM image and the SEM image are illustrated in FIG. 14.

Figure 14:
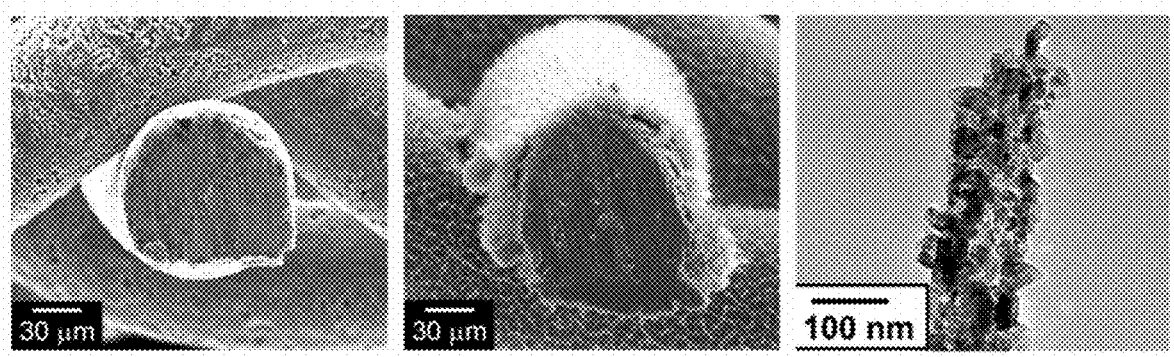
FIG. 14 (left) is a scanning electron microscope (SEM) image of a titanium mesh of a raw material in Test Example 3.

From the SEM images of the left and the center of FIG. 14, it was confirmed that porous titanium oxide was formed on the surface of the titanium mesh. Further, from the TEM image on the right of FIG. 14, it was confirmed that the porous titanium oxide is an agglomerate of titanium oxide crystals of about 50 nm. A structural model was constructed and analyzed for a single titanium oxide particle forming the aggregate. As a result, the average vertex density per unit surface area was $8.1 \times 10^{-3}$ $nm^{-2}$. Further, the average vertex density per unit volume was $1.3 \times 10^{-1}$ $nm^{-3}$. Further, the average ridge line density per unit surface area was $7.5 \times 10^{-1}$ $nm^{-1}$. Further, the average ridge line density per unit volume was $1.2 \times 10^{-1}$ $nm^{-2}$.

[Test Example 4] Reduction Property Confirmation Test 1 of Titanium Oxide/Titanium Mesh Electrode 1. Chronoamperometry Regarding nine kinds of titanium oxide/titanium mesh electrodes produced in Production Example 8, chronoamperometry was performed by using the same method as that used in "1. Chronoamperometry" of Test Example 2. The reaction product was identified and quantified using HPLC (LC-20AD, Shimadzu). The results are indicated in FIG. 15A and FIG. 15B.

Figure 15A:
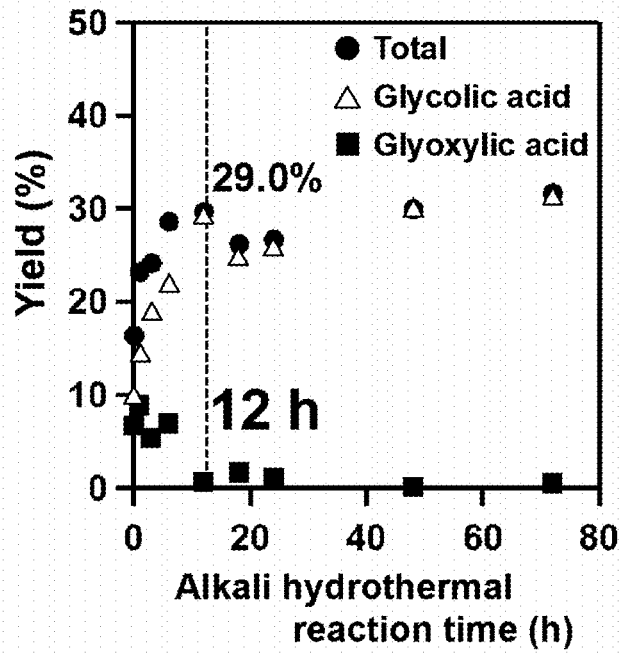
FIG. 15A is a graph illustrating yields of all products, glycolic acid, and glyoxylic acid in chronoamperometry using nine kinds of titanium oxide/titanium mesh electrodes with different heating times at 220° C. in the first hydrothermal treatment step in Test Example 4.
Figure 15B:
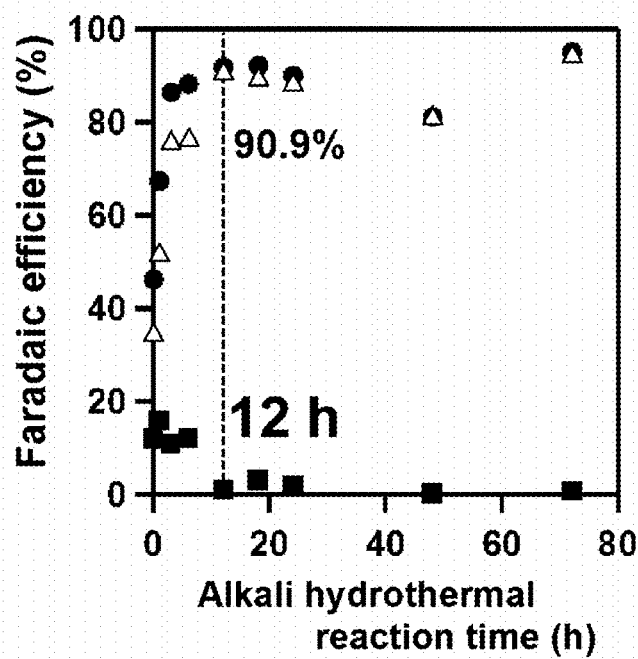
FIG. 15B is a graph illustrating Faraday efficiency of all products, glycolic acid, and glyoxylic acid in chronoamperometry using nine kinds of titanium oxide/titanium mesh electrodes with different heating times at 220° C. in the first hydrothermal treatment step in Test Example 4.

As is apparent from FIG. 15A and FIG. 15B, the yield and Faraday efficiency to glycolic acid as monohydric alcohol were increased with the heating time and became almost constant (yield 29.0%, Faraday efficiency 90.9%) in 12 hours. Further, the yield of glycolic acid on this electrode was larger than that (24.6%) in the case of the electrode containing the anatase-type titanium oxide 2 (101 facet, small $TiO_2$) obtained in Production Example 2. From these points, it was clearly found that an active site having a sufficient density necessary for the reduction of the carboxylic acid was present on the titanium oxide particle produced by using the method for producing the cathode of the present invention.

In addition, from the viewpoint that the yield was saturated under the hydrothermal reaction condition at 220° C. for 12 hours, it was suggested that almost the entire surface of the titanium mesh used under this condition was covered with anatase-type titanium oxide.

In addition, as a control group, the chronoamperometry was performed by using an electrode (catalyst amount: 1.0 mg/cm$^2$) produced by applying anatase-type titanium oxide fine particles (JRC-TIO-7) to a titanium mesh. As a result, the yields of the reduction products (glyoxylic acid and glycolic acid) were 25.4% and the Faraday efficiency of the oxalic acid reduction reaction was 76.9%. On the other hand, on the titanium oxide/titanium mesh electrode (catalyst amount: 0.85 mg/cm$^2$) which was produced by using the method for producing a cathode of the present invention, and the titanium oxide/titanium mesh electrode of which a heating time at 220° C. in the first hydrothermal treatment step was 12 hours, a 29.0% yield of glycolic acid was obtained, and the Faraday efficiency at that time was 90.9%. The above difference was presumed to be because the reduction reaction of oxalic acid smoothly proceeds on a mesh-shaped electrode in which titanium oxide is firmly bonded to the titanium electrode.

[Test Example 5] Reduction Property Confirmation Test 2 of Titanium Oxide/Titanium Mesh Electrode 1. Chronoamperometry Among the nine kinds of titanium oxide/titanium mesh electrodes produced in Production Example 8, regarding the titanium oxide/titanium mesh electrode of which a heating time at 220° C. in the first hydrothermal treatment step was 12 hours, the chronoamperometry was performed by using the same method as that used in "1. Chronoamperometry" of Test Example 2 except for changing the conditions such that the reaction temperature was 40° C., 50° C., 60° C., 70° C., or 80° C., a constant potential was −0.76 V vs. RHE, and pH was 2.1 or 1.0. The reaction product was identified and quantified using HPLC (LC-20AD, Shimadzu). The results are indicated in FIG. 16A and FIG. 16B.

Figure 16A:
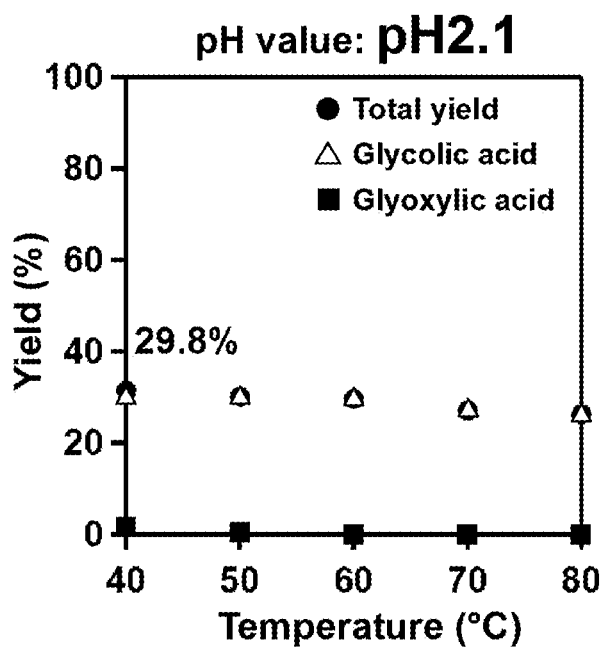
FIG. 16A is a graph illustrating yields of all products, glycolic acid, and glyoxylic acid in chronoamperometry performed under the conditions of a reaction temperature of 40° C. to 80° C. at pH 2.1 using a titanium oxide/titanium mesh electrode in which a heating time at 220° C. in the first hydrothermal treatment step is 12 hours in Test Example 5.
Figure 16B:
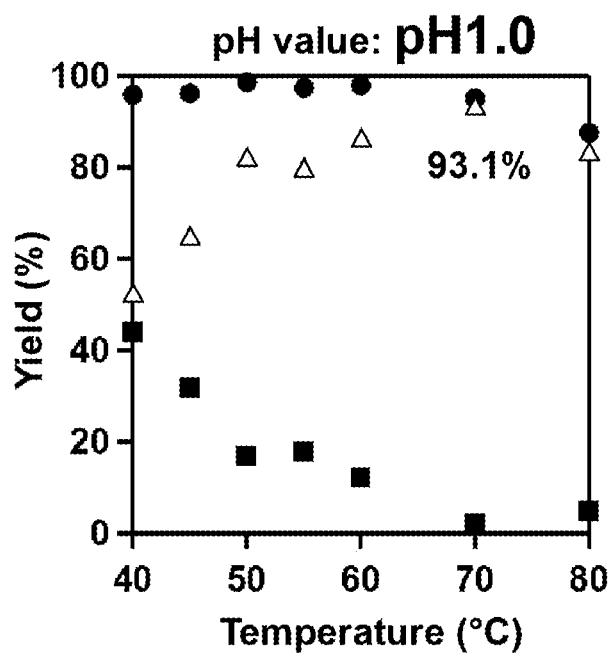
FIG. 16B is a graph illustrating yields of all products, glycolic acid, and glyoxylic acid in chronoamperometry performed under the conditions of a reaction temperature of 40° C. to 80° C. at pH 1.0 using a titanium oxide/titanium mesh electrode in which a heating time at 220° C. in the first hydrothermal treatment step is 12 hours in Test Example 5.

As is apparent from FIG. 16A, under the condition of pH=2.1, the yield of the product was about 30%. On the other hand, as is apparent from FIG. 16B, under the condition of pH=1.0, the yield of glycolic acid was increased with the reaction temperature and a high yield of 93.1% at 70° C. was obtained. From this result, under the condition of pH=1.0, it was suggested that a sufficient amount of protons was supplied onto the titanium oxide/titanium mesh electrode, so that the hydrogenation of oxalic acid proceeded promptly, and glycolic acid was produced.

[Production Example 9] Production 1 of Membrane Electrode Assembly for Alcohol Synthesis 1. Production of Cathode Electrode Among the nine kinds of titanium oxide/titanium mesh electrodes produced in Production Example 8, the titanium oxide/titanium mesh electrode of which a heating time at 220° C. in the first hydrothermal treatment step was 12 hours was cut into a size of 2×2 cm$^2$ so as to make a cathode electrode.

2. Production of Anode Electrode Using IrO$_2$

First, 20 mg of IrO$_2$ (Wako Pure Chemical Industries, Ltd.) ground in a mortar, 120 μL of a Nafion (registered trademark) solution (5 wt %), 1.2 mL of ion exchanged water, and 1.2 mL of 2-propanol were mixed in a vial. Next, the mixed solution was dispersed by an ultrasonic washer so as to produce a catalyst ink. The produced catalyst ink was uniformly applied to a 2×10 cm$^2$ gas diffusion carbon electrode (produced by SGL Carbon AG, Sigracet 25BC) by repeated application with a brush while drying, and the carrying amount of the IrO$_2$ catalyst was set to 1 mg/cm$^2$. The completely air-dried electrode was cut into a size of 2×2 cm$^2$ to obtain an anode electrode.

3. Production of Membrane Electrode Assembly

The anode electrode obtained in "2. Production of anode electrode using IrO$_2$", Nafion (registered trademark) 117 (produced by Sigma-Aldrich) cut into a size of 3×3 cm$^2$, and the cathode electrode obtained in "1. Production of cathode electrode" were arranged in this order, and pressed at 120° C. for 4 minutes, and thereby a membrane electrode assembly was obtained.

[Test Example 6] Glycolic Acid Synthesis Test 1 from Oxalic Acid

Figure 17A:
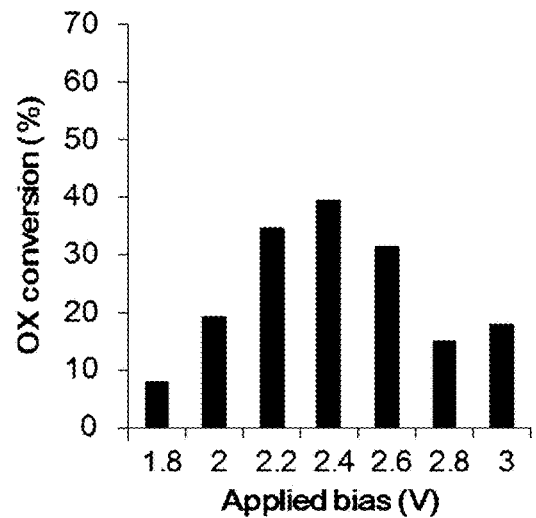
FIG. 17A is a graph illustrating an oxalic acid conversion rate of each potential in a glycolic acid synthesis test from oxalic acid using a polymer electrolyte alcohol electrosynthesis cell (PEAEC) equipped with a membrane electrode assembly in Test Example 6.
Figure 17B:
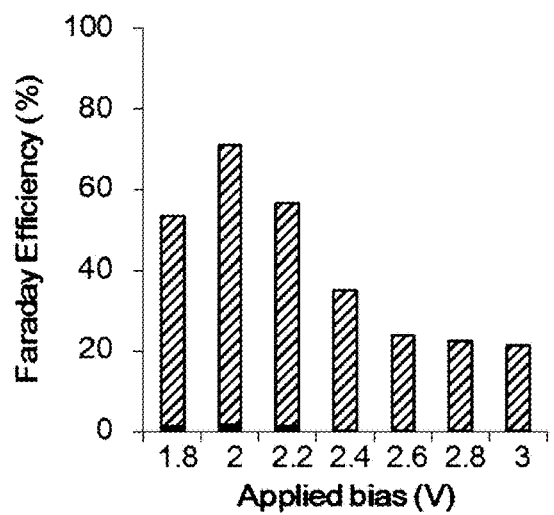
FIG. 17B is a graph illustrating Faraday efficiency of each potential in the glycolic acid synthesis test from oxalic acid using the PEAEC equipped with the membrane electrode assembly in Test Example 6.

A carbon block electrode, a silicon gasket, the membrane electrode assembly obtained in Production Example 9, a silicon gasket, and a carbon block electrode were attached to and adhered to a serpentine flow type fuel cell evaluation cell (produced by Electrochem, carbon block electrode) in this order. After removing dissolved oxygen in the reaction solution by a degasser, in a state where 30 mM of an oxalic acid aqueous solution flowed at a flow rate of 0.5 mL/min into a flow channel on the cathode side, and ion exchanged water flowed at a flow rate of 0.5 mL/min into a flow channel on the anode side, heating was performed at 60° C., and a potential difference of 1.8, 2.0, 2.2, 2.4, 2.6, 2.6, 2.8, or 3.0 V with respect to the cathode electrode was applied to the anode electrode by the potentiostat. At each potential, a constant potential operation was performed for 20 minutes, the product on the cathode side during that period was recovered, and the product was quantified using HPLC. As a result, the oxalic acid conversion rate at each potential is shown in FIG. 17A, and the Faraday efficiency is shown in FIG. 17B. Note that, in FIG. 17B, the filling (bottom) represents the Faraday efficiency of glyoxylic acid production and the diagonal line (top) represents the Faraday efficiency of glycolic acid production.

As is apparent from FIG. 17A and FIG. 17B, the oxalic acid conversion rate was 39.4% at the maximum (when 2.4 V was applied), and the Faraday efficiency of the C2 product glyoxylic acid and glycolic acid was 70.7% at the maximum (when 2.0 V was applied).

Figure 18:
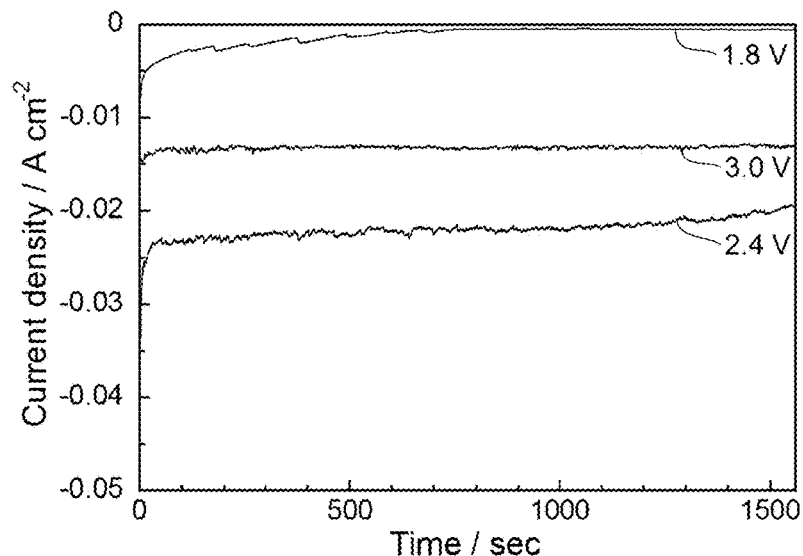
FIG. 18 is a graph illustrating a current density when 1.8 V, 2.4 V, and 3.0 V are applied in the glycolic acid synthesis test from oxalic acid using the PEAEC equipped with the membrane electrode assembly in Test Example 6.

In addition, the current density when 1.8 V, 2.4 V, and 3.0 V were applied is shown in FIG. 18.

As is apparent from FIG. 18, the current density was 22 mA/cm$^2$ (when 2.4 V was applied) at the maximum.

[Production Example 10] Production 2 of Membrane Electrode Assembly for Alcohol Synthesis 1. Production of Cathode Electrode Titanium was partially dissolved (HF treatment) by ultrasonic washing for 20 minutes in a state where a 2×2.5 cm$^2$ titanium mesh (manufactured by Manabe Kogyo Co., 100 mesh) was immersed in a 0.1% HF aqueous solution. The SEM image of the titanium mesh before and after HF treatment is shown in FIG. 19.

Figure 19:
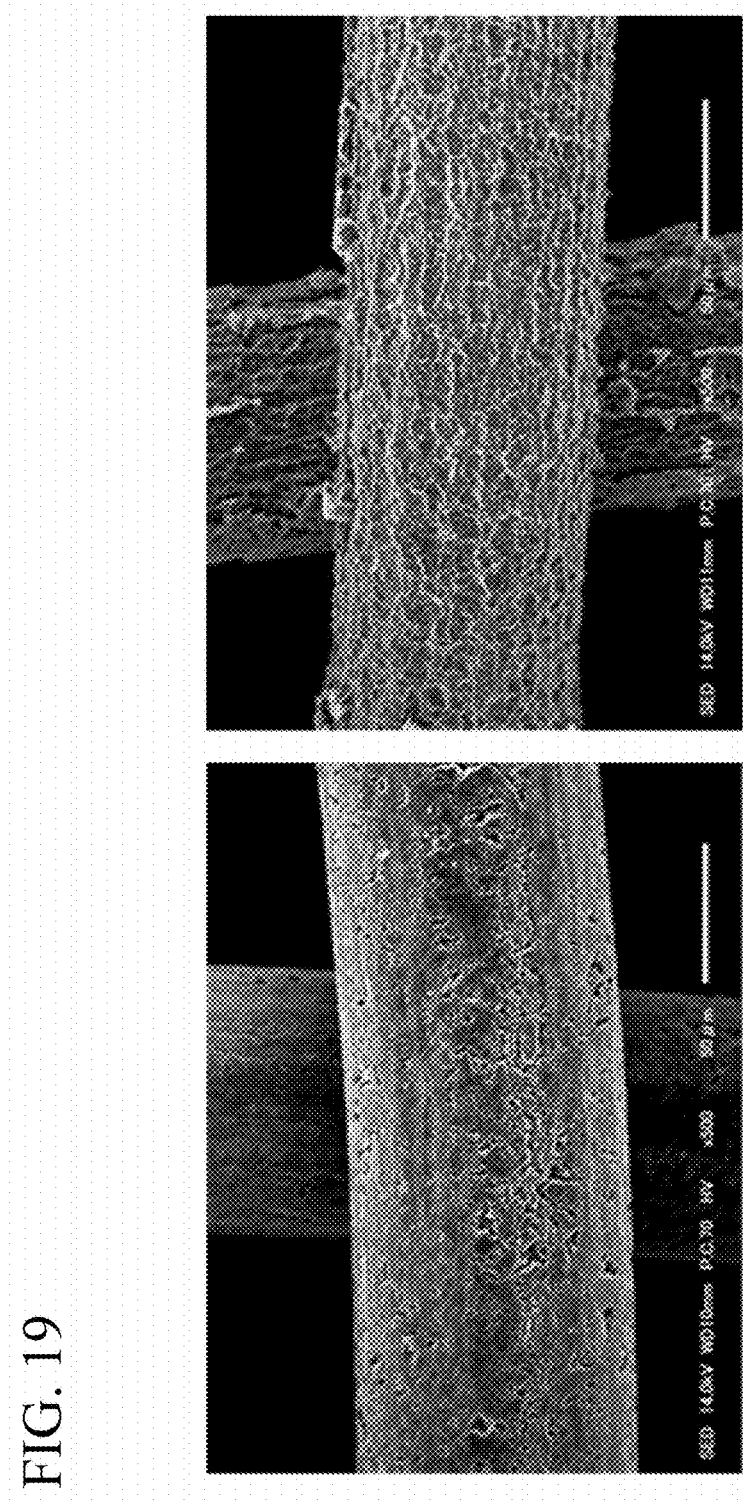
FIG. 19 (left) is a SEM image before a HF treatment in Production Example 10.

From FIG. 19, it was confirmed that the surface of the fine titanium wire was made porous by the HF treatment of the titanium mesh.

Next, the cathode electrode was obtained by washing with ion exchanged water and air-drying, and using the producing method described in Production Example 8 (the heating time at 220° C. in the first hydrothermal treatment step was 12 hours).

2. Production of Anode Electrode Using $IrO_2$

An anode electrode was obtained by using the same method as that used in "2. Production of anode electrode" of Production Example 9.

3. Production of Membrane Electrode Assembly

A membrane electrode assembly was obtained by using the same method as that used in "3. Production of membrane electrode assembly" described in Production Example 9 except for using a titanium mesh which is obtained in "1. Production of cathode electrode" through the HF treatment.

[Test Example 7] Glycolic Acid Synthesis Test 2 from Oxalic Acid

Figure 20A:
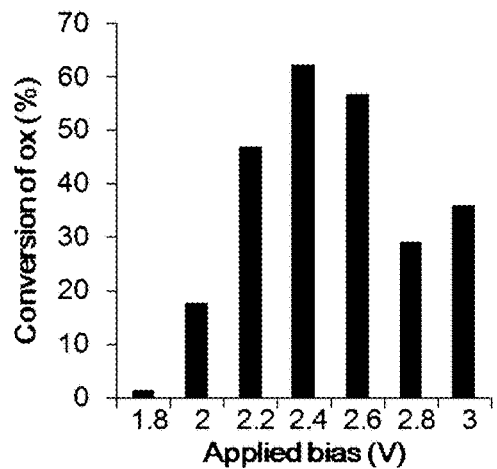
FIG. 20A is a graph illustrating an oxalic acid conversion rate of each potential in the glycolic acid synthesis test from oxalic acid using the PEAEC equipped with the membrane electrode assembly in Test Example 7.
Figure 20B:
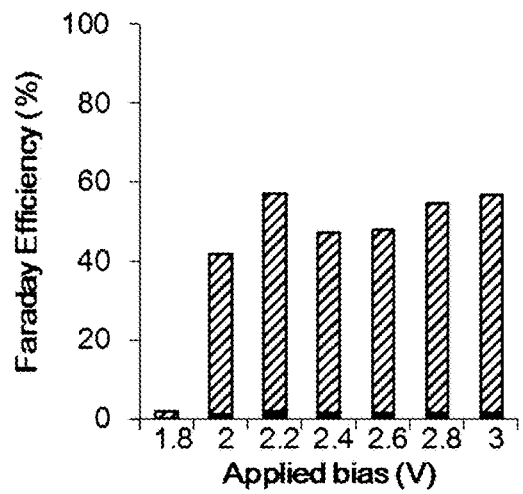
FIG. 20B is a graph illustrating Faraday efficiency of each potential in the glycolic acid synthesis test from oxalic acid using the PEAEC equipped with the membrane electrode assembly in Test Example 7.
Figure 21:
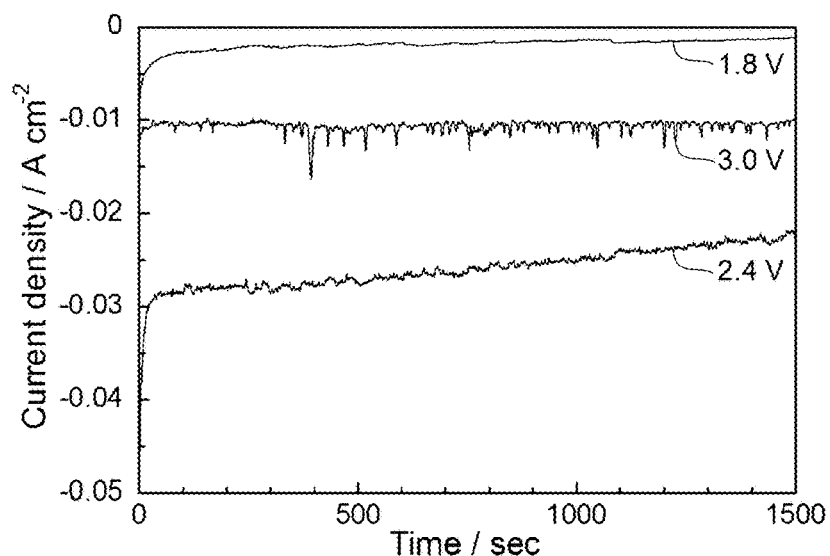
FIG. 21 is a graph illustrating a current density when 1.8 V, 2.4 V, and 3.0 V are applied in the glycolic acid synthesis test from oxalic acid using the PEAEC equipped with the membrane electrode assembly in Test Example 7.

The product on the cathode side was quantified by performing a constant potential operation using the same method as that used in Test Example 6 except for using the membrane electrode assembly obtained in Production Example 10. As a result, the oxalic acid conversion rate at each potential is shown in FIG. 20A, and the Faraday efficiency is shown in FIG. 20B. Note that, in FIG. 20B, the filling (bottom) represents the Faraday efficiency of glyoxylic acid production and the diagonal line (top) represents the Faraday efficiency of glycolic acid production. In addition, the current density when 1.8 V, 2.4 V, and 3.0 V were applied is shown in FIG. 21.

As is apparent from FIG. 20A and FIG. 20B, the oxalic acid conversion rate was 62.2% at the maximum (when 2.4 V was applied), and the Faraday efficiency of the C2 product glyoxylic acid and glycolic acid was 57.0% at the maximum (when 2.2 V was applied). As compared with the result of the above-described Test Example 6 (FIG. 17A and FIG. 17B), due to the porosity of the titanium mesh, a remarkable improvement of oxalic acid conversion rate was confirmed. As is apparent from FIG. 21, the current density was 26 mA/cm² (when 2.4 V was applied) at the maximum.

Figure 22:
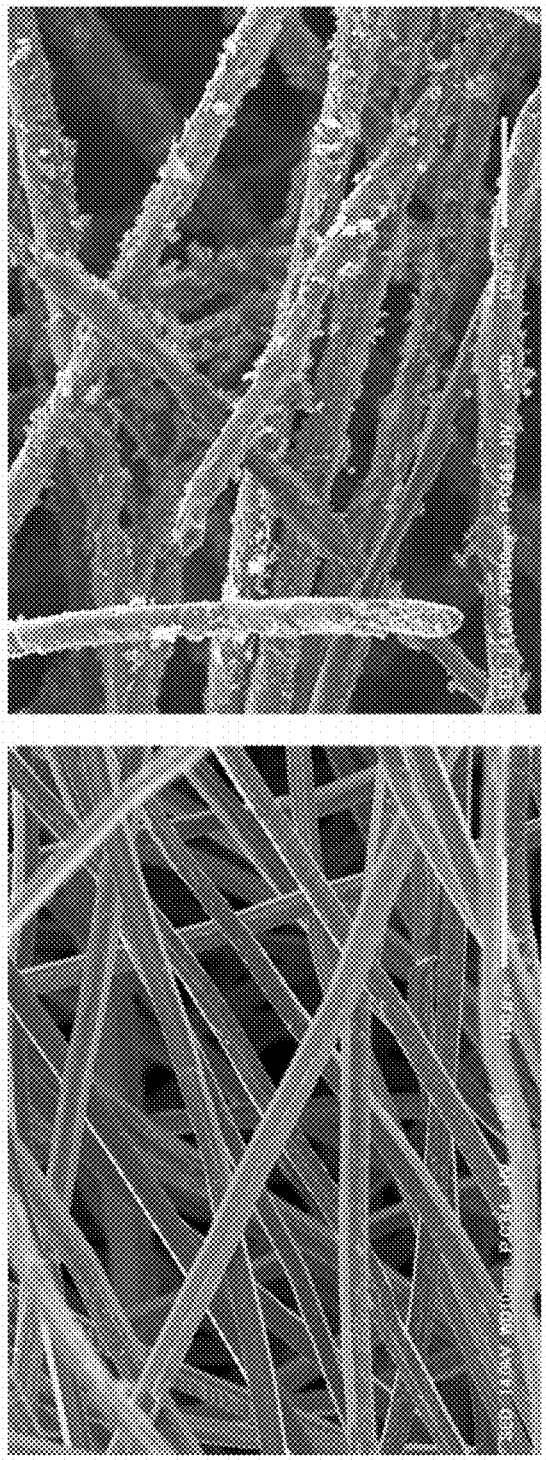
FIG. 22 (left) is a SEM image of a titanium felt as raw material in Production Example 11.

[Production Example 11] Production 3 of Membrane Electrode Assembly for Alcohol Synthesis 1. Production of Cathode Electrode A cathode electrode was obtained by using the same producing method described in Production Example 8 (the heating time at 220° C. in the first hydrothermal treatment step was 12 hours) except for using titanium felt in a size of 2×2 cm² instead of the titanium mesh (produced by Nikko Techno, Ltd., WB/Ti/10/150) in a size of 2×2 cm². An SEM image of the cathode electrode produced by the raw material of titanium felt is shown in FIG. 22. From FIG. 22, it was confirmed that porous titanium oxide was formed on the titanium felt surface.

2. Production of Anode Electrode Using $IrO_2$

An anode electrode was obtained by using the same method as that used in "2. Production of anode electrode" of Production Example 9.

3. Production of Membrane Electrode Assembly

A membrane electrode assembly was obtained by using the same method as that used in "3. Production of membrane electrode assembly" described in Production Example 9 except for using a cathode electrode produced by using the titanium felt obtained in "1. Production of cathode electrode".

[Test Example 8] Glycolic Acid Synthesis Test 3 from Oxalic Acid

Figure 23A:
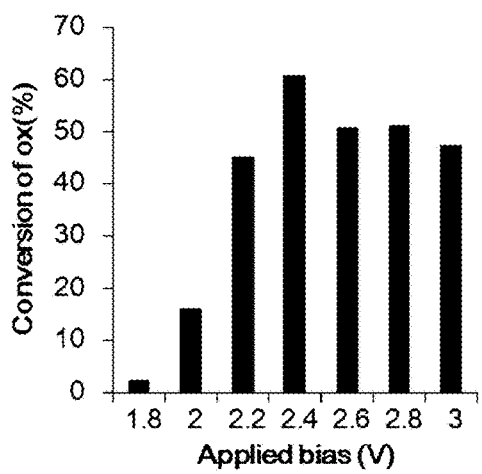
FIG. 23A is a graph illustrating an oxalic acid conversion rate of each potential in the glycolic acid synthesis test from oxalic acid using the PEAEC equipped with the membrane electrode assembly in Test Example 8.
Figure 23B:
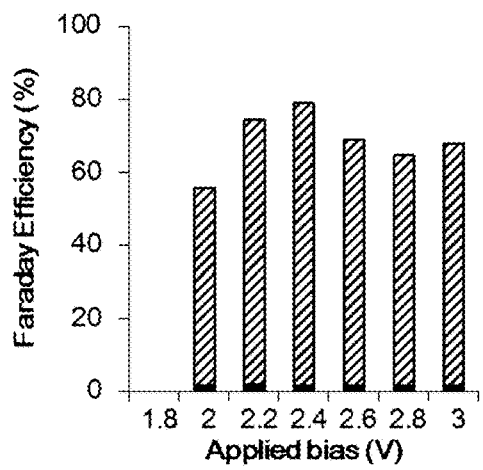
FIG. 23B is a graph illustrating Faraday efficiency of each potential in the glycolic acid synthesis test from oxalic acid using the PEAEC equipped with the membrane electrode assembly in Test Example 8.

The product on the cathode side was quantified by performing a constant potential operation using the same method as that used in Test Example 6 except for using the membrane electrode assembly obtained in Production Example 11. As a result, the oxalic acid conversion rate at each potential is shown in FIG. 23A, and the Faraday efficiency is shown in FIG. 23B. Note that, in FIG. 23B, the filling (bottom) represents the Faraday efficiency of glyoxylic acid production and the diagonal line (top) represents the Faraday efficiency of glycolic acid production.

Figure 24:
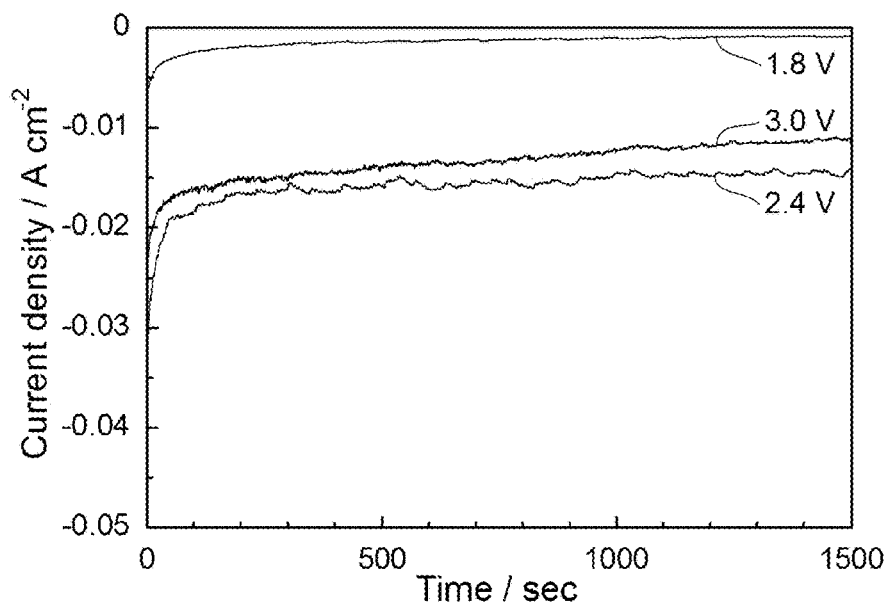
FIG. 24 is a graph illustrating a current density when 1.8 V, 2.4 V, and 3.0 V are applied in the glycolic acid synthesis test from oxalic acid using the PEAEC equipped with the membrane electrode assembly in Test Example 8.

In addition, the current density when 1.8 V, 2.4 V, and 3.0 V were applied is shown in FIG. 24.

As is apparent from FIG. 23A and FIG. 23B, the oxalic acid conversion rate was 60.8% at the maximum (when 2.4 V was applied), and the Faraday efficiency of the C2 product glyoxylic acid and glycolic acid was 78.6% at the maximum (when 2.4 V was applied). As compared with the result of the above-described Test Example 6 (FIG. 17A and FIG. 17B), due to the use of the titanium felt, the improvement of oxalic acid conversion rate and Faraday efficiency was confirmed. As is apparent from FIG. 24, the current density was 15 mA/cm² (when 2.4 V was applied) at the maximum.

[Production Example 12] Production 4 of Membrane Electrode Assembly for Alcohol Synthesis 1. Production of Cathode Electrode A cathode electrode was obtained by using the same method as that used in Production Example 11.

2. Production of Anode Electrode Using $IrO_2$ 40 mg of $IrO_2$ (Wako Pure Chemical Industries, Ltd.) ground in a mortar, 240 μL of a Nafion (registered trademark) solution (5 wt %), 2.4 mL of ion exchanged water, and 2.4 mL of 2-propanol were mixed in a vial. Next, the mixed solution was dispersed by an ultrasonic washer so as to produce a catalyst ink. The produced catalyst ink was uniformly applied to a 2×2 cm² gas diffusion carbon electrode (produced by SGL Carbon AG, Sigracet 25BC) by repeated application with a brush while drying, and the carrying amount of the $IrO_2$ catalyst was set to 10 mg/cm². The produced catalyst ink was completely air-dried, thereby obtaining an anode electrode.

3. Production of Membrane Electrode Assembly

A membrane electrode assembly was obtained by using the same method as that used in "3. Production of membrane electrode assembly" described in Production Example 9 except for using a cathode electrode produced by using the titanium felt obtained in "1. Production of cathode electrode" and an anode electrode on which $IrO_2$ obtained in "2. Production of anode electrode using $IrO_2$" is carried at a high density.

[Test Example 9] Glycolic Acid Synthesis Test 4 from Oxalic Acid

Figure 25A:
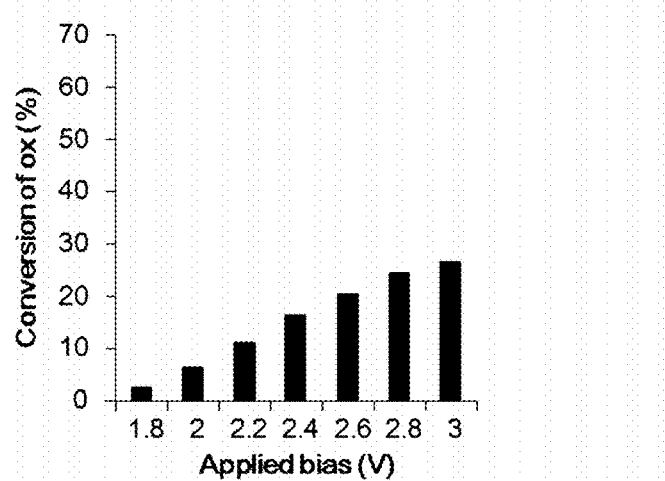
FIG. 25A is a graph illustrating an oxalic acid conversion rate of each potential in the glycolic acid synthesis test from oxalic acid using the PEAEC equipped with the membrane electrode assembly in Test Example 9.
Figure 25B:
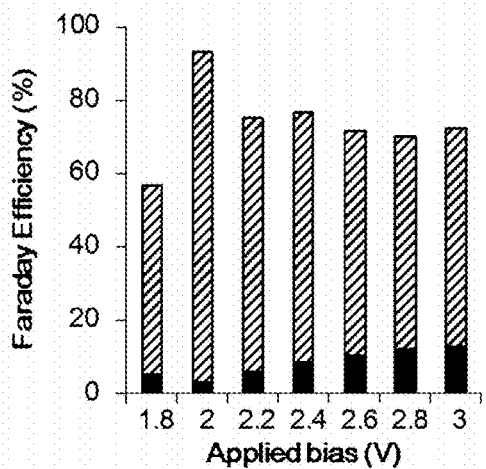
FIG. 25B is a graph illustrating Faraday efficiency of each potential in the glycolic acid synthesis test from oxalic acid using the PEAEC equipped with the membrane electrode assembly in Test Example 9.
Figure 26:
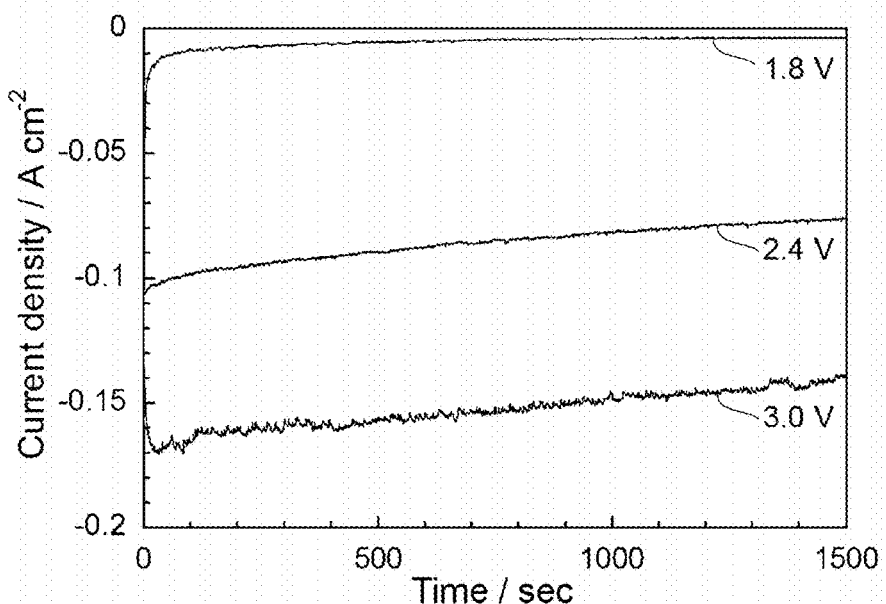
FIG. 26 is a graph illustrating a current density when 1.8 V, 2.4 V, and 3.0 V are applied in the glycolic acid synthesis test from oxalic acid using the PEAEC equipped with the membrane electrode assembly in Test Example 9.

The product on the cathode side was quantified by performing a constant potential operation using the same method as that used in Test Example 6 except for using the membrane electrode assembly obtained in Production Example 12, and a 1 M oxalic acid aqueous solution was used instead of a 30 mM aqueous oxalic acid solution. As a result, the oxalic acid conversion rate at each potential is shown in FIG. 25A, and the Faraday efficiency is shown in FIG. 25B. Note that, in FIG. 25B, the filling (bottom) represents the Faraday efficiency of glyoxylic acid production and the diagonal line (top) represents the Faraday efficiency of glycolic acid production. In addition, the current density when 1.8 V, 2.4 V, and 3.0 V were applied is shown in FIG. 26.

As is apparent from FIG. 25A and FIG. 25B, the oxalic acid conversion rate was 26.6% at the maximum (when 3.0 V was applied), and the Faraday efficiency of the C2 product glyoxylic acid and glycolic acid was 92.9% at the maximum (when 2.0 V was applied). By using a 1 M oxalic acid aqueous solution, a remarkable increase in the Faraday efficiency was confirmed as compared with the result of Test Example 8 (FIG. 23A and FIG. 23B) described above. As is apparent from FIG. 26, the current density was 150 mA/cm$^2$ (when 3.0 V was applied) at the maximum. Remarkable improvement was confirmed as compared with the result of Test Example 8 (FIG. 24) described above.

[Production Example 13] Production 5 of Membrane Electrode Assembly for Alcohol Synthesis 1. Production of Cathode Electrode A cathode electrode was obtained by using the same method as that used in Production Example 9.

2. Production of Anode Electrode Using $IrO_2$ 4 mg of $IrO_2$ (Wako Pure Chemical Industries, Ltd.) ground in a mortar, 43 pt of a Nafion (registered trademark) solution (5 wt %), 0.24 mL of ion exchanged water, and 0.24 mL of 2-propanol were mixed in a vial. Next, the mixed solution was dispersed by an ultrasonic washer so as to produce a catalyst ink. The produced catalyst ink was uniformly applied to a 2×2 cm$^2$ titanium paper (produced by Toho Technical Service Co., Ltd., WEBTi-K, 0.068 mm of thickness) by repeated application with a brush while drying, and the carrying amount of the $IrO_2$ catalyst was set to 1 mg/cm$^2$. The produced catalyst ink was completely air-dried, thereby obtaining an anode electrode.

3. Production of Membrane Electrode Assembly

A membrane electrode assembly was obtained by using the same method as that used in "3. Production of membrane electrode assembly" described in Production Example 9 except for using a cathode electrode produced by using the anode electrode with $IrO_2$ carried on the titanium paper obtained in "2. Production of anode electrode using $IrO_2$".

[Test Example 10] Glycolic Acid Synthesis Test 5 from Oxalic Acid

Figure 27A:
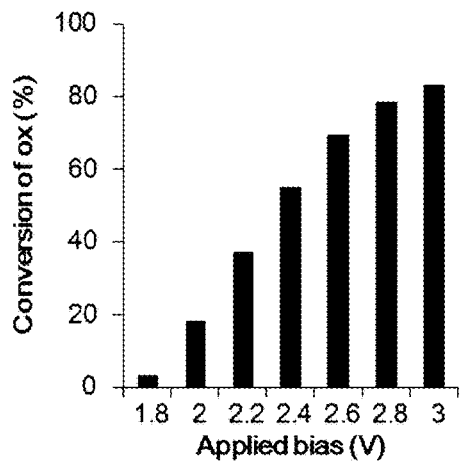
FIG. 27A is a graph illustrating an oxalic acid conversion rate of each potential in the glycolic acid synthesis test from oxalic acid using the PEAEC equipped with the membrane electrode assembly in Test Example 10.
Figure 27B:
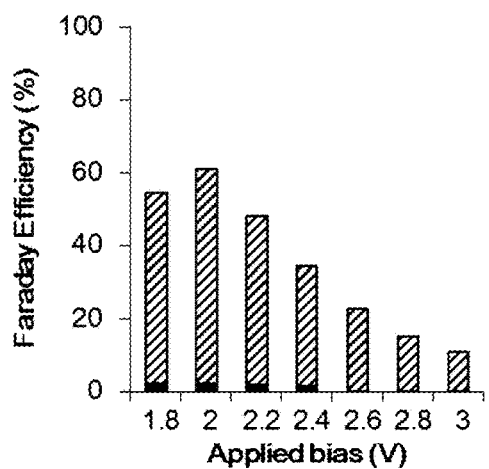
FIG. 27B is a graph illustrating Faraday efficiency of each potential in the glycolic acid synthesis test from oxalic acid using the PEAEC equipped with the membrane electrode assembly in Test Example 10.
Figure 28:
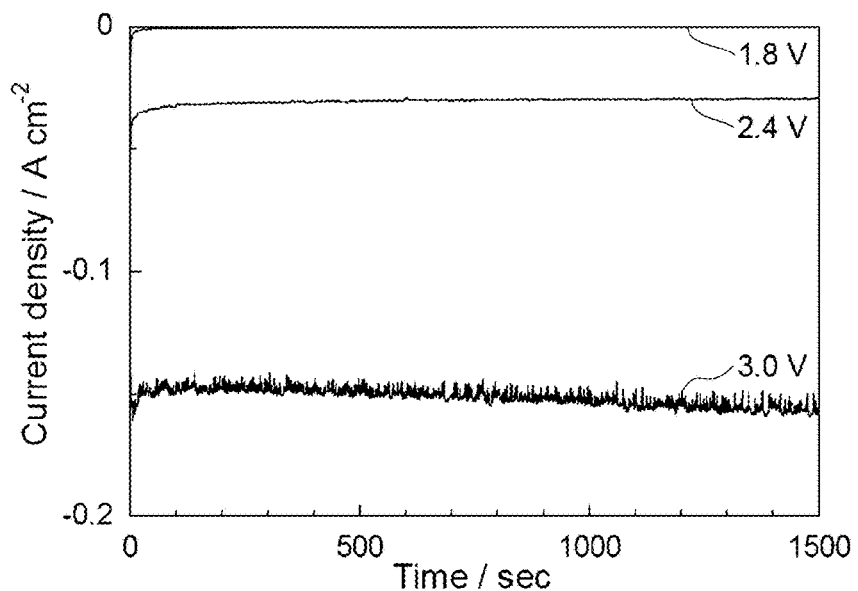
FIG. 28 is a graph illustrating a current density when 1.8 V, 2.4 V, and 3.0 V are applied in the glycolic acid synthesis test from oxalic acid using the PEAEC equipped with the membrane electrode assembly in Test Example 10.

The product on the cathode side was quantified by performing a constant potential operation using the same method as that used in Test Example 6 except for using the membrane electrode assembly obtained in Production Example 12. As a result, the oxalic acid conversion rate at each potential is shown in FIG. 27A, and the Faraday efficiency is shown in FIG. 27B. Note that, in FIG. 27B, the filling (bottom) represents the Faraday efficiency of glyoxylic acid production and the diagonal line (top) represents the Faraday efficiency of glycolic acid production. In addition, the current density when 1.8 V, 2.4 V, and 3.0 V were applied is shown in FIG. 28.

As is apparent from FIG. 27A and FIG. 27B, the oxalic acid conversion rate was 82.9% at the maximum (when 3.0 V was applied), and the Faraday efficiency of the C2 product glyoxylic acid and glycolic acid was 60.9% at the maximum (when 2.0 V was applied). As compared with the result of Test Example 6 (FIG. 17A and FIG. 17B), a remarkable increase in oxalic acid conversion rate at a high applied voltage was confirmed. As is apparent from FIG. 28, the current density was 150 mA/cm$^2$ (when 3.0 V was applied) at the maximum. As compared with the result of Test Example 6 (FIG. 18) described above, remarkable improvement in the current density was confirmed by changing the anode electrode from the gas diffusion carbon electrode to the titanium paper.

[Production Example 14] Production of Ti—Zr Composite Oxide

The Ti—Zr composite oxide was produced by using a solvothermal method.

Specifically, first, a total of 6.4 mmol of titanium(IV) tetraisopropoxide (produced by Tokyo Chemical Industry Co., Ltd., product code: T0133) and zirconium(IV) tetrapropoxide (about 70% 1-propanol solution) (produced by Tokyo Chemical Industry Co., Ltd., product code: Z0017) was mixed with 30 mL of anhydrous acetone (produced by Kanto Chemical Co., Inc., product number: 01866-25) in a 50 mL capacity Teflon-processed stainless steel autoclave (manufactured by AS ONE Corporation), and the mixture was heated at 200° C. for 12 hours in an electric oven. In order to investigate the catalyst of the optimum structure, $Ti_{1-x}Zr_xO_2$ (x=0.0, 0.005, 0.01, 0.02, 0.05, 0.1, 0.15, 0.2, 0.25, 0.5, 0.75, or 1.0) having different metal compositions of titanium and zirconium were prepared. A white precipitate obtained by the reaction was separated by a Centrifuge 5804 centrifuge (manufactured by Eppendorf AG.). Then, the separated precipitate was washed two or three times with about 50 mL of methanol and acetone, and dried at room temperature. The obtained powder sample was subjected to a calcination treatment under electrode production conditions so as to obtain twelve kinds of Ti—Zr composite oxides with different metal compositions of titanium and zirconium.

[Test Example 11] Structural Analysis of Ti—Zr Composite Oxide

1. Powder X-Ray Diffraction Measurement

Next, regarding 12 kinds of Ti—Zr composite oxides having different metal compositions of titanium and zirconium obtained in Production Example 14, the shape and crystal structure were examined by powder X-ray diffraction (XRPD) measurement of the Riken Material Science Beam Line BL44B2 (λ=1.0805 Å) at SPring-8. The results of the powder X-ray diffraction measurement are indicated in FIG. 29. In FIG. 29, (i) represents the results of the powder X-ray diffraction measurement of 12 kinds of Ti—Zr composite oxides having different metal compositions of titanium and zirconium in a case of x=0.0 to 1.0, and (ii) represents a diffraction peak on a 101 plane in the anatase-type crystal structure in a case of x=0.0 to 0.15.

From (i) of FIG. 29, an anatase-type diffraction peak was observed in $Ti_{1-x}Zr_xO_2$ (x=0.0 to 0.15) produced by the solvothermal method. On the other hand, a clear diffraction peak was not observed in $Ti_{1-x}Zr_xO_2$ (x=0.20 to 0.75).

From this, it was found that $Ti_{1-x}Zr_xO_2$ (x=0.20 to 0.75) has an amorphous structure with low crystallinity. In addition, $ZrO_2$ (x=1.0) indicates a diffraction pattern attributed to tetragonal system.

From (ii) in FIG. 29, the diffraction peak gradually shifted to a lower angle than the pure $TiO_2$ (x=0.0) as the $Zr^{4+}$ ratio increased. Accordingly, it was suggested that a lattice was extended by solidly dissolving $Zr^{4+}$ having a larger ionic radius than $Ti^{4+}$ in the titanium site in the titanium oxide (that is, $Ti^{4+}$ is substituted with $Zr^{4+}$). In addition, it was presumed that as the $Zr^{4+}$ ratio was increased, a half value width of a diffraction peak became smaller, and thereby the crystallinity was improved.

Further, fitting analysis by a Rietveld method was performed so as to obtain a cell parameter of $Ti_{1-x}Zr_xO_2$ having an anatase-type crystal structure. The results are indicated in FIG. 30A and FIG. 30B.

As is apparent from FIG. 30A, the lattice constants a and c of an anatase phase gradually increased with the increase in $Zr^{4+}$ content. This increase in the lattice constants suggested that $Zr^{4+}$ (0.720 Å) having a larger ionic radius than $Ti^{4+}$ (0.605 Å) was incorporated in the titanium site of the anatase phase. On the other hand, in $Ti_{0.85}Zr_{0.15}O_2$ (x=0.15), the value a was smaller and the value c was larger than $Ti_{1-x}Zr_xO_2$ of x<0.15. This irregular behavior was presumed to be due to $Ti_{0.85}Zr_{0.15}O_2$ being close to a critical state between the anatase phase and the amorphous phase.

Further, from FIG. 30B, it was clearly found that the crystallite size of the anatase phase gradually increased with the increase in the $Zr^{4+}$ content, and its crystallinity was improved. From the above results, it was successful to obtain $Ti_{1-x}Zr_xO_2$ which is the composite oxide in which $Zr^{4+}$ solidly dissolved in the titanium oxide of the anatase-type crystal structure (that is, $Ti^{4+}$ in the titanium oxide of the anatase-type crystal structure was substituted with $Zr^{4+}$).

2. TEM Measurement

Further, the shape and crystal structure were examined by TEM (JEM-2010 HCKM, manufactured by JEOL Ltd.) measurement. FIG. 31 illustrates TEM images of the Ti—Zr composite oxides of X=0.0, 0.1, and 0.5.

As is apparent from FIG. 31, in $TiO_2$ (x=0.0) and $Ti_{0.9}Zr_{0.1}O_2$ (x=0.1), microparticles having a particle diameter of about 2 to 3 μm were obtained (refer to (i)-1 and (ii)-1 of FIG. 31). On the other hand, in $Ti_{0.5}Zr_{0.5}O_2$ (x=0.5) having a higher zirconium content, the shape of an irregularly shaped particle in which the particles were bonded to each other was confirmed (refer to (iii)-1 FIG. 31).

In addition, the surface structure of each particle was examined from the enlarged image of each particle in FIG. 31, and as a result, it was found that 5 to 10 nm nanocrystals constitute microparticles in $TiO_2$ (x=0.0) and $Ti_{0.9}Zr_{0.1}O_2$ (x=0.1) (refer to (i)-2 and (ii)-2 in FIG. 31). However, surface intervals on the 101 plane with $TiO_2$ (x=0.0) and $Ti_{0.9}Zr_{0.1}O_2$ (x=0.1) were 0.37 nm and 0.38 nm, respectively. It was inferred that the lattice was expanded by $TiO_2$ (x=0.0) incorporating $Zr^{4+}$.

On the other hand, the size of nanocrystals constituting $Ti_{1-x}Zr_xO_2$ was confirmed to be likely to be decreased with the zirconium content, and the size of the nanocrystals constituting $Ti_{0.5}Zr_{0.5}O_2$ (x=0.5) was smaller than those contained in $TiO_2$ (x=0.0) and $Ti_{0.9}Zr_{0.1}O_2$ (x=0.1) by about 2 to 4 nm (refer to (iii)-2 in FIG. 31).

3. Measurement of Specific Surface Area and Pore Diameter of Particle

Also, in order to obtain the specific surface area and pore diameter of the particles, nitrogen adsorption and desorption isotherms were measured with a BELSORP-max gas adsorption type specific surface area/nano-pore size evaluation device (manufactured by BEL Inc., Japan), and analysis was performed by using a BET (Brunauer, Emmet, and Teller) method.

From the measurement results, it was found that $Ti_{1-x}Zr_xO_2$ (x=0.0 to 0.15) is a mesoporous structure particle, and the specific surface areas of $TiO_2$ (x=0.0) and $Ti_{0.9}Zr_{0.1}O_2$ (x=0.1) were 113 m²/g and 98 m²/g. That is, it was clearly found that even when 10 atom % of $Zr^{4+}$ was solidly dissolved in titanium oxide having an anatase-type crystal structure, the particle shape and its surface structure hardly changed.

[Production Example 15] Production 3 of Cathode Electrode

Next, an electrode provided with 12 kinds of Ti—Zr composite oxides having different metal compositions of titanium and zirconium obtained in Production Example 14 was produced.

Specifically, first, a 2×2.5 cm² titanium plate was calcinated at 450° C. for one hour. Next, 10 mg of each of the anatase-type titanium oxides 1 to 6 was dispersed in methanol, and this was applied on the calcinated titanium plate. Subsequently, the titanium plate coated with titanium oxide was heated at a rate of temperature rise of 100° C./hour and then calcinated at 500° C. for one hour. Then, grinding was performed so that the coated area of the titanium oxide was 2 cm×2 cm on one side so as to produce 12 kinds of Ti—Zr composite oxide electrodes.

[Test Example 12] Reduction Property Confirmation Test of Catalyst

1. Chronoamperometry

With a three-electrode system two-compartment electrochemical cell (refer to FIG. 9), chronoamperometry was performed by using the same method as that used in Test Example 2 using 12 kinds of Ti—Zr composite oxide electrodes produced in Production Example 15 as cathodes.

Reaction conditions were set as 50° C. and 2 hours, and the reaction products were evaluated by an LC-20AD high performance liquid chromatograph (manufactured by Shimadzu Corporation) equipped with an RID-10A refractive index detector and an SPD-M20A diode array detector. As a result, FIG. 32A illustrates the yields of glycolic acid and glyoxylic acid, and FIG. 32B illustrates the Faraday efficiency of glycolic acid, glycoxylic acid, and hydrogen production.

As is apparent from FIGS. 32A and 32B, in $TiO_2$ (x=0.0), the yield of the reduction product was 19.0%, and the Faraday efficiency at that time was 71.6%. In addition, it was confirmed that the yield of the reduction product was improved until the zirconium content of the catalyst reached x=0.1, and the Faraday efficiency was also increased. In $Ti_{0.9}Zr_{0.1}O_2$ (x=0.1), which was the most active, the yield of desired glycolic acid was 32.6%, and the Faraday efficiency in the reaction was 91.7%. That is, the reduction reaction of oxalic acid proceeded more efficiently in $Ti_{0.9}Zr_{0.1}O_2$ (x=0.1) than pure $TiO_2$ (x=0.0). On the other hand, in $Ti_{1-x}Zr_xO_2$ (x=0.2 to 0.75) and $ZrO_2$ (x=1.0) of the amorphous phase, the catalytic activity was very low and the selectivity of reduction from oxalic acid to glycolic acid was deteriorated. Further, on these catalysts, a large amount of hydrogen due to side reactions was generated. Therefore, it was clearly found that the anatase structure of the catalyst is an important property required for the reduction catalyst of oxalic acid. From the above results, it was found that in the electrochemical reduction of oxalic acid, $Ti_{1-x}Zr_xO_2$ (x=0.0 to 0.15) of the anatase phase is more effective than pure $TiO_2$ (x=0.0).

2. UV-Vis Diffuse Reflection Spectrum Measurement

Further, in order to clarify the electronic state of 12 kinds of Ti—Zr composite oxides having di metal compositions of titanium and zirconium obtained in Production Example 14, a UV-Vis diffuse reflection spectrum was measured with a V-670 spectrometer ultraviolet near infrared spectrometer (manufactured by JASCO Corporation). The results are indicated in FIG. 33A and FIG. 33B. FIG. 33A is a graph illustrating the UV-Vis diffuse reflection spectra of 12 kinds of Ti—Zr composite oxides having different metal compositions of titanium and zirconium obtained in Production Example 14, and FIG. 33B is a graph illustrating band gap energy (Eg) obtained from an absorption edge of the UV-Vis diffuse reflection spectra in FIG. 33A. The band gap energy (Eg) was obtained as it is represented by the following Expression (1) when the absorption edge (nm) was set as $\lambda_{edge}$.

$$Eg = 1240/\lambda_{edge} \quad (1)$$

As is apparent from FIG. 33A, the absorption initiation energy of $TiO_2$ was 380.4 nm, and the diffuse reflection spectrum of $Ti_{1-x}Zr_xO_2$ was positioned in the UV light region ($\lambda < 380$ nm). That is, the absorption edge of the diffuse reflection spectrum of $TiO_2$ was shifted to a lower wavelength as the zirconium content was increased. This means that the band gap energy (Eg) of $Zr^{4+}$ solidly dissolved in titanium oxide is increased.

Further, from FIG. 33B, the band gap energy (Eg) in $TiO_2$ (x=0.0) of the anatase phase was 3.26 eV, which was almost the same as the previously reported value. On the other hand, the bandgap energy (Eg) was greatly increased in $Ti_{0.99}Zr_{0.01}O_2$ (x=0.01) containing 1.0 atom % of $Zr^{4+}$ and further it was the largest value, which was 3.36 eV in $Ti_{0.9}Zr_{0.1}O_2$ (x=0.1). This increase in the bandgap energy (Eg) suggested that the conduction band formed by a Ti3d orbital is located at a reduction potential higher than that of $TiO_2$ (x=0.0) in $Ti_{1-x}Zr_xO_2$ (x=0.0 to 0.15) of the anatase phase. That is, since the electrons stored in the conduction band in $Ti_{0.9}Zr_{0.1}O_2$ (x=0.1) have reducing power stronger than that in $TiO_2$ (x=0.0), it was inferred to be activated the reduction reaction of oxalic acid (refer to FIG. 34). As a result, in spite of the same particle shape and surface structure as those of $TiO_2$, it was inferred that $Ti_{1-x}Zr_xO_2$ of the anatase phase reduced oxalic acid more efficiently.

Further, hafnium (Hf), rutherfordium (Rf), and the like belonging to Group 4 of the periodic table are in the same group as Zr. Accordingly, even in the composite oxide of the anatase phase in which a part of Ti from $TiO_2$ is substituted with Hf or Rf having a larger atomic radius than Ti, the electrons stored in the conduction band formed by the Ti3d orbit have a reducing power stronger than that in $TiO_2$, and thus it is presumed that the reduction reaction of oxalic acid can be activated, and the same effect as that of $Ti_{1-x}Zr_xO_2$ of the anatase phase can be obtained.

From the results of Test Examples 11 and 12, it was clearly found that a minute change in the $TiO_2$ electronic state by solidly dissolving a small amount of $Zr^{4+}$ contributes greatly to the reduction reaction of oxalic acid. In a case where this catalyst was applied to the electrochemical reducing catalyst of oxalic acid, the desired glycolic acid was obtained in a yield of 32.6% and the reaction proceeded with a high Faraday efficiency of 91.7%. This value was also high as compared with the test using the cathode equipped with the $TiO_2$ catalyst having the porous structure discussed in Test Examples 4 to 10 described above. From this, it was inferred that $Ti_{1-x}Zr_xO_2$ in the anatase phase is a particularly excellent catalyst in the glycolic acid electrolysis synthesis.

[Production Example 16] Production of Ti—Nb Composite Oxide

A Ti—Nb composite oxide was produced by using a producing method as illustrated in FIG. 35.

Specifically, first, 1 g of Pronic (registered trademark) F-127 (PF-127, Aldrich) and $NbCl_5$ (Mitsuwa Pure Chemicals) were mixed with 13 mL of distilled ethanol in amounts indicated in the following Table 3, as a first step [Step 1].

TABLE 3

| No. | Name | PF-127 (g) | $NbCl_5$ (g) | $TiCl_4$ 1 mL (g) | Nb Molar Ratio (%) |
|---|---|---|---|---|---|
| 1 | $TiO_2$ | 1 | 0.00000 | 1.73 | 0 |
| 2 | Nb-1% | 1 | 0.02487 | 1.73 | 1 |
| 3 | Nb-5% | 1 | 0.12970 | 1.73 | 5 |
| 4 | Nb-10% | 1 | 0.27370 | 1.73 | 10 |
| 5 | Nb-20% | 1 | 0.61500 | 1.73 | 20 |
| 6 | Nb-30% | 1 | 1.05590 | 1.73 | 30 |

Next, the resultant mixed solution was stirred at 40° C. for 20 minutes so as to obtain a colorless solution. Subsequently, 1 mL of $TiCl_4$ (Wako Pure Chemical Industries, Ltd.) was added while gently stirring the obtained solution so as to obtain a yellow solution. Further, it was left to stand at 40° C. for 2 to 3 days so as to obtain a sticky jelly-like substance. Finally, as illustrated in [Step 2] of FIG. 35, calcination was performed at 500° C. for 3 hours so as to obtain six kinds of Ti—Nb composite oxides (milky powder) having different niobium blending ratios.

[Test Example 13] Structural Analysis of Ti—Nb Composite Oxide

1. Powder X-Ray Diffraction Measurement

Regarding six kinds of Ti—Nb composite oxides having different compounding ratios of niobium obtained in Production Example 16, the shape and crystal structure were examined by powder X-ray diffraction (XRPD) measurement using D2 Phaser (manufactured by Bruker). The results are indicated in FIG. 36.

From (i) in FIG. 36, it was clearly found that all the titanium oxide mixed with niobium had an anatase-type crystal structure. Further, from (ii) of FIG. 36, the peak indicating the 101 plane of the anatase phase was shifted to a lower angle depending on the compounding amount up to the 20% niobium content (excluding Nb-10%). In addition, it was clearly found that when the compounding amount was 20% or more, the diffraction peak was gradually shifted to a high angle, and thereby there was a change in electronic state and structure. On the other hand, in Nb-10%, since the interaction between titanium and niobium differed from that of a case of other compositions, it tended to be different from other samples, but Nb was considered to be in a mixed state.

2. SEM-EDS (ENERGY Dispersive X-Ray Spectrometry) Measurement

Among six kinds of Ti—Nb composite oxides having different compounding ratios of niobium obtained in Production Example 16, five kinds of Ti—Nb composite oxides in which niobium was compounded were measured by using a SEM equipped with an ENERGY dispersive X-ray spectrometer (EDS), and the content of niobium was calculated. The results are indicated in FIG. 37.

From FIG. 37, it was clearly found that the amount of niobium contained in the sample was small compared to the amount of niobium used for synthesis, but it was increased in proportion to the amount of raw material.

3. UV-Vis Diffuse Reflection Spectrum Measurement

Among six kinds of Ti—Nb composite oxides having different compounding ratios of niobium obtained in Production Example 16, regarding five kinds of Ti—Nb composite oxides in which niobium is compounded, a UV-Vis diffuse reflection spectrum was measured with a V-670 spectrometer ultraviolet near infrared spectrometer (manufactured by JASCO Corporation). The results are indicated in FIG. 38. In addition, the hand gap energy (Eg) calculated from the absorption edge of the UV-Vis diffuse reflection spectrum of each Ti—Nb composite oxide is indicated in Table 4 below.

TABLE 4

| Name | Bandgap Energy (eV) |
| --- | --- |
| Anatase $TiO_2$ | 3.19 |
| Nb-1% | 3.19 |
| Nb-5% | 3.22 |
| Nb-10% | 3.23 |
| Nb-20% | 3.25 |
| Nb-30% | 3.22 |
| $Nb_2O_5$ | 3.40[*1] |

[*1] refer to Reference "Adv. Mater, 13 (18), 1377-1380 (2011)"

From FIG. 38, it was clearly found that the absorption edge was changed according to the compounding amount of niobium.

Also, as is apparent from Table 4, the hand gap energy (Eg) tended to increase with the increase in the compounding amount of niobium.

[Production Example 17] Production 4 of Cathode Electrode

Next, among six kinds of Ti—Nb composite oxides having different compounding ratios of niobium obtained in Production Example 16, five kinds of Ti—Nb composite oxides in which niobium was compounded were used so as to produce a cathode electrode.

Specifically, first, a 2×2.5 cm² titanium foil was calcinated at 450° C. for one hour under an air atmosphere. Next, the five kinds of Ti—Nb composite oxides (10 to 15 mg) having different compounding ratios of titanium oxide and niobium were suspended in 0.2 to 0.3 mL of ethanol, and the suspension was dropped on both sides of a titanium foil, thereby forming a uniform catalyst layer on the electrode. Next, the electrode on which the catalyst layer was formed was calcinated at 500° C. for one hour while circulating air so as to obtain a cathode electrode.

[Test Example 14] Reduction Property Confirmation Test of Catalyst

1. Chronoamperometry

The chronoamperometry was performed by using the same method as that used in Test Example 12 except for using a cathode electrode provided with the five kinds of Ti—Nb composite oxides having different compounding ratios of niobium obtained in Production Example 17 in a catalyst layer.

As a result, FIG. 39A illustrates the oxalic acid conversion rate and FIG. 39B illustrates the Faraday efficiency of glycolic acid and glyoxylic acid production. Note that, in FIG. 39B, "GO" represents glyoxylic acid and "GA" represents glycolic acid.

From FIGS. 39A and 39B, it was clearly found that the oxalic acid conversion rate and the Faraday efficiency of glycolic acid production were particularly high on the Nb-10% catalyst. From the above results, it was found that the structure of titanium oxide, the electronic state, and the catalytic properties are changed by mixing niobium. In addition, vanadium (V), tantalum (Ta), dubnium (Db) and the like belonging to Group 5 of the periodic table are in the same group as Nb and are set to be in a pentavalent oxidation state. Therefore, even in the composite oxide of the anatase phase in which a part of Ti from $TiO_2$ is substituted with V, Ta, or Db, it is presumed that the structure, the electronic state, and the catalytic properties of the titanium oxide are changed by mixing V, Ta, or Db, and the same effect as that of the Ti—Nb composite oxide of the anatase phase can be obtained.

Production Example 18

1. Preparation of Electrode Material

Commercially available products were used as $Ga_2O_3$ (High purity chemistry, GAO01PB) for a photoanode and a $WO_3$ (High purity chemistry, WWO03PB) powder, and Japan reference catalyst titanium oxides TIO-7 (anatase type, specific surface area: 270 m²/g, and crystallite diameter: 8 nm) and TIO-8 (anatase type, specific surface area: 338 m²/g, and crystallite diameter: 4 nm) provided by Catalyst Society Reference Catalysts Subcommittee were used as a $TiO_2$ powder for a cathode. $BiVO_4$ was synthesized in accordance with a known method (reference: J. Q. Yu, et al., "Effects of structural variation on the photocatalytic performance of hydrothermally synthesized $BiVO_4$", Ad V. Funct. Mater., Vol. 16, p 2163-2169, 2006).

Specifically, as a synthesis method of $BiVO_4$, first, 38.8 g of bismuth nitrate pentahydrate as a raw material (produced by Kanto Chemical Co., Inc., 04208-30) and 9.36 g of ammonium metavanadate (produced by Kanto Chemical Co., Inc., 01332-30) were dissolved in 100 mL of a nitric acid aqueous solution having a molar concentration of 1.84 mol/L. Next, two prepared aqueous solutions were mixed and dissolved by adding 15 g of urea (Wako, 219-00175). Next, the prepared aqueous solution was placed in a hot water bath at 90° C. and stirred for 8 hours while heating. The precipitated $BiVO_4$ powder was filtered and dried under vacuum for 24 hours so as to obtain $BiVO_4$ powder.

2. Production of Photoanode 0.1 g of powder of $Ga_2O_3$, $WO_3$, or $BiVO_4$ was dispersed in 0.5 mL each of distilled water, and 0.03 mL of acetylacetone and 0.03 mL of Triton X were added and mixed for 10 minutes in an agate mortar. Next, 0.05 mL of the prepared suspension was dropped onto a conductive glass electrode substrate (2×2 cm²). The suspension was uniformly coated by using a squeegee method (reference: S. Kitano, et al., "Bifunctionality of $Rh^{3+}$ Modifier on $TiO_2$ and Working Mechanism of $Rh^{3+}$/$TiO_2$ Photocatalyst under Irradiation of Visible Light", J Phys Chem C, Vol. 117, p 11008-11016, 2013) in which a glass rod set at a position separated 63 μm from a glass electrode substrate surface was slid at a constant speed and the dropped suspension was spread on the glass electrode substrate. Subsequently, a calcination treatment was performed at 450° C. for 30 minutes (rate of temperature rise: 10° C./min) under an air atmosphere so as to obtain a photoanode.

3. Production of Cathode

A titanium plate (thickness×width×length: 0.1×2×2 cm, Nilaco Corporation, TI-453321) serving as a substrate was subjected to a calcination treatment at 450° C. (rate of temperature rise: 10° C./min) under the air atmosphere for 30 minutes. Then, 10 mg of each of the Japan reference catalyst titanium oxides JRC-TIO-7 (anatase type, specific surface area: 270 m²/g, and crystallite diameter: 8 nm) and TIO-8 (anatase type, specific surface area: 338 m²/g, and crystallite diameter: 4 nm) was suspended in 0.2 mL of methanol. Next, the suspension was dropped on both sides of the calcinated titanium plate, methanol was evaporated at room temperature, and the titanium plate was coated with the $TiO_2$ powder. TIO-7 was subjected to a calcination treatment at 500° C. (rate of temperature rise: 1.7° C./min) for 5 hours under the air atmosphere, and TIO-8 was subjected to a calcination treatment at 450° C. (rate of temperature rise: 10° C./min) under an air atmosphere for 30 minutes (references: R. Watanabe, et al., "$CO_2$-free electric power circulation via direct charge and discharge using the glycolic acid/oxalic acid redox couple", Energ En Viron Sci, Vol. 8, p 1456-1462, 2015; S. Kitano, et al., "Hydrogenation of oxalic acid using light-assisted water electrolysis for the production of an alcoholic compound", Green Chem, Vol. 18, p 3700-3'706, 2016) so as to obtain two kinds of cathodes having different titanium oxide catalysts.

[Test Example 15] Alcohol Synthesis Test Using Cathode Electrode with Titanium Oxide Catalyst and Photoanode Electrode 1. Electrochemical Reaction Test An electrochemical reaction test was carried out by a two electrode system using the two-compartment type glass cell (inner volume of 75 cm³) (refer to FIG. 40), using the photoanode and the cathode obtained in Production Example 18.

In the case of TIO-7, 40 mL of a 0.2 mol/L sodium sulfate (hereinafter, referred to as "$Na_2SO_4$" in some cases) aqueous solution (pH 5.6) was added to an anode side cell, and 40 mL of a 0.2 mol/L $Na_2SO_4$ aqueous solution containing 0.108 g of oxalic acid adjusted to pH 1.0 by adding concentrated sulfuric acid was added to a cathode side cell.

In the case of TIO-8, 40 mL of a 0.16 mol/L $Na_2SO_4$ aqueous solution (pH 5.8) was added to an anode side cell, and 40 mL of a 0.16 mol/L $Na_2SO_4$ aqueous solution containing 0.576 g of oxalic acid adjusted to pH 1.2 by adding concentrated sulfuric acid was added to a cathode side cell.

A proton exchange Nafion membrane was set between the cells. The produced electrode was fixed using a metallic electrode fixing rod. A photoanode was set in the anode side cell and a titanium oxide cathode was set in the cathode side cell, the electrode part was immersed into the aqueous solution, and a Teflon cap was set in both cells. Argon gas was passed through the aqueous solution of both cells for 30 minutes to remove the atmosphere from the system. Only the photoanode was irradiated with light having a wavelength of 200, 300, or 400 nm or more by using a 300 W xenon lamp (Innotex Co., Ltd., LX-300F) equipped with a glass filter for optical wavelength adjustment as a light source. The temperature of the aqueous solution in both cells was set to be 25° C. in the case of TIO-8 and was set to be 50° C. in the case of TIO-7, and a voltage from 0 V to 2.5 V was applied between the photoanode and titanium oxide cathode under light irradiation or in a dark place. FIG. 41A to FIG. 41C are graphs illustrating current voltage curves in a dark place and under irradiation with light in an electrochemical reaction test using each photoanode and a titanium oxide cathode coated with TIO-8. In FIG. 41A to FIG. 41C, dotted lines represent the results in the dark place, and solid lines represent the results under the light irradiation.

As is apparent from FIG. 41A to FIG. 41C, it is necessary to apply a voltage of 2.1 V or more due to current flowing in all of the photoanodes in the dark place. Also, under the light irradiation, the bias required for current flow in all of the photoanodes was reduced more than in the dark, and the order of reduction was $WO_3 > BiVO_4 > Ga_2O_3$. In a case where the $WO_3$ photoanode was used, from the fact that the current flowed from 0.6 V, which is 1.1 V or less of theoretical voltage required for oxidation of water and reduction of oxalic acid, it was clearly found that this system can utilize light energy for electrochemical reaction.

Also, the current voltage curves in the dark place and under irradiation with different wavelengths of light (wavelengths of 200, 300, or 400 nm or more) using the $WO_3$ photoanode and the titanium oxide cathode coated with TIO-7 are shown in FIG. 42. In FIG. 42, a curve a represents a current voltage curve in the dark place, a curve b represents a current voltage curve under the light irradiation at a wavelength of 400 nm or more, a curve c represents a current voltage curve under the light irradiation at a wavelength of 300 nm or more, and a curve d is a current voltage curve under the light irradiation at a wavelength of 200 nm or more.

From FIG. 42, it is necessary to apply a voltage of 2.1 V or more due to a current flowing in the dark place (refer to the curve a in FIG. 42). Under the light irradiation, regardless of the irradiation light wavelength, the bias required for the current to flow was reduced, and the current flowed from the voltage (0.5 V) which was 1.1 V or less of theoretical voltage. Approximately the same current-voltage curves were obtained under the light irradiation at wavelengths of 200 nm or more (refer to the curve d in FIG. 42) and 300 nm or more (refer to the curve c in FIG. 42). The voltage at which the current began to flow under the light irradiation at a wavelength of 400 nm or more (refer to the curve b in FIG. 42) was almost the same as that under the light irradiation at wavelengths of 200 nm and 300 nm or more.

2. Chronoamperometry

For a constant voltage application reaction (hereinafter, referred to as "chronoamperometry" in some cases), a $WO_3$ photoanode or a coiled platinum anode (23 cm, BAS, 012961) and a titanium oxide cathode coated with TIO-7 were used. 40 mL of a 0.2 mol/L $Na_2SO_4$ aqueous solution (pH 5.6) was added to the anode side cell, and 40 mL of a 0.2 mol/L $Na_2SO_4$ aqueous solution containing 0.108 g of oxalic acid adjusted to pH 1.0 by adding concentrated sulfuric acid was added to a cathode side cell. The $WO_3$ photoanode or the coiled platinum anode was set in the anode side cell, a titanium oxide cathode and a silver chloride (hereinafter, referred to as "Ag/AgCl" in some cases) reference electrode (Inter Chemical Ltd., Ag/AgCl) were set in the cathode side cell, then an electrode portion was immersed into an aqueous solution, and a Teflon cap was set in both cells. Argon gas was passed through the aqueous solution of both cells for 30 minutes to remove the atmosphere from the system. In the case of the $WO_3$ photoanode, only the photoanode was irradiated with light having a wavelength of 300 or 400 nm or more by using a 300 W xenon lamp (Innotex Co., Ltd., LX-300F) equipped with a glass filter for optical wavelength adjustment as a light source. The temperature of the aqueous solution in both cells was set to be 50° C., and a voltage from 1.0 V to 1.5 V was applied between the photoanode and titanium oxide cathode under the light irradiation or in the dark place. In the case of a platinum anode as a reference example, the reaction was performed by a three electrode system. In the dark place, a constant potential was applied to the titanium oxide cathode for 2 hours with reference to the Ag/AgCl reference electrode. As a result, the current efficiency with respect to the oxalic acid reduction products (glyoxylic acid and glycolic acid) is illustrated in FIG. 43.

As is apparent from FIG. 43, in the dark place, even when a voltage of 1.5 V was applied, the oxalic acid reduction reaction did not proceed and a product was not able to be obtained. On the other hand, under the irradiation with light, glyoxylic acid and glycolic acid which are oxalic acid reduction products were produced, the light wavelength range was wide, and higher current efficiency was obtained as the voltage was larger. Under the irradiation with light having a wavelength of 300 nm or more, the current efficiency of 80% was achieved at a voltage application condition of 1.5 V. Based on these results, use of the light energy absorbed by the $WO_3$ photoanode for the reduction reaction of oxalic acid was successfully performed for the first time in the world.

In addition, in order to compare the current efficiency of the oxalic acid reduction reaction to the potential of the titanium oxide cathode under various reaction conditions, FIG. 44 illustrates a graph obtained by plotting the current efficiency with respect to the oxalic acid reduction product in the chronoamperometry using the $WO_3$ photoanode or the platinum anode and the titanium oxide cathode coated with TIO-7 against the potential of the titanium oxide cathode. In FIG. 44, a black circle plot has a two-electrode system and represents the results of chronoamperometry using a $WO_3$ photoanode and a titanium oxide cathode coated with TIO-7 under irradiation with light having a wavelength of 400 nm or more, a black triangle plot has a two-electrode system and represents the results of chronoamperometry using a $WO_3$ photoanode and a titanium oxide cathode coated with TIO-7 under the light irradiation with a wavelength of 300 nm or more, and a square plot has a three-electrode system and represents the results of chronoamperometry using a platinum anode and a titanium oxide cathode coated with TIO-7 as reference examples.

From FIG. 44, regardless of the electrode system and reaction conditions, the current efficiency of the oxalic acid reduction reaction depends on the potential of the titanium oxide cathode, and has a tendency of a volcanic type. Also, when the potential of the titanium oxide cathode was about −0.6 V Vs RHE, the current efficiency had a maximum value of 99%.

[Test Example 16] Alcohol Synthesis Using Glyoxylic Acid, Pyruvic Acid, and Trimethyl Pyruvic Acid as Raw Materials In this test, as three kinds of reaction substrates, glyoxylic acid (produced by Wako Pure Chemical Industries, Ltd., selling agency code: 071-00912) represented by the following chemical formula, pyruvic acid whose base skeleton is glyoxylic acid and a methyl group is introduced into a carbonyl carbon (produced by Kanto Chemical Co., Inc., product code: P 0579), and trimethyl pyruvic acid (produced by Kanto Chemical Co., Inc., product code: D3609) having a tert-butyl group introduced into the carbonyl carbon were used.

[Chemical Formula 1]

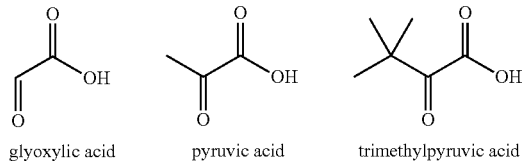

glyoxylic acid    pyruvic acid    trimethylpyruvic acid

1. Cyclic Voltammetry

The presence or absence of catalytic reaction was examined by cyclic voltammetry. Using a VersaSTAT4 potentiostat, cyclic voltammograms for 0.03 M of substrate/0.2 M of a $Na_2SO_4$ aqueous solution (80 mL) were recorded at 50° C. Note that a sweep rate in the measurement was 10 mV/s. Among the nine kinds of titanium oxide/titanium mesh electrodes produced in Production Example 8, the titanium oxide/titanium mesh electrode (action electrode area: 4 $cm^2$) of which a heating time at 220° C. in the first hydrothermal treatment step was 12 hours was used as a cathode, a platinum wire (230×0.5 mm, BAS) was used as an anode, and Ag/AgCl (RE-1B, BAS) was used as a reference electrode. A substrate solution was previously bubbled with Ar gas for 30 minutes in order to purge air from the inside of the cell. The cyclic voltammograms for 0.2 M of a $Na_2SO_4$ aqueous solution which is a blank solution was also measured by the same procedure. The cyclic voltammogram in each substrate is illustrated in FIG. 45A to FIG. 45C. In FIG. 45A to FIG. 45C, solid lines represent cyclic voltammograms recorded in the presence of a substrate, and dotted lines represent cyclic voltammograms recorded in the absence of a substrate.

As is apparent from FIG. 45A to FIG. 45C, in a case of glyoxylic acid, a current is generated when a potential is applied from +0.01 V up to base, and the current is increased as the potential sweeps in the reduction direction. Since the current was obtained depending on the applied potential, it was understood that this is a reduction current obtained by reduction of glyoxylic acid. Accordingly, a start potential in the reduction reaction of glyoxylic acid was +0.01 V. On the other hand, start potentials in the reduction reactions of pyruvic acid and trimethyl pyruvic acid were −0.01 V and −0.09 V. That is, it was found that the introduction of a methyl group or a tert-butyl group into an aldehyde group of glyoxylic acid gradually shifted the start potential to base. In other words, it was suggested that in the electrocatalytic reaction of this test, glyoxylic acid into which a substituent was not introduced was the most reactive chemical structure.

2. Chronoamperometry

Chronoamperometry was also performed with a three-electrode system using VersaSTAT4 potentiostat. Among the nine kinds of titanium oxide/titanium mesh electrodes produced in Production Example 8, the titanium oxide/titanium mesh electrode (action electrode area: 4 $cm^2$) of which a heating time at 220° C. in the first hydrothermal treatment step was 12 hours was used as a cathode, a platinum wire (230×0.5 mm, BAS) was used as an anode, and Ag/AgCl (RE-1B, BAS) was used as a reference electrode. A two-compartment cell equipped with a cathode cell and an anode cell was used for the electrolysis cell. At this time, 0.03 M substrate/0.2 M of a $Na_2SO_4$ aqueous solution (40 mL) was used for the cathode cell, 0.2 M of a $Na_2SO_4$ aqueous solution (40 mL) was used as the anode cell, and a proton conductive membrane Nafion (registered trademark) (NRE-212, Sigma-Aldrich) was used for a separator. Bubbling was performed with Ar gas for 30 minutes in order to purge air from the inside of the cell. The catalyst test was performed at −0.7 V vs RHE, 50° C. for two hours. Reaction products were evaluated using LC-20AD HPLC equipped with an RID-10A refractive index detector and an SPD-M20A diode array detector manufactured by Shimadzu Corporation. The electron density of carbon in each substrate molecule was also examined with a Bruker A VANCE-400 NMR spectrometer (400 MHz). Chromatograms of the reaction solution of each substrate evaluated by HPLC are illustrated in FIG. 46A to FIG. 46C. In FIG. 46A to FIG. 46C, a bottom curve represents a chromatogram of a raw material solution, a center curve represents a chromatogram of a reaction solution, and a top curve represents a chromatogram of a reduction product.

From FIG. 46A to FIG. 46C, in the case of glyoxylic acid, a peak at a retention time of 7.7 min derived from a raw material disappeared in the reaction solution, and a new peak was newly confirmed at 9.1 min. In addition, since the peak is consistent with the retention time of glycolic acid, it was found that glyoxylic acid is introduced into glycolic acid by chronoamperometry. Further, it was found that the yield of glycolic acid calculated from the peak area in the chromatogram of the reaction solution was 95%, and the reaction was promoted smoothly. On the other hand, it was found that pyruvic acid was electrochemically reduced to lactic acid and trimethyl pyruvic acid was electrochemically reduced to 2-hydroxy-3,3-dimethyl butyric acid by chronoamperometry. The yields of the reaction solution were 68% and 55%. That is, it was found that in a case where a methyl group or a tert-butyl group was introduced into an aldehyde group of glyoxylic acid, the yield of the reduction product was decreased. It is presumed that due to the introduction of the substituent, the bulkiness of the functional group adjacent to the carbonyl carbon at a reaction point and the change in the electron density suppresses the progress of the electrode reduction reaction.

3. Measurement $^{13}$C-NMR

In order to know the electron density in the carbonyl carbon which is the reaction point, $^{13}$C-NMR measurement of each substrate was performed. The results are indicated in FIG. 47.

As is apparent from FIG. 47, a peak derived from carbonyl carbon of glyoxylic acid was 172.5 ppm. Further, peaks derived from carbonyl carbon of pyruvic acid and trimethyl pyruvic acid were 194.3 ppm and 204.2 ppm. From the viewpoint that the peak was shifted to a low magnetic field as a methyl group or a tert-butyl group was introduced into the carbonyl carbon, it was suggested that the electron density of the carbonyl carbon was gradually decreased. That is, in the chronoamperometry of this test, it was clearly found that the carbonyl carbon of glyoxylic acid, which was the most excellent in reactivity, had very high electron density, and trimethyl pyruvic acid, which was the least in reactivity, had low electron density. From these facts, it was suggested that in the alcohol electrolysis synthesis reaction using a substrate having a glyoxylic acid unit, the reduction reaction proceeded smoothly as the electron density of the carbonyl carbon was higher.

[Test Example 17] Alcohol Synthesis Using 2-Oxopentanoic Acid and 2-Oxoglutaric Acid as a Raw Material The influence of the presence or absence of a hydrophilic-hydrophobic functional group in the glyoxylic acid molecule which is the basic skeleton on the electrolytic reaction was examined. Specifically, in this test, as the reaction substrates, 2-oxopentanoic acid (produced by Kanto Chemical Co., Inc., selling agency code: K0015) having a propyl group introduced into the carbonyl carbon of glyoxylic acid represented by the following chemical formula, and 2-oxoglutaric acid (produced by Kanto Chemical Co., Inc., selling agency code: K0005) having a carboxy group introduced at an alkyl terminal of the 2-oxopentanoic acid.

[Chemical Formula 2]

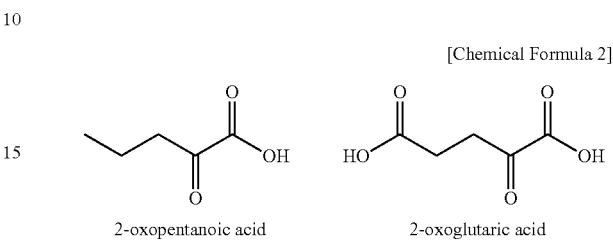

2-oxopentanoic acid      2-oxoglutaric acid

1. Cyclic Voltammetry

The cyclic voltammetry was performed by using the same method as that used in "1. Cyclic voltammetry" of Test Example 16 except for using 2-oxopentanoic acid or 2-oxoglutaric acid as a reaction substrate. The cyclic voltammogram in each substrate is illustrated in FIG. 48A and FIG. 48B. In FIG. 48A and FIG. 48B, solid lines represent cyclic voltammograms recorded in the presence of a substrate, and dotted lines represent cyclic voltammograms recorded in the absence of a substrate.

As is apparent from FIG. 48A and FIG. 48B, in the case of 2-oxopentanoic acid, a current is generated when a potential is applied from −0.07 V up to minus, and the current is increased as the potential sweeps in the reduction direction. Since the current was obtained depending on the applied potential, it was understood that this is a reduction current obtained by reduction of 2-oxopentanoic acid. Accordingly, a start potential in the reduction reaction of 2-oxopentanoic acid was −0.07 V. On the other hand, a start potential in the reduction reaction of 2-oxoglutaric acid was −0.04 V. That is, the progress of the catalytic reaction was confirmed in both substrates, and it was found that even if a carboxy group was introduced into an alkyl chain terminal of 2-oxopentanoic acid to improve the hydrophilicity of the molecule, the start potential was hardly changed.

2. Chronoamperometry

The chronoamperometry was performed by using the same method as that used in "2. Chronoamperometry" of Test Example 16 except for using 2-oxopentanoic acid or 2-oxoglutaric acid as a reaction substrate. Chromatograms of the reaction solution of each substrate evaluated by HPLC are illustrated in FIG. 49A and FIG. 49B. In FIG. 49A and FIG. 49B, a bottom curve represents a chromatogram of a raw material solution, and a center curve represents a chromatogram of a reaction solution.

From FIG. 49A and FIG. 49B, in the case of 2-oxopentanoic acid, a peak at a retention time of 10.9 min derived from a raw material disappeared in the reaction solution, and a new peak was newly confirmed at 12.2 min. In addition, the yield of the reduction product calculated from the peak area in the chromatogram of the reaction solution was 53%, and the progress of the electrochemical reduction reaction was confirmed. On the other hand, in the reaction solution of 2-oxoglutaric acid, a new peak different from the raw material appeared at 8.1 min, and the yield of the product was 96%. That is, it was found that the yield of the reduction product was remarkably improved by introducing a carboxy group at the alkyl chain terminal of 2-oxopentanoic acid. It was suggested that the interaction between the substrate and the catalyst accompanying the application of the carboxy group and the change in the hydrophilicity and hydrophobicity in the substrate molecule affected the electrode reduction reaction.

3. $^1$H-NMR Measurement

A $^1$H-NMR measurement was performed in order to clarify the reduction product such as 2-oxopentanoic acid or 2-oxoglutaric acid in the reaction solution. The results are indicated in FIG. 50A and FIG. 50B. In FIG. 50A and FIG. 50B, an upper graph illustrates the measurement results of the raw material solution, and a lower graph illustrates the measurement results of the reaction solution.

From FIG. 50A, before the reaction, the protons of a raw material, its contamination and 3-(trimethylsilyl)-1-propane-1,1,2,2,3,3-d6-sodium sulfonate which is a deuteration solvent internal standard substance were confirmed. On the other hand, in the reaction solution, a peak derived from the reaction product was confirmed at 4.0 ppm. When a $^1$H-NMR spectrum of 2-hydroxypentanoic acid in a known paper was confirmed, it was found that the peak thereof was a proton at the asymmetric carbon of 2-hydroxypentanoic acid. That is, it was suggested that 2-oxopentanoic acid was introduced into 2-hydroxypentanoic acid by chronoamperometry.

In addition, from FIG. 50B, before the reaction, only the protons of the raw materials were confirmed, but in the reaction solution, four peaks considered to be reduction products were confirmed other than the protons of 3-(trimethylsilyl)-1-propane-1,1,2,2,3,3-d6-sodium sulfonate which is a deuteration solvent internal standard substance. Two peaks c with different chemical shifts in the vicinity of 2.0 ppm had an integrated intensity about half that of a peak b at 2.3 ppm. Also, a proton at an asymmetric carbon atom adjacent to the carboxylic acid was confirmed at 4.0 ppm. From the above, it was suggested that 2-oxoglutaric acid is introduced into 5-oxo-2-tetrahydrofurancarboxylic acid which belongs to lactones by chronoamperometry.

4. Liquid Chromatography Mass Spectrometry

Mass spectrometry was performed in an electrospray negative mode using a liquid chromatograph mass spectrometer in order to determine the detailed structure of the reduction product of 2-oxoglutaric acid. The results are indicated in FIG. 51.

From FIG. 51, it was confirmed that deprotonated molecule [M-H]$^-$ was confirmed at 129.0 m/z and 147.0 m/z in the reaction solution. In addition, a simulation of 2-hydroxyglutaric acid in which the carbonyl oxygen was reduced in 2-oxoglutarate which is a compound expected as a reduction product and 5-oxo-2-tetrahydrofurancarboxylic acid of a cyclic ester compound of 2-oxoglutarate was performed. As a result, it was found that 147.0 m/z is attributed to 2-hydroxyglutaric acid, and 129.0 m/z is attributed to 5-oxo-2-tetrahydrofurancarboxylic acid.

As a result of the above examination, it was clearly found that the reaction solution prepared by chronoamperometry contained 2-hydroxyglutaric acid and 5-oxo-2-tetrahydrofurancarboxylic acid obtained by cyclic esterification of the 2-hydroxyglutaric acid. The reason for this was presumed that the chemical equilibrium with protons was established between 2-hydroxyglutaric acid and 5-oxo-2-tetrahydrofurancarboxylic acid from the fact that the pH of the solution during electrolytic synthesis was 2.3. In other words, it was suggested that 2-oxoglutaric acid was introduced to 5-oxo-2-tetrahydrofurancarboxylic acid via 2-hydroxyglutaric acid.

Various methods for synthesizing lactones by dehydration reaction of hydroxycarboxylic acid (a compound having a hydroxy group and a carboxy group in the molecule) under the acid catalyst conditions have been reported. In this study, 2-hydroxyglutaric acid having a carbonyl group reduced from 2-oxopentanoic acid was synthesized by electrochemical reduction reaction, and 5-oxo-2-tetrahydrofurancarboxylic acid which is a cyclic ester compound of 2-hydroxyglutaric acid was obtained with protons in a solution. It was presumed that the chemical equilibrium between 2-hydroxyglutaric acid and 5-oxo-2-tetrahydrofurancarboxylic acid in the presence of these protons was a reaction path as indicated in FIG. 52 from the organic chemistry knowledge thus far. According to this mechanism, 2-oxopentanoic acid is introduced into 2-hydroxyglutaric acid by electrocatalytic reaction, and then addition of an alcohol to the carbonyl group by protons and a dehydration reaction by protons followed by 5-oxo-2-tetrahydrofurancarboxylic acid can be obtained. It is known that this chemical equilibrium is strongly influenced by the number of carbons between a hydroxy group and a carboxy group in hydroxycarboxylic acid. In addition, in this test, it was clearly described that from the above-described the $^1$H-NMR measurement, 5-oxo-2-tetrahydrofurancarboxylic acid was preferentially formed rather than 2-hydroxyglutaric acid. From these facts, it was inferred that 2-hydroxyglutaric acid had an optimum carbon number, and thus an intramolecular esterification reaction occurred.

5. $^{13}$C-NMR Measurement

In order to know the electron density in the carbonyl carbon which is the reaction point, a $^{13}$C-NMR measurement of each of 2-oxopentanoic acid and 2-oxoglutaric acid was performed. The results are indicated in FIG. 53.

As is apparent FIG. 53, a peak of 2-oxopentanoic acid derived from carbonyl carbon was 196.8 ppm, and a peak of 2-oxoglutaric acid derived from carbonyl carbon was 195.4 ppm. Therefore, it was found that the electron density of the carbonyl carbon as the reaction point hardly changes even with 2-oxoglutaric acid in which a carboxy group was introduced at the alkyl chain terminal of 2-oxopentanoic acid. On the other hand, in the chronoamperometry of this test, although the electron density in the carbonyl carbon of 2-oxopentanoic acid and 2-oxoglutaric acid was hardly changed, there was a large difference in the progress of the reduction reaction. It was suggested that the interaction between the substrate and the catalyst accompanying the application of the carboxy group and the change in the hydrophilicity and hydrophobicity in the substrate molecule strongly affected the electrode reduction reaction.

Further, it was clearly found that in the chronoamperometry using 2-oxoglutaric acid, after obtaining 2-hydroxyglutaric acid, 5-oxo-2-tetrahydrofurancarboxylic acid obtained by cyclic esterification of the 2-hydroxyglutaric acid can be obtained with high yield. The reason for this is presumed to be that the acid catalyst equilibrium of 2-hydroxyglutaric acid which is the reduction product was offset to the product. Up to now, a method for efficiently synthesizing lactones from a carboxylic acid compound using an electrochemical technique has not been known; however, it was found for the first time by using an alcohol producing method according to one embodiment of the present invention. Therefore, the above results are considered to be very meaningful. This reaction proceeds at room temperature, and a lactone can be obtained by a simple operation merely by setting the electrolytic synthesis reaction conditions to acidic conditions. Therefore, the method for synthesizing lactones by this reaction is highly versatile. Lactones are regarded as important intermediate products of pharmaceuticals and natural products, and stereocontrol of functional groups on the similar skeleton and asymmetric carbon is indispensable for finding the desired pharmacological activity. Therefore, by further developing the method for producing alcohols according to one embodiment of the present invention, it can be considered to be utilized as a method for directly converting carboxylic acid compounds into useful lactones by an electrochemical reaction.

INDUSTRIAL APPLICABILITY

According to a catalyst, a cathode, a membrane electrode carrier for alcohol synthesis, and an alcohol synthesizing apparatus of one embodiment of the present invention, it is possible to obtain alcohols with high selectivity and high yield from carboxylic acids by electrochemical reduction reaction using a catalyst containing titanium oxide having a specific structure. In addition, according to the membrane electrode carrier for alcohol synthesis, and the alcohol synthesizing apparatus of one embodiment of the present invention, water or steam is decomposed at the anode and protons that have passed through the electrolytic membrane are supplied to the cathode, and thus a means for separately supplying hydrogen to the cathode side is not required. Therefore, the hydrogenation (that is, reduction) of the carboxylic acid proceeds promptly and alcohol can be produced with high efficiency. In addition, according to a method for producing alcohols of one embodiment of the present invention, it is possible to simply produce alcohols with high selectivity and high yield. In addition, according to a method for producing a cathode of one embodiment of the present invention, it is possible to simply produce a cathode capable of synthesizing alcohols with high selectivity and high yield from carboxylic acids by an electrochemical reduction reaction using the catalyst.

REFERENCE SIGNS LIST 1A, 2A, 3A . . . alcohol synthesizing apparatus
1 . . . cathode catalyst
2 . . . first carrier
3 . . . anode catalyst
4 . . . second carrier
10 . . . cathode
11 . . . anode
12 . . . electrolyte membrane
13 . . . conducting wire
14 . . . cooler
15 . . . cooling water circulation flow path
16 . . . heat exchanger
100 . . . membrane electrode assembly for alcohol synthesis
101 . . . electrosynthesis unit
102 . . . first supply means
103 . . . second supply means
104 . . . recovery means
105 . . . first control means
106 . . . second control means

The invention claimed is:

1. A cathode comprising:
a carrier and
a layer of an electrochemical catalyst carried on at least the surface of the carrier,
wherein the carrier is formed of a material having metal conductivity and is configured that electrons supplied from the anode can be transferred to the electrochemical catalyst,
wherein the electrochemical catalyst comprises a titanium oxide having an anatase-type crystal structure, and having the vertices and the ridge lines, and
wherein in a single titanium oxide particle, a vertex density per unit surface area is $8.0 \times 10^{-4}$ nm$^{-2}$ or more, or a vertex density per unit volume is $7.0 \times 10^{-4}$ nm$^{-3}$ or more, and a ridge line density per unit surface area is $5.0 \times 10^{-2}$ nm$^{-1}$ or more, or a ridge line density per unit volume is $8.0 \times 10^{-3}$ nm$^{-2}$ or more.

2. The cathode according to claim 1,
wherein, in the single titanium oxide particle, the vertex density per unit surface area is $2.0 \times 10^{-3}$ nm$^{-2}$ or more, or the vertex density per unit volume is $1.0 \times 10^{-3}$ nm$^{-3}$ or more, and the ridge line density per unit surface area is $6.2 \times 10^{-2}$ nm$^{-1}$ or more, or the ridge line density per unit volume is $1.3 \times 10^{-2}$ nm$^{-2}$ or more.

3. The cathode according to claim 1,
wherein the electrochemical catalyst further comprises a composite oxide obtained by substituting a part of titanium in the titanium oxide with at least one selected from the group consisting of a metal element other than titanium,
an element belonging to the carbon group, an element belonging to the nitrogen group, and
an element belonging to the oxygen group other than oxygen.

4. The cathode according to claim 3,
wherein the metal element other than titanium is an element belonging to Group 3, Group 4, or Group 5 of the periodic table.

5. The cathode according to claim 4,
wherein the element belonging to Group 4 of the periodic table is zirconium or hafnium.

6. The cathode according to claim 4,
wherein the element belonging to Group 5 of the periodic table is niobium or tantalum.

7. The cathode according to claim 1,
wherein the carrier has a porous structure.

8. The cathode according to claim 7,
wherein the porous structure is a mesh structure or a three-dimensional network structure.

9. The cathode according to claim 1,
wherein the material of the carrier is a titanium.

10. The cathode according to claim 1,
wherein the thickness of the layer of the electrochemical catalyst is 100 nm or more and 500 µm or less.

11. A membrane electrode assembly comprising:
an anode;
a cathode of claim 1; and
an electrolyte membrane.

12. A method of producing alcohols comprising:
using a membrane electrode assembly of claim 11.

* * * * *